(12) United States Patent
Calderaro et al.

(10) Patent No.: US 7,386,468 B2
(45) Date of Patent: Jun. 10, 2008

(54) SYSTEM AND METHOD FOR RESOURCE REDUCTION RECEIPT LOG AND AUDIT TRAIL

(75) Inventors: Michael Joseph Calderaro, Austin, TX (US); Lynn P. Lepore, Austin, TX (US); William Daniel Ordway, Jr., Smithfield, NC (US); Patricia E. Vickers, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 10/042,414

(22) Filed: Jan. 8, 2002

(65) Prior Publication Data

US 2003/0130956 A1 Jul. 10, 2003

(51) Int. Cl.
*G06Q 99/00* (2006.01)
(52) U.S. Cl. .................... 705/11; 705/1; 705/7; 705/50; 380/258; 713/150
(58) Field of Classification Search .................. 705/50, 705/80, 67, 64–65, 71, 11, 8, 7; 380/258; 713/150–159, 161, 168–181
See application file for complete search history.

(56) References Cited

U.S. PATENT DOCUMENTS

| | | | | |
|---|---|---|---|---|
| 5,909,669 | A | 6/1999 | Havens | 705/11 |
| 5,926,794 | A | 7/1999 | Fethe | 705/11 |
| 6,119,097 | A | 9/2000 | Ibarra | 705/11 |
| 6,275,812 | B1 | 8/2001 | Haq et al. | 705/11 |
| 6,332,125 | B1 | 12/2001 | Callen et al. | 705/4 |
| 6,524,109 | B1 | 2/2003 | Lacy et al. | 434/219 |
| 6,618,734 | B1 | 9/2003 | Williams et al. | 707/102 |
| 6,853,975 | B1 | 2/2005 | Dirksen et al. | 705/11 |
| 6,944,597 | B2 | 9/2005 | Callen et al. | 705/4 |
| 2002/0143496 | A1 | 10/2002 | Mactas et al. | 702/179 |

(Continued)

FOREIGN PATENT DOCUMENTS

WO     WO9526535 A1     10/1995

OTHER PUBLICATIONS

Rama, "Efficient Public Sector Downsizing," Sep. 1997, Finance & Development (World Bank).

(Continued)

*Primary Examiner*—Kambiz Abdi
(74) *Attorney, Agent, or Firm*—VanLeeuwen & VanLeeuwen; Justin M. Dillon

(57) ABSTRACT

A system and method that tracks surplus reduction actions is disclosed. Managers and other decision makers take various actions regarding employees. Actions are recorded and tracked in a data store. Included with the action is an identifier, such as a digital signature, of the decision maker that performed the action. Affected (i.e., surplus) employees are notified that they have been selected as surplus. Affected employees acknowledge such identification as well as any confidentiality and non-compete obligations. Affected employees electronically sign non-compete agreements and such digital signatures are also recorded in the data store evidencing the employees' acknowledgment of such confidentiality and non-compete obligations. Electronic keys, such as user IDs and passwords, may also be sent to employees that acknowledge surplus actions and non-compete obligations. These electronic keys enable the affected employees to access materials, such as job databases and other relocation and employment information.

9 Claims, 40 Drawing Sheets

U.S. PATENT DOCUMENTS

| | | | |
|---|---|---|---|
| 2002/0184085 A1 | 12/2002 | Lindia et al. | 705/11 |
| 2002/0198766 A1 | 12/2002 | Magrino et al. | 705/11 |
| 2003/0004789 A1 | 1/2003 | Calderaro et al. | 705/11 |
| 2003/0004790 A1 | 1/2003 | Calderaro et al. | 705/11 |
| 2003/0120537 A1 | 6/2003 | Desanti et al. | 705/11 |
| 2003/0130885 A1 | 7/2003 | Calderaro et al. | 705/11 |
| 2003/0130886 A1 | 7/2003 | Calderaro et al. | 705/11 |
| 2003/0177361 A1* | 9/2003 | Wheeler et al. | 713/176 |
| 2004/0181425 A1 | 9/2004 | Schwerin-Wenzel et al. | 705/1 |
| 2004/0220825 A1 | 11/2004 | Schwerin-Wenzel et al. | 705/1 |
| 2004/0254805 A1 | 12/2004 | Schwerin-Wenzel et al. | 705/1 |

OTHER PUBLICATIONS

Haltiwanger et al. "Cross-Country Evidence on Public Sector Retrenchment," 1999, The International Bank for Reconstruction and Development (World Bank).

DeWitt, "The Structural Consequences of Downsizing," Feb. 1993, Organizational Science, vol. 4, No. 1, pp. 30-40.

Davidson, "Early Retirement Programs and Firm Performance," Dec. 1996, Academy of Management Journal, vol. 39, No. 4, pp. 970-984.

ANPAS System (11 pages), www.webarchives.org, Apr. 2001.

Blackwell, "Job performance would decide raise," Richmond Times-Dispatch, May 7, 1997.

Campbell et al., "Self appraisal in performance evaluation: development versus evaluation," The Academy of Management Review, Apr. 1998.

Nixon, "Corporate downsizing: the effect of implementation strategies on firm performance," Texas A&M Univ., Dec. 1995 (thesis paper).

Aram et al., "An evaluation of organizational due process in the resolution of employee/employer conflict," The Academy of Management Review, Apr. 1981.

Lam et al., "Total quality management and performance appraisal: an experimental study of process versus results and group versus individual approaches," Jour. of Org. Behavior, Apr. 1999.

Knapp, "How to set up a reduction in force program," Jour. of Org. Excellence, Autumn 2001.

Kam, "Overhaul of state civil service system is sent to Gov. Bush, " South Florida Sun-Sentinel, May 5, 2001.

"India: HM's VRS Targets 6 pc Reduction in Workforce," Businessline, Jun. 8, 2001.

"Reduction in grade and removal based on unacceptable performance," 5 CFR Part 431, Feb. 23, 1987.

"National Institute of Standards and Technology," Alternative Personnel Management System, Federal Register, Oct. 21, 1997, v62, n203.

"Department of the Navy, Human Resources Implementation Guide" by Betty Welch, Department of the Navy Management Programs, Oct. 1, 1997.

US Office of Personnel Management, Restructuring Information Handbook, Module 3, Reduction in Force, Jun. 1998 version.

"Are you really managing your corporate resources?" by Robert Skinner, Management Accounting, v80, n2, Aug. 1998.

"IT Confidential" by John Soat, Information Week, Jul. 9, 2001.

Band et al., Strategic Downsizing, Management Decision, vol. 33, No. 8, 1995, pp. 36-45.

Applebaum et al., Strategic Downsizing: Critical Success Factors, Management Decision, vol. 37, No. 7, 1999, p. 535.

Roman, "Impact of an Early Retirement Program: A Case Analysis of a Community College," Dissertation submitted to the Kent State University School of Education, Aug. 1999.

Koeppen, et al., "Are Early Retirement Plans Cost Effective?" Management Accounting, Apr. 1990, pp. 34-37.

Beigbeder, "Easing Workforce Reduction," Risk Management, May 2000, vol. 47, Iss. 5., p. 26, 5 pages.

* cited by examiner

SYSTEM AND METHOD FOR RESOURCE REDUCTION RECEIPT LOG AND AUDIT TRAIL

BACKGROUND

1. Field of the Invention

The present invention relates to a system and method for managing human resources for an organization. More particularly, the present invention relates to a system and method tracking and logging receipts and maintaining an audit trail during a resource reduction.

2. Description of the Related Art

Managers in modern business organizations have increasingly complex roles to perform in managing the various facets of the business organization. While managers differ greatly in the objectives and goals of their respective departments or areas, a key element that most managers deal with are the employees in their department or area and their efforts to retain a highly talented pool of employees while staying within given resource requirements, such as salary and stock budgets. Analyzing and assessing organizational goals and objectives is also important in determining which employees to retain during resource reduction exercises.

Periodically, due to business conditions and business performance, organizations trim their workforces by terminating (i.e., laying off) surplus employee resources. Reducing the number of employees is usually a management intensive task wherein managers determine which employees are laid-off and which employees are retained. The typical goal of resource reduction activities is to retain the higher skilled workers in a given skill group and level while reducing the number of lower skilled employees or those employees that detract from the achievement of overall organizational goals.

Using traditional human resources tools, managers manually and subjectively determine which employees should be laid-off. Whether the manager analyzes employees' skills and past job performances is often a determination left to the individual managers. Because of this, managers' biases towards or against various employees often plays a most key role in actual determinations. Higher level managers typically lack fundamental data needed to make detailed analyses of managers' reduction decisions. Furthermore, higher level managers lack tools that would assist them in objectively reviewing managers' decisions in an efficient and timely basis. Because of these challenges, more skilled employees may be removed from the organization leaving less skilled employees to take their jobs. This talent void can be detrimental to the organization's technical and financial well being.

Additionally, traditional systems evaluate individual employees differently even though groups of employees are in similar skill groups. Managers of employees often evaluate employees based upon review criteria that is established loosely, at best, by the organization. Each manager may evaluate employees in his or her area differently based largely upon criteria developed by the manager, rather than the organization. Even if standard evaluation criteria is provided to management, there is little ability for program administers to check whether managers are actually using the standard evaluation materials.

Furthermore, the impact of a resource reduction action is typically difficult to analyze and even more difficult to estimate beforehand. When conducting a resource reduction exercise, the organization usually has a vague idea of the savings that will be achieved and the costs, in terms of severance packages and diminished employees, of the resource reduction. Impact estimates are often use crude formulas that simply reduce a percentage of the overall workforce without taking into account individual salaries in surplus skill groups. Likewise, the impact of the actual resource reduction is often difficult to ascertain without compiling lists of affected employees. These lists often do not indicate the numbers of surplus employees that were identified in various skill groups and levels.

Finally, traditional systems have little ability to assure that surplus employees are individually notified and little, if any, data is maintained evidencing employees' receipt of information regarding the resource reduction action. Some managers may fail to notify affected employees in a timely fashion and administrators of the resource reduction have little ability to ascertain which employees have been notified without manually surveying the affected employees. Surplus employees that are in possession of trade secrets or other confidential information are often not informed of their confidentiality, and often non-compete, obligations upon being laid-off from an organization.

What is needed, therefore, is a system and method that tracks and logs management notification of affected (i.e., surplus) employees.

SUMMARY

It has been discovered that a system and method that tracks surplus reduction actions addresses the aforementioned challenges. Managers and other decision makers take various actions regarding employees. These actions may include evaluating employees based on predefined criteria and identifying employees as surplus employees. Actions are recorded and tracked in a data store. Included with the action is an identifier of the manager, or decision maker, that performed the action. The identifier may include the decision maker's digital signature. Another action that is performed by the managers and decision makers is identifying those surplus employees that have knowledge of the organization's trade secrets or other confidential information. This identification is used in order to prepare non-compete agreements for such employees.

Affected (i.e., surplus) employees are notified that they have been selected as surplus. Affected employees, in turn, acknowledge such identification. The employees' acknowledgements are also recorded and tracked. In addition, those employees with non-compete obligations electronically sign non-compete agreements and such digital signatures are also recorded in the data store evidencing the employees' acknowledgment of such confidentiality and non-compete obligations. In one embodiment, electronic keys, such as user IDs and passwords, are sent to employees that acknowledge surplus actions and non-compete obligations. These electronic keys enable the affected employees to access materials, such as job databases and other relocation and employment information.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
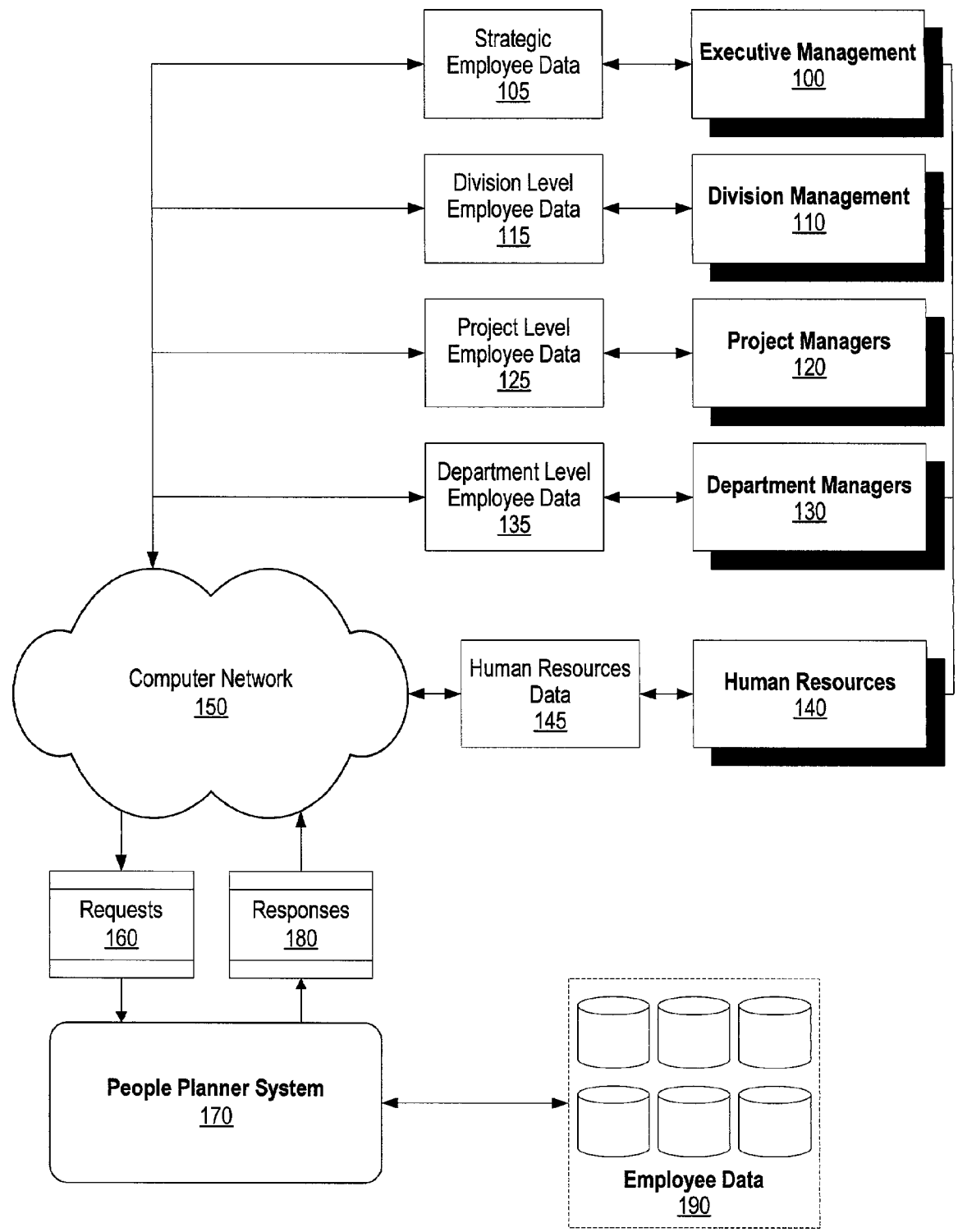
FIG. 1 is a high level diagram showing various layers of management using information managed and maintained by the People Planner System.

FIG. 1 is a high level diagram showing various layers of management using information managed and maintained by the People Planner System. Executive management 100 use People Planner System 170 to enter and view strategic employee data 105. For example, executive management 100 may use People Planner System 170 to analyze potential skill deficits or receive rollup information regarding risk assessments. This information can be used by executive management 100 to allocate additional resources to problem areas.

Division management 110 use People Planner System 170 to enter and view division level employee data 115. Division management 110 use People Planner System 170 similarly to executive management 100 except with a focus on the particular division within the organization. Again, problem areas reported by managers in employee evaluations and risk assessments can be used to provide additional resources to projects and to alert executive management to potential problems. In addition, employee analyses can be performed at high levels such as division management 110 and executive management 100 to determine whether employees with similar talents and experience levels are compensated and awarded similarly. Anomalies, such as poor performing employees receiving large salary increases and high performing employees receiving little or no salary increases can be identified, analyzed, and likely corrected.

Project managers 120 use People Planner System 170 to provide and view project level employee data 125. Project managers, like division and executive managers, can view information about any employee (including managers) reporting to the project manager. While executive management and division management may focus more on spotting anomalies and analyzing summary data to identify potential problems, project managers may often view individual employee information, especially to determine whether employees are being compensated and rewarded consistently and fairly by the department managers. Project managers 120 may also hold management meetings where People Planner System data pertaining to the department managers is excluded so that the management team can focus on the employees within the project and determine whether the employees are being treated fairly or whether poorer performing employees in one department are being evaluated as higher contributors to higher performing employees in another department. Discrepancies such as these can be resolved dynamically by the project manager or one of the department manager changing employee data. The revised employee data can thereafter be viewed and discussed. The process of refining the People Planner System data continues until the management team is satisfied with the information pertaining to all employees in the project.

Department managers 130 (i.e., immediate managers, foremen, direct supervisors) use People Planner System 170 to enter and view department level employee data 135. Department managers 130 use People Planner System 170 to evaluate employee performance, perform risk assessment, perform compensation and stock planning, complete or revise development plans for employees, perform retention plans for key employees identified as having executive potential or key technical potential, and provide additional data pertaining to employees that the manager wishes to attend HR programs or company events, such as special meetings, classes, or projects.

Human resources personnel 140 use People Planner System to assist various levels of management with personnel related questions and use People Planner System to view and enter human resources data 145. While assisting various levels of management, human resources 140 uses their skill and experience with analyzing employee data to aid management in making employee decisions and to assist managers in using People Planner System 170 to appropriately analyze the People Planner System information pertaining to the managers' employees. Human resources 140 also uses People Planner System to include new programs and events that can be used by managers with their employees. In addition, human resources 140 may determine when certain People Planner System functions take place. For example human resources 140 may determine when planning data is finalized and used as a basis for current, or actual, data to reflect employees' compensation changes, stock awards, and the like.

Computer network 150 is used to connect the various managers to People Planner System 170. Computer network 150 may be a local area network (LAN), a Wide Area Network (WAN), a mainframe computer with connected terminals, or a virtual private network (VPN) implemented over a public network such as the Internet. Computer network 150 receives People Planner requests 160 and passes the received requests to People Planner System 170. People Planner System 170 processes the request and maintains employee database 190 to store the data. In one embodiment, employee database 190 is a Lotus Notes™ database. In large organizations, employee data may be divided among several databases for performance and utilization reasons. In a distributed model, employee data for a particular area, such as a project or company location, may be located on the same database for improved maintenance of related employee records and improved lower level analyses. Higher level analyses use information summarized from the distributed databases in order to provide executive management 100 and perhaps division management 110 strategic employee data 105 and division level employee data 115. The People Planner System process request 160 and prepares and returns responses 180 which is viewed on the manager's display screen.

Figure 2:
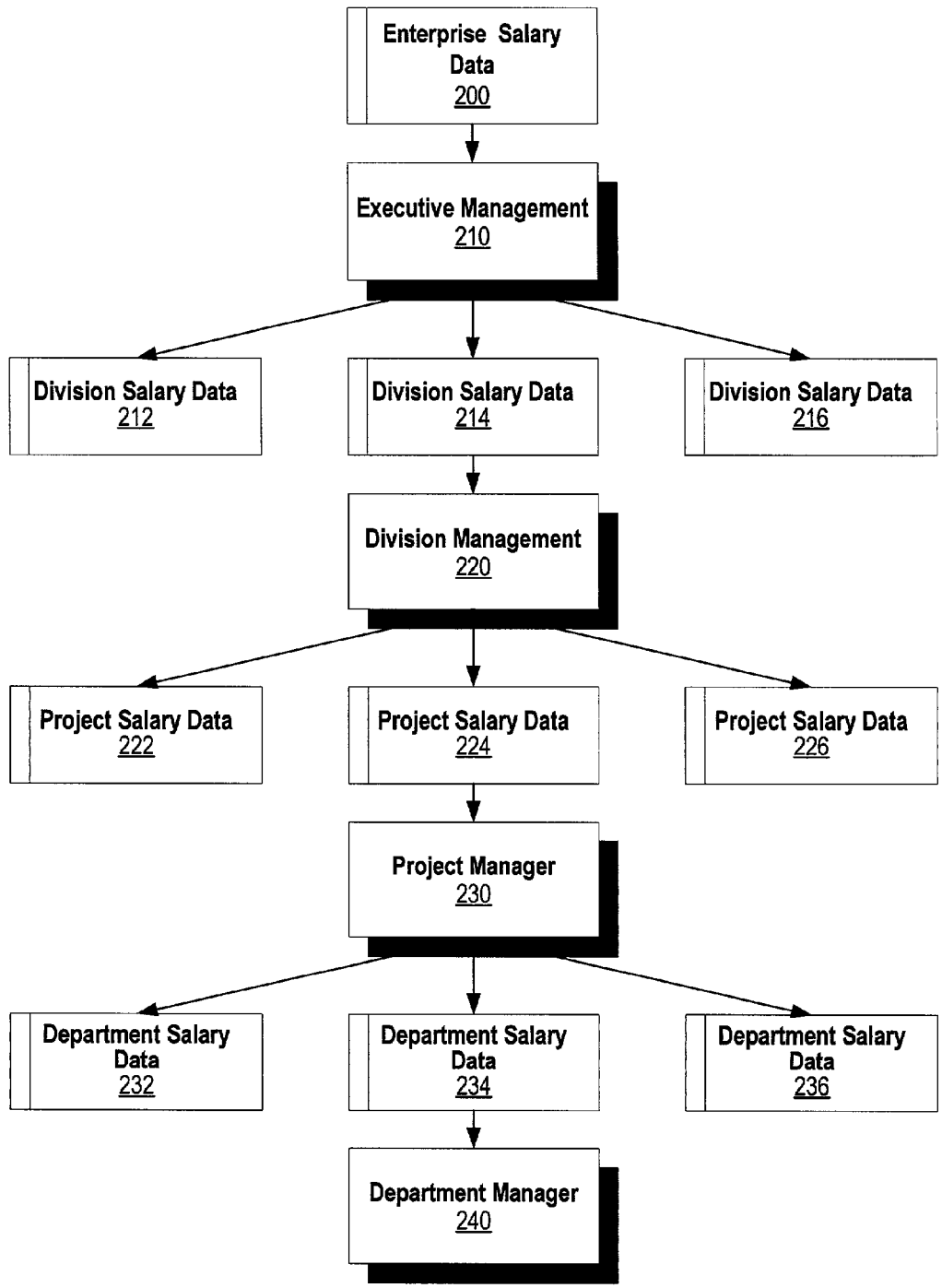
FIG. 2 is a hierarchy diagram showing resources, such as money used for salaries, being distributed and spread from high levels of the organization to lower levels of the organization.

FIG. 2 is a hierarchy diagram showing resources, such as money used for salaries, being distributed and spread from high levels of the organization to lower levels of the organization. A limited amount of compensatory resources 200 are available to distribute to employees. The amount of compensatory resources 200 depends on the size and economic health of the organization. If fewer resources are available than in previous years, executive management 210 may be forced to lower salaries or reduce the number of employees through voluntary or involuntary measures.

Executive management 210 determines how the available compensatory resources will be spread among the various high level divisions of the organization. In the example shown in FIG. 2, three division salary data are determined by executive management 210 (division salary data 212, division salary data 214, and division salary data 216). The division salary data is written to budget files available to the division managers in the People Planner System. The People Planner System is used by executive management 210 to aid in the division salary determination by providing executive management 210 with current salary needs of the various divisions, summaries of the employees and locations of the various divisions, and risk analysis information pertaining to the various divisions. The risk analysis information may alert executive management 210 to a potential situation where key types of employees, such as those with sought after technical skills, are at risk of leaving the organization. This type of information may prompt executive management to allot more to divisions at risk so that such skilled employees can be better compensated to avoid potential attrition problems. In addition, the People Planner System includes projected or planning data that aids in determining appropriate percentages of increases that should be allocated to the various divisions.

The division management, in turn, use the provided division salary data to determine how to spread the division compensatory amounts to areas, such as projects, within the division. In the example shown, division management 220 receives division salary data 214 from executive management. Division management 220 uses the People Planner System to allocate division salary data 214 to the various projects included in the division. Once again, the People Planner System is used to provide division management 220 with current salary needs of the various projects, summaries of the employees and locations of the various projects, and risk analysis information pertaining to the various projects. Division managers also use projected, or planning, data included in the People Planner System that was provided by lower levels of management. The People Planner System is used to distribute budget amounts to the various project managers. In the example shown in FIG. 2, division management 220 provides salary budgeting data to three projects. The budgeting data is provided to the projects through the People Planner System (project salary data 222, 224, and 226).

Project management uses the allocated project salary data to provide budget data to the various departments that are included in the project. The project manager's determinations are made at a more micro- rather than macro-level with individual employees' needs often used as a basis for the project manager's decisions. Again, the People Planner System is used to provide management, in this case project manager 230, with current salary needs of the employees, summaries of the employees and of the various departments, and risk analysis information pertaining to the various employees and projects. Project managers also use projected, or planning, data included in the People Planner System that was provided by immediate, or department, managers during prior planning cycles. The People Planner System is used to distribute budget amounts to the various department managers. In the example shown in FIG. 2, project manager 230 provides salary budgeting data to three departments using the People Planner System (department salary data 232, 234, and 236).

Department managers receive budget data from their project managers and use the budget data to plan compensatory changes for individual employees in the department manager's department. In the example shown, department manager 240 receives department salary budget data 234. The People Planner System is used to provide management, in this case department manager 240, with current salary needs of the employees in the department, summaries of the employees, and risk analysis information pertaining to the employees. Department manager 240 uses the People Planner System to plan compensatory changes and to record the planned changes in order for the department manager and higher levels of management to analyze the planned changes in light of the budget restraints.

The People Planner System is also used to move budget amounts between divisions, projects, and departments. For example, if a given department was initially allocated more money than deemed needed (for example, based on employee contributions and comparison of the employees' current salaries with those of employees in other departments), money that was initially allocated to the department may be reallocated by the project manager to a department that was initially under-funded. This same "give-and-take" can be applied to higher levels of the organization with the People Planner System used to identify possible areas for re-allocation and facilitate the transfer of budget amounts from one area to another.

Figure 3:
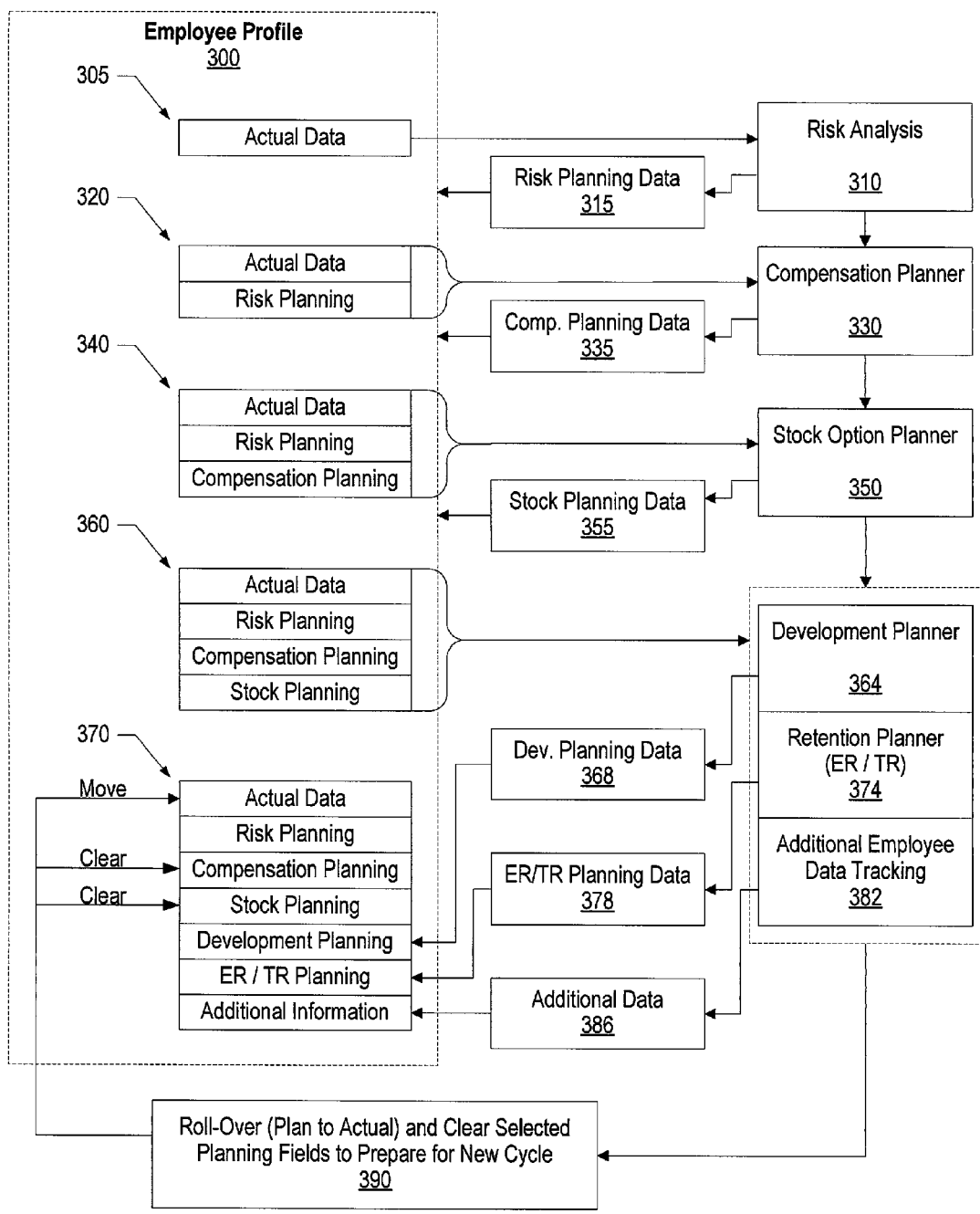
FIG. 3 is a data layer diagram showing various layer components being created to form an employee profile and how planning data is used to generate actual employment data.

FIG. 3 is a data layer diagram showing various layer components being created to form an employee profile and how planning data is used to generate actual employment data. Employee profile 300 includes actual and planning data corresponding to an employee. Actual data 305 includes information such as the employee's current salary and stock options that have been granted to the employee, the employee's current job title, level, and performance rating and any other information that the organization uses to track and assess employees. Actual data 305 may also include historical data, such as the employee's past salary levels, prior stock awards, and prior job titles, levels, and performance ratings.

The manager performs risk analysis 310 using the employee's actual data do determine the employee's value to the organization and the risk of the employee leaving the organization for other opportunities (see FIGS. 7-10 for detailed descriptions of risk analysis using the People Planner System). The manager's risk analysis is provided to the People Planner System as risk planning data 315. Employee profile 300 now has a richer set of data 320 for making further decisions regarding the employee's compensation and development.

Employee profile data 320 includes actual (or current) data as well as the risk planning data. This data is used by the manager in using the People Planner System's compensation planner 330. Based on the employee's actual data and the risk analysis data the manager is better equipped to plan changes to the employee's compensation. At this stage, compensation planning data 335 may simply identify the employee for a certain level of salary increase (i.e., significant increase, increase, cost of living increase, and no increase) it may actually plan a certain dollar-amount salary change for the employee. Compensation planning data 335 is used by the People Planner System to create an even richer set of data (340) that now includes actual data, risk planning data, and compensation planning data.

Employee profile data 340 is used by the People Planner System for the manager's stock planning 350. Actual data, risk planning data, and compensation planning data aids in the determination of whether to plan to give the employee stock options and, if so, how many options to plan on giving to the employee. Risk planning data is usually important during stock option considerations because the options typically vest over a period years providing an incentive for employees that may be at risk for leaving to stay in the organization until their options vest. In addition, the value of prior stock option awards is also useful in making the determination because prior options that are "under water" (i.e., the price of the option is now greater than the current price of the stock) have less influence on employees who are considering leaving the organization. In these situations, it may be prudent to grant additional options at the new (lower) current stock price to provide additional incentives to retain the employee. Stock planning data 355 is added to employee profile 300 creating an even richer set of employee profile data (360).

Compensatory considerations often include both compensatory planning considerations (step 330) as well as stock planning considerations (step 350). The manager may go back and forth between various stages in order to refine the data and better assess the employee's risk of leaving and the right mix of salary increases and stock option awards. For example, for a contributing employee that is at risk of leaving the organization, the manager may first decide to give the employee a significant increase in salary. However the employee's risk of leaving may be viewed as more important that the employee's current contribution. As such, the manager may decide to plan on giving the employee a sizable number of options that vest over a number of years and lower the salary increase to a standard increase, perhaps in light of salary budget constraints. The manager may go back and forth several times between compensation planning 330 and stock option planning 350 for a given employee until the manager feel she has the right mix. For additional assistance, the manager can use the People Planner System to engage the advice and experience of human resources personnel who are trained to help managers evaluate and analyze employee situations.

Employee profile 300 now includes employee data 360 which includes actual (current) employee data, risk planning data, compensation planning data, and stock planning data. Employee data 360 provides a picture for the manager to use in performing other activities such as development planning 364, retention planning 374, and identifying the employee for additional HR programs or organization events (382). Development planning 364 results in development planning data 368 which is added to the employee's profile data. Likewise, retention planning 374 results in retention planning data 378 and additional planning 382 results in additional employee data 386 which are each added to the employee's profile data. Retention planning 374 involves identifying employees with high potential early in the employee's career and establishing and tracking employee goals or milestones so that the full potential of such employees is realized by the organization (see FIG. 15 for more details regarding retention planning).

Employee profile data 370 now includes actual (current) data, risk planning data, compensation planning data, stock planning data, development planning data, retention planning data, and additional planning data providing a large snapshot of the employee, the employee's current contributions, opportunities and challenges associated with the employee, and near- and far-term plans for the employee's career with the organization.

The data captured in employee profile 300 is analyzed in management meetings and often refined in light of the employee's contribution and expected value in comparison with that of other employees. The salary and stock option planning may have only indicated that the organization planned to give the employee a "significant increase" or "significant stock option award" without specifying the actual dollar amount of the increase or the actual number of shares and vesting period for stock. In this case, the planned salary increase and stock option award are converted to actual dollar and stock figures in light of the salary and stock option budgets. The planned amounts are then made effective at a certain point in time during roll-over process 390.

During roll-over process 390 certain planning items, such as compensation and stock planning figures are moved to the employee's actual (current) data. Other items such as the employee's evaluation rating are also moved from planning areas to the actual data area. Prior actual figures are moved to historical actual data areas in order to keep a record of the employee's prior salaries, stock options, and evaluations. Short term planning data areas, such as the salary planning area and the stock planning area are cleared in order to prepare for the next planning cycle. The new actual data is used in a production environment to generate paychecks with the employee's new salary level and to generate stock option data that is provided to employees for acceptance of the newly granted options and eventual exercise of such options. Long term planning data, such as risk analysis data, development planning data, and retention planning data are retained for further refinement in future planning cycles so that the planning efforts of the manager are not lost or forgotten. In addition, when an employee moves from one department to another department (or when a new manager is assigned to a department) the new manager uses the People Planner System to view the planning and actual data established by the manager's predecessor, thus aiding and smoothing the transition from one manager to the next.

Figure 4:
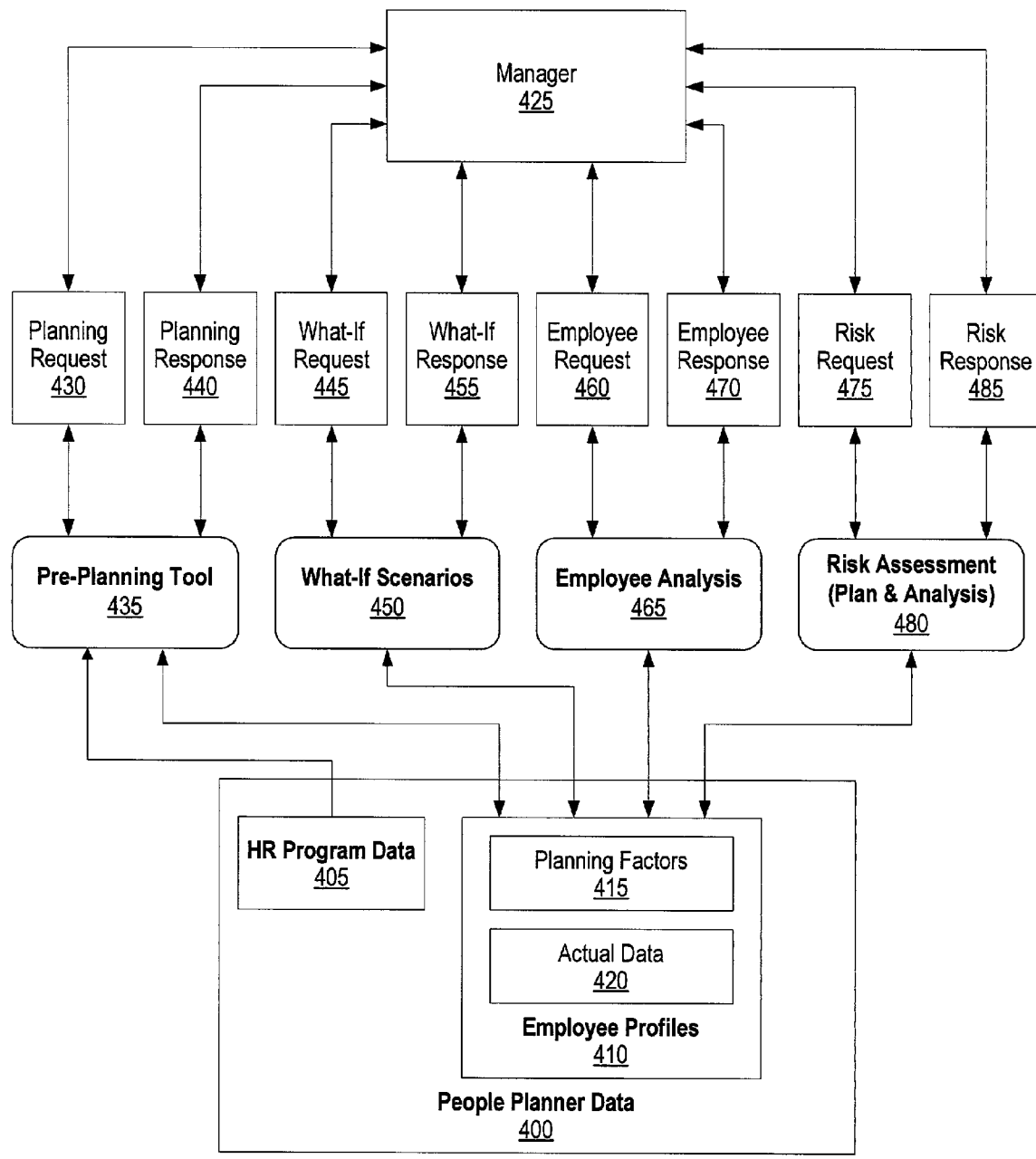
FIG. 4 is a diagram showing a manager using the People Planner System to perform planning and analysis functions.

FIG. 4 is a diagram showing a manager using the People Planner System to perform certain planning and analysis functions. People Planner Data 400 includes employee profiles 410 and Human Resources program data 405 as well as other data. Employee profile data 410 includes planning factors 415 (such as risk planning data, salary and stock planning data, development planning data, etc.) corresponding to employees. Employee profile data 410 also includes actual data 420 (such as the current salary, stock option grants, evaluation rating, etc.) corresponding to employees.

Manager 425 uses various components of the People Planner System to make pre-planning requests 430 to pre-planning tool 435 included with the People Planner System. Pre-planning tool 435 reads HR program data 405 and employee profile data 410 alerting the manager of new human resources programs and identifying employees that, based on the HR program criteria, might be considered for various programs. Manager 425 may select one or more employees for the HR program and provide planning response 440 which is used by pre-planning tool 435 to retain the manager's selections in selected employee profiles 410.

What-If Scenarios tool 450 is used by manager 425 to try various planning factors and explore the overall planning results without committing to the planning factors. For example, manager 425 may provide what-if request 445 to look at the department if everyone that is identified as being a high risk to leave the company was given a significant salary increase and an award of stock options. What-if results 455 would be returned to manager 425 by the what-if scenario tool and display the effect on the department. The manager may determine that too much of the salary budget would be used for these individuals and not leave enough for high contributing employees that are not at risk of leaving. Scenario tool 450 can be used repeatedly to help the manager gain an understanding of the effects of certain planning decisions. If manager 425 is satisfied with the scenario results, the planning factors used to create the results can be applied to employee profiles 410. In addition, HR personnel can share the manager's online view of such scenario results and provide guidance for refining the planning factors. If the what-if results are not acceptable by manager 425 then the planning factors used by the what-if tool can be discarded and not applied to employee profiles 410.

Employee analysis tool 465 is used by manager 425 to further analyze an individual employee or a group of employees included in employee profiles 410. Manager 425 provides employee requests 460 to the employee analysis component of the People Planner System. Manager 425 uses employee analysis tool 465 to evaluate the contributions of the employee and determine whether the employee is a low or high contributor and whether a promotion should be planned for the employee. These determinations are provided in the manager's employee responses 470 that are used by employee analysis component 465 and retained in employee profile 410. The manager's employee responses 470 may identify employees as low or high contributors and may also assign an evaluation rating (i.e., "A," "B," "C," etc.) to the employee (see FIG. 6 for further detail regarding employee evaluations using the People Planner System).

Risk assessment component 480 of the People Planner System is used by manager 425 to identify employees that are at risk of leaving the organization. Manager 425 provides risk requests 475 to risk assessment component 480 identifying one or more employees from employee profile 410. Risk assessment tool 480 assists the manager in evaluating risks concerning employees. Manager's risk responses regarding such employees is used by the risk assessment tool to update the employee's risk planning data maintained in the employee's employee profile 410.

Figure 5:
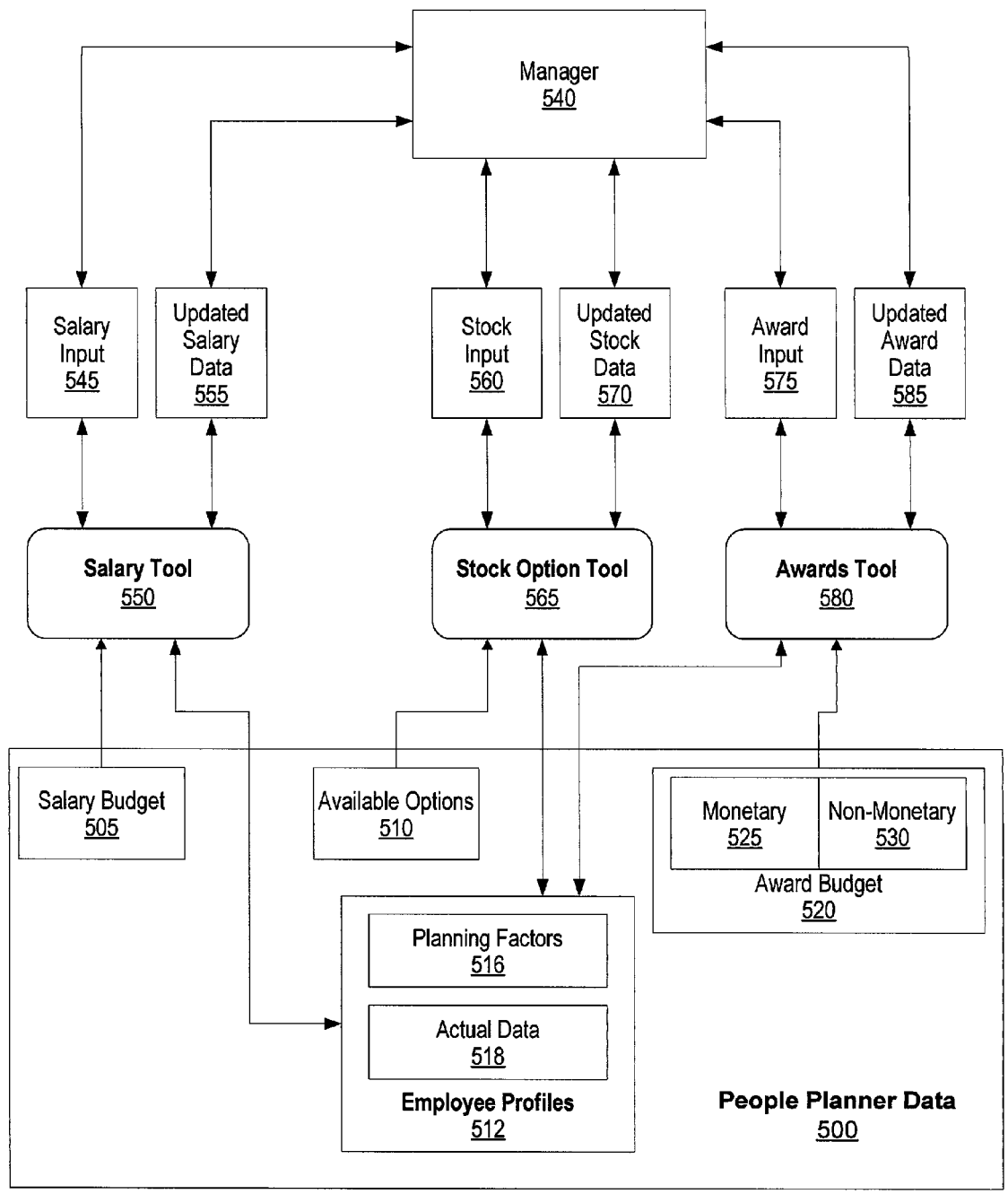
FIG. 5 is a diagram showing a manager using the People Planner System to perform compensation functions.

FIG. 5 includes additional People Planner System tools used by managers to plan for employee salary changes, stock options, and other awards. People Planner Data 500 includes salary budget data 505, available option data 510, employee profiles 512 and award budget data 520. Salary budget data 505 includes available salary data that has been allocated to the manager's area or department. Likewise, available option data 510 includes stock options available for the manager to grant to one or more employees. Employee profile data 512 includes planning factors data 516 and actual, or current, data 518. Award budget data 520 includes budgets for both monetary awards 525 and non-monetary awards 530. Non-monetary awards may include extra vacation days, admission to a special organizational event or program, lunch with an executive or the like.

Manager 540 uses salary tool component 550 of the People Planner System to plan salary changes for employees. Salary input 545 includes the salary changes requested by the manager. Salary tool 550 updates the appropriate employee profile planning factors 516 data for the selected employee. Salary tool 550 also provides manager 540 with updated salary planning data 555 comparing the manager's planning data for one or more employees with salary budget 505. Salary tool 550 can also be used to compare employee's actual data 518 and planning factors 516 with organizational, regional, or national averages for people with similar skills and contribution levels. Salary tool 550 can also be used to analyze whether people are being compensated fairly. For example, salary tool 550 can aid the manager in identifying high contributors that are receiving small or no salary increases. On the other side, salary tool 550 can be used to identify low contributing employees that are planned to receive large or significant salary increases.

Stock option tool 565 is a People Planner System component to aid manager 540 in identifying employees that should receive stock options. Stock option tool 565 reads the available stock option budget data 510 which includes the amount of options that are available for the manager's employees. Stock option tool 565 also reads employee profile data 512, particularly planning factors data 516 which includes risk planning data and contribution data corresponding to the employees. This information is used by manager 540 to determine whether the employee is a high contributor to the organization with critical skills and the flight risk the employee presents to the organization. Based on this analysis, manager 540 decides whether to plan to award the employee stock options and, if so, how many options to provide and the vesting period for the options (stock input 560). Updated stock data 570 is provided from stock option tool 565 to manager 540 in response to stock option input 560 provided by the manager. The manager can use the updated stock data to determine whether the stock planning data should be changed.

Awards tool 580 is a People Planner System component to aid manager 540 in identifying employees that should receive monetary and non-monetary awards. Awards tool 580 reads the available awards budget data 520 which includes the amount of monetary and non-monetary awards options that are available for the manager's employees. Awards tool 580 also reads employee profile data 512, particularly contribution data corresponding to the employees. This information is used by manager 540 to identify employees that are planned to receive an award, the type of award the employee is planned to receive, and the amount of the award if the award is monetary (award input 575). This data is stored in the appropriate employee profiles 512. Updated award data 585 is provided from awards tool 580 to manager 540 in response to award input data 575 provided by the manager. The manager can use the updated award data to determine whether the award planning data should be changed.

Figure 6:
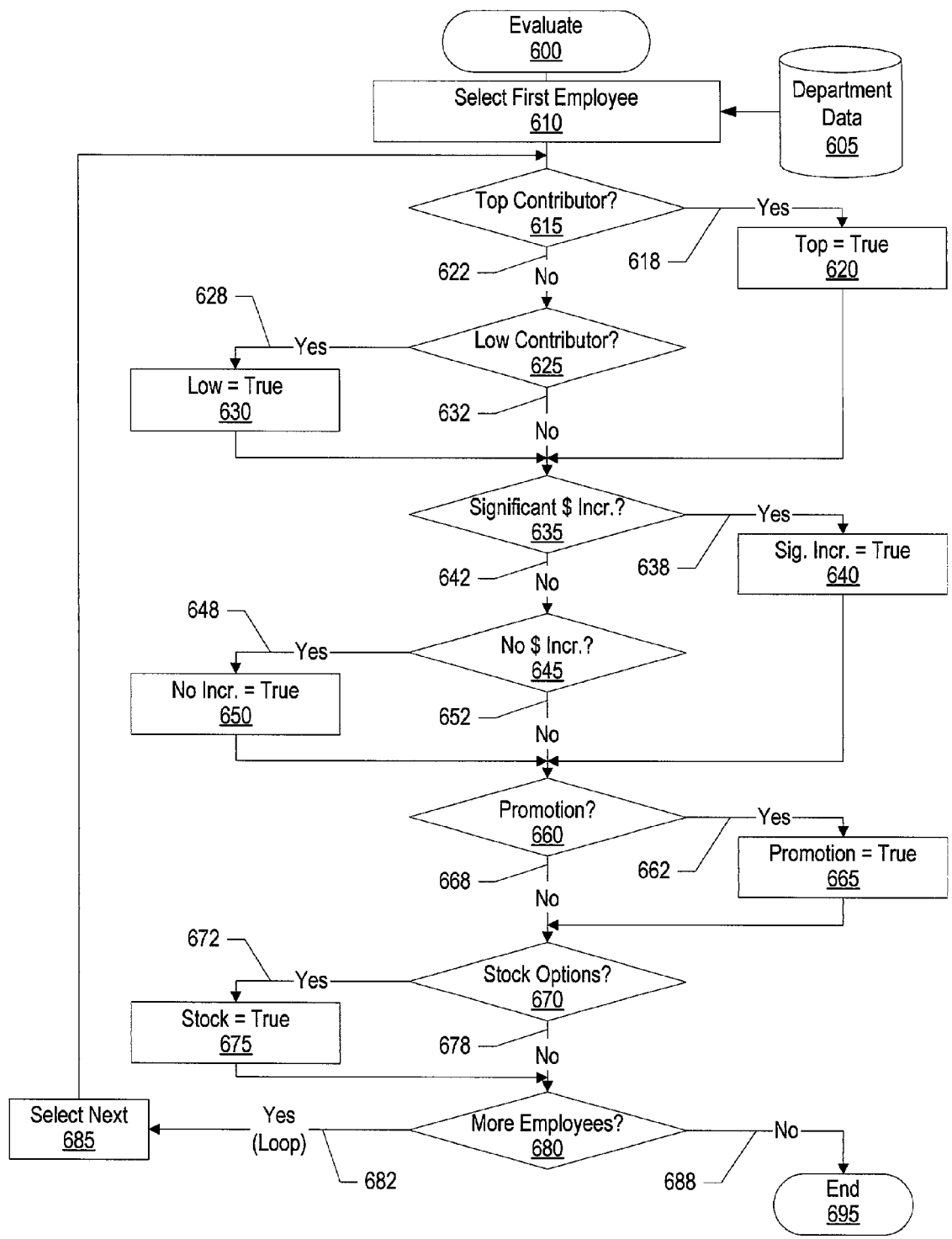
FIG. 6 is a flowchart showing the People Planner System being used to evaluate the performance of employees.

FIG. 6 is a flowchart showing the People Planner System being used to evaluate the performance of employees. Processing commences at 600 whereupon the first employee is selected (step 610) from department data 605 stored in the People Planner System. The manager analyzes the employee on a variety of planning factors. A determination is made as to whether the employee is a top contributor for the organization (decision 615). If the employee is a top contributor, decision 615 branches to "yes" branch 618 whereupon a flag is set in the employee's People Planner Data indicating that the employee is a top contributor (step 620). On the other hand, if the employee is not a top contributor, decision 615 branches to "no" branch 622 whereupon another determination is made as to whether the employee is a low contributor (decision 625). If the employee is a low contributor, decision 625 branches to "yes" branch 628 whereupon a flag is set in the employee's People Planner Data indicating that the employee is a low contributor (step 630). If neither flag is set (i.e. the low or high contributor flags) then the employee is deemed an average contributor to the organization.

The next decisions deals with the amount of pay increase to plan on giving the employee. A determination is made as to whether the employee should receive a significant, or high, increase in salary (decision 635). If the employee should receive a significant salary increase, decision 635 branches to "yes" branch 638 whereupon a flag is set in the employee's People Planner Data indicating that the employee should receive a significant salary increase (step 640). On the other hand, if the employee should not receive a significant salary increase, decision 635 branches to "no" branch 642 whereupon another determination is made as to whether the employee should receive no increase, or perhaps a salary reduction (decision 645). If the employee should receive no increase, or perhaps a salary reduction, decision 645 branches to "yes" branch 648 whereupon a flag is set in the employee's People Planner Data indicating that the employee should receive no increase, or perhaps a salary reduction (step 650). If neither flag is set (i.e. the significant increase or no increase flags) then the employee is planned to receive a normal salary increase.

A determination is made, based factors such as the employee's contribution to the organization, current level, and time spent at the current level, as to whether the employee should be promoted during the next cycle of promotions (decision 660). A higher level position often means greater potential salary and stock option awards. If the manager determines that the employee should be promoted based on various factors, decision 660 branches to "yes" branch 662 whereupon a flag is set in the employee's People Planner Data indicating that the employee should be promoted (step 685). On the other hand, if the manager does not decide that the employee should be promoted, decision 660 branches to "no" branch 668 bypassing the promotion setting step.

A determination is made, based factors such as the employee's skills, experience, contribution, and risk of the employee leaving the organization, as to whether the employee should receive stock options (decision 670). An employee with critical skills which are marketable to other competing organizations often receive stock options to provide an incentive for such employees to remain with the organization for the amount of time it takes for the options to vest. If the manager determines that the employee should receive stock options, decision 660 branches to "yes" branch 662 whereupon a flag is set in the employee's People Planner Data indicating that the employee should receive stock options (step 675). On the other hand, if the manager does not decide that the employee should receive stock options, decision 670 branches to "no" branch 678 bypassing the stock option setting step.

A determination is made as to whether there are more employees that the manager needs to evaluate (decision 680). If there are more employees, decision 680 branches to "yes" branch 685 which selects the next employee (step 685) from department data 605 and loops back to evaluate the employee. This looping continues until all employees have been evaluated, at which time decision 680 branches to "no" branch 688 whereupon processing ends at 695.

Figure 7:
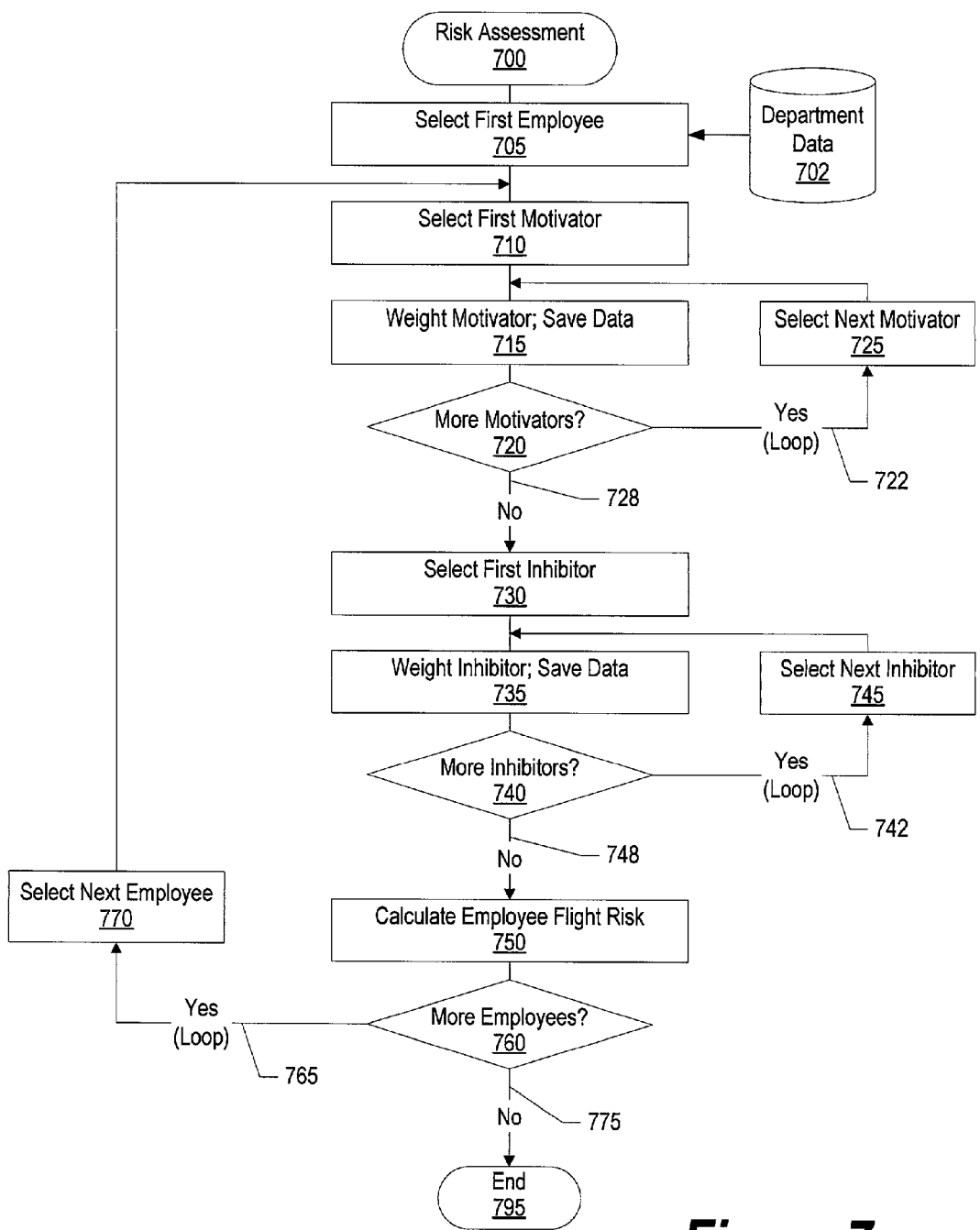
FIG. 7 is a flowchart showing a manager identifying employees' motivators and inhibitors and the People Planner System used to determine flight risks of individual employees.

FIG. 7 is a flowchart showing a manager identifying employees' motivators and inhibitors and the People Planner System used to determine flight risks of individual employees. Processing commences at 700 whereupon the first employee is selected (step 705) from department data 702 stored in the People Planner System.

The manager selects the first motivator for the selected employee (step 710). As the name implies, motivators are factors that motivate the selected employee in his or her job. Examples of motivators include autonomy, base salary, communication, decision making authority, degree of challenge, geographic location, immediate management, monetary recognition, and opportunity for advancement. By the manager's understanding of the employee's likes and dislikes and from discussions or feedback received from the employee, the manager determines what motivates the employee and what inhibits, or hinders, the employee. If the selected employee is motivated by autonomy, the manager selects autonomy as a motivator and then applies a weight, or level of importance, to the motivator (step 715). If an employee is greatly motivated by autonomy, a greater weight is applied to the motivator. The motivator and corresponding weight are saved in the employee's People Planner Data for future use in calculating the employee's flight risk.

A determination is made as to whether there are other motivators corresponding to the employee (decision 720). If there are more motivators, decision 720 branches to "yes" branch 722 whereupon the next motivator is selected (step 725) and a weight is applied (step 715). This looping continues until there are no more motivators to apply to the employee at which time decision 720 branches to "no" branch 728 whereupon the process repeats for identifying inhibitors that apply to the employee.

The manager selects the first inhibitor for the selected employee (step 730)). As the name implies, inhibitors are factors that inhibit the selected employee in his or her job. Examples of inhibitors include autonomy, base salary, communication, decision making authority, degree of challenge, geographic location, immediate management, monetary recognition, and opportunity for advancement. By the manager's understanding of the employee's likes and dislikes and from discussions or feedback received from the employee, the manager determines what inhibits, or hinders, the employee. If the selected employee is inhibited by opportunity for advancement, the manager selects opportunity for advancement as a inhibitor and then applies a weight, or level of importance, to the inhibitor (step 735). If an employee is greatly inhibited by opportunity for advancement, a greater weight is applied to the inhibitor. The inhibitor and corresponding weight are saved in the employee's People Planner Data for future use in calculating the employee's flight risk.

A determination is made as to whether there are other inhibitors corresponding to the employee (decision 740). If there are more inhibitors, decision 740 branches to "yes" branch 742 whereupon the next inhibitor is selected (step 745) and a weight is applied (step 735). This looping continues until there are no more inhibitors to apply to the employee at which time decision 740 branches to "no" branch 748.

The employee's flight risk is calculated (step 750) after the employee's motivators and inhibitors have been identified and weighed. The calculation may be performed by the manager by displaying the list of the employee motivators and inhibitors arranged by weighted value and providing the manager with employee data, such as salary data and job descriptions, to aid the manager in determining a flight risk value by comparing and contrasting the employee's motivators and inhibitors with the employees current circumstances. The flight risk calculation can also be computed using historical modeling data to compare the employee's motivators, inhibitors, and current job situation with other that have left the company. A strong similarity between the employee's profile and employees that left the organization results in a higher flight risk, while a weaker similarity results in a correspondingly lower flight risk.

A determination is made as to whether there are more employees for which the manager needs to assess risk (decision 760). If there are more employees, decision 760 branches to "yes" branch 765 which selects (step 770) the next employee from department data 702 and loops back to analyze the employee. This looping continues until all employees have been analyzed, at which time decision 760 branches to "no" branch 775 whereupon processing ends at 795.

Figure 8:
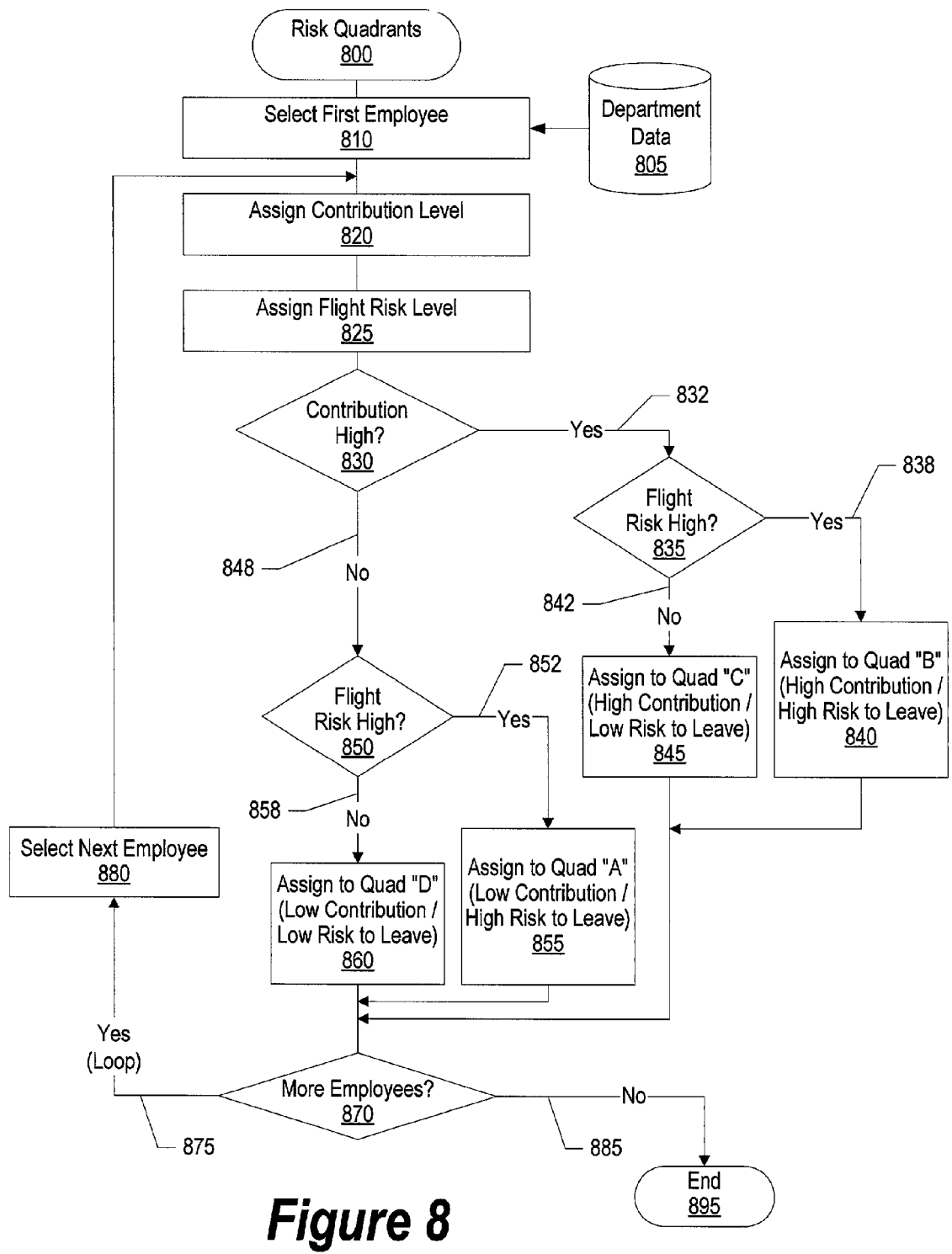
FIG. 8 is a flowchart used to group employees into contribution/flight risk quadrants for risk assessment.

FIG. 8 is a flowchart of logic used to group employees into contribution/flight risk quadrants for risk assessment. Processing commences at 800 whereupon the first employee is selected (step 810) from department data 805 stored in the People Planner System.

The employee's contribution level is assigned (step 820). In one embodiment, the employee's contribution level is assigned by performing an employee evaluation process integrated with the People Planner System, such as the process described in FIG. 6. The employee's flight risk is also assigned (step 825). In one embodiment, the employee's flight risk is assigned by performing an risk assessment process integrated with the People Planner System, such as the process described in FIG. 7.

Determinations are made based on the employee's contribution level and flight risk in order to assign a "risk quadrant" to the employee. Risk quadrants therefore include: employees with low contribution to the organization and high risk to leave the organization (quadrant "A"), employees with high contribution to the organization and high risk to leave the organization (quadrant "B"), employees with high contribution to the organization and low risk to leave the organization (quadrant "C"), and employees with low contribution to the organization and low risk to leave the organization (quadrant "D"). Grouping employees into risk quadrants aids management, especially upper management, in analyzing large groups of employees, such as a site location, and determining whether future attrition problems are likely based on the percentage of employees in quadrant "A" and especially quadrant "B." If problem areas exist, management can analyze employees in a given quadrant to determine if common inhibitors or motivators exist that can be used to encourage employees to remain with the organization.

A determination is made as to whether the selected employee's contribution to the organization is "high" (decision 830). If the manager indicates that the selected employee's contribution is high, decision 830 branches to "yes" branch 832 whereupon a decision is made as to whether, based on the employee's inhibitors and motivators, the employee presents a flight risk to the organization (decision 835). If the employee presents a flight risk, decision 835 branches to "yes" branch 838 whereupon the employee is assigned (step 840) to quadrant "B" indicating a high contributor presenting a high flight risk to the organization. On the other hand, if the employee does not present a flight risk, decision 835 branches to "no" branch 842 whereupon the employee is assigned (step 845) to quadrant "C" indicating a high contributor presenting a low flight risk to the organization.

Returning to decision 830, if the selected employee's contribution to the organization is not "high", decision 830 branches to "no" branch 848 whereupon a decision is made as to whether, based on the employee's inhibitors and motivators, the employee presents a flight risk to the organization (decision 850). If the employee presents a flight risk, decision 850 branches to "yes" branch 852 whereupon the employee is assigned (step 855) to quadrant "A" indicating a low contributor presenting a high flight risk to the organization. On the other hand, if the employee does not present a flight risk, decision 850 branches to "no" branch 858 whereupon the employee is assigned (step 860) to quadrant "D" indicating a low contributor presenting a low flight risk to the organization.

A determination is made as to whether there are more employees that need to be assigned to a risk quadrant (decision 870). If there are more employees, decision 870 branches to "yes" branch 875 which selects (step 880) the next employee from department data 805 and loops back to assign the employee to a risk quadrant. This looping continues until all employees have been analyzed, at which time decision 870 branches to "no" branch 885 whereupon processing ends at 895.

Figure 9:
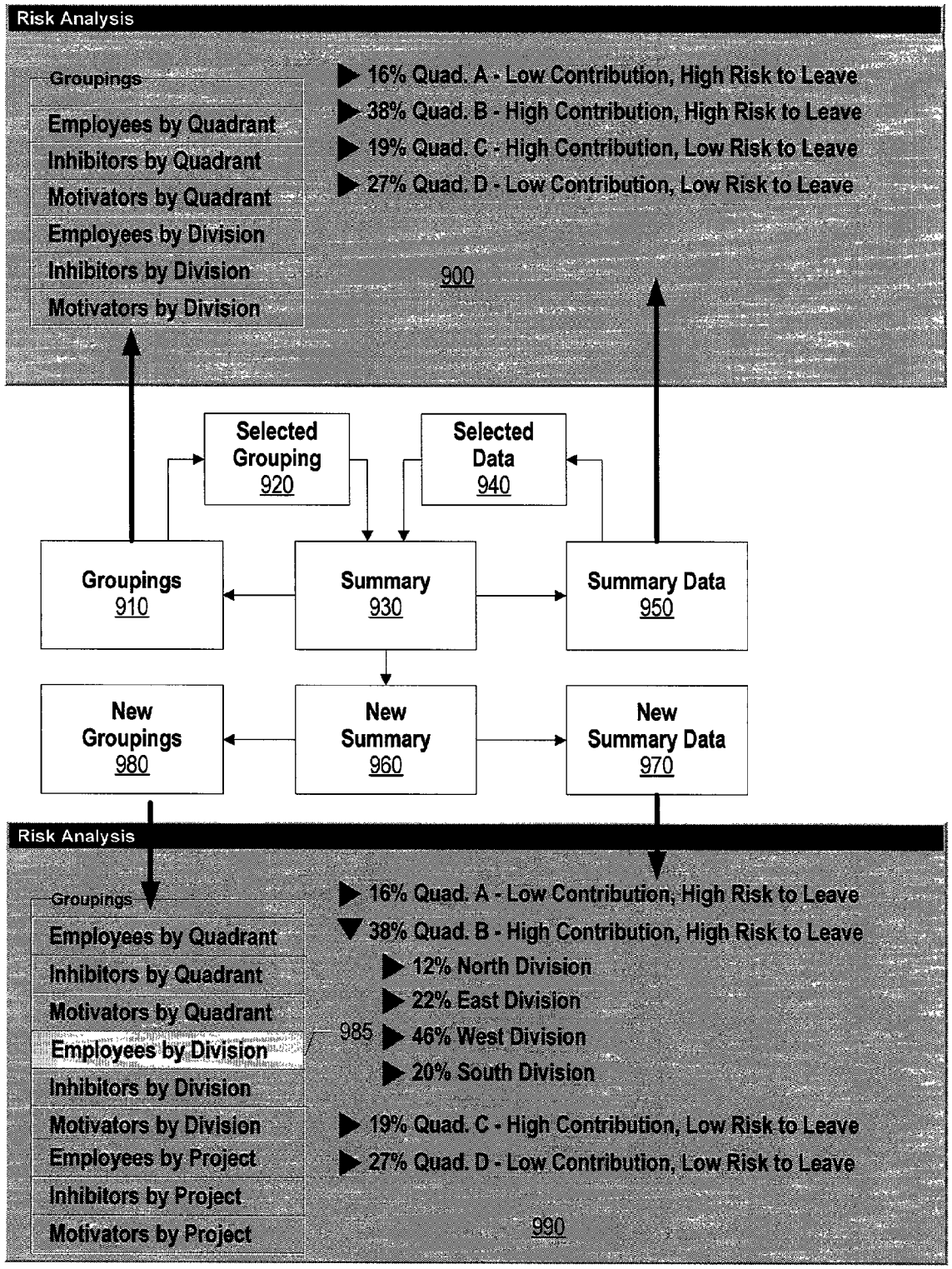
FIG. 9 is a user interface and logic for organizational risk analysis concerning employees.

FIG. 9 is a user interface and logic for organizational risk analysis concerning employees. Screen 900 shows a risk analysis summary showing the percentage of employees that were assigned to the various risk quadrants. Screen 900 includes groupings 910 and summary data 950. The user selects one of the groupings and a summary data item. Selected grouping 920 and selected data 940 are used by summary process 930 to create new summary process 960 which has new groupings 980 based upon the previously selected grouping. New summary 960 also includes new summary data 970 based upon the previously chosen grouping and summary data item. The new summary, including new groupings 980 and new summary data 970 are displayed in screen 990. In the example shown, the user selected the grouping 985 ("Employees by Division") and selected the "B" quadrant. The division breakdown for the "B" quadrant is therefore shown in screen 990. Further groupings and selected data items can be selected to more fully understand the risk analysis data.

Figure 10:
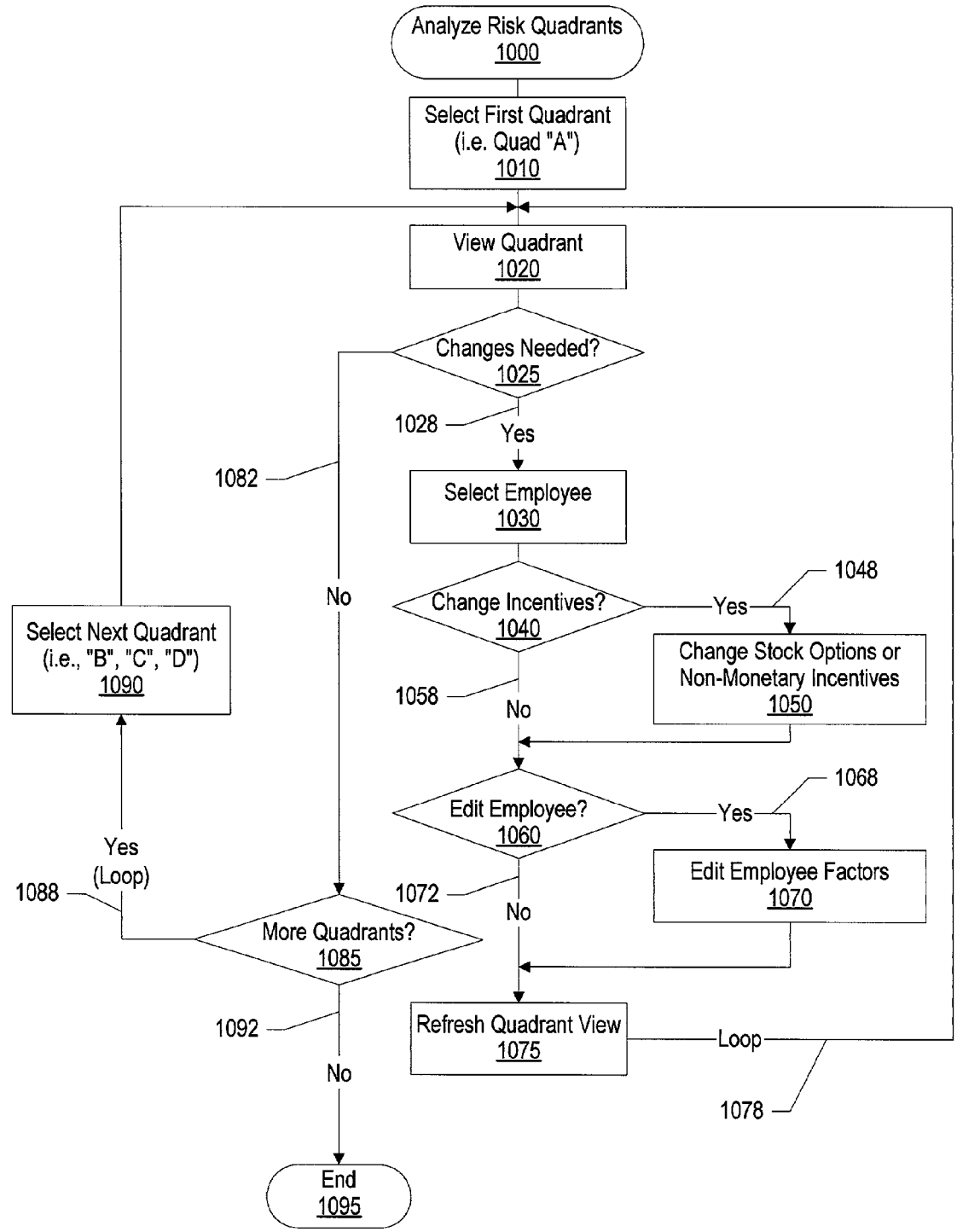
FIG. 10 is a flowchart used to analyze risk quadrants and act upon identified employees.

FIG. 10 is a flowchart used to analyze risk quadrants and act upon identified employees. Processing commences at 1000 whereupon the first risk quadrant (i.e. Quadrant "A") is selected (step 1010). The selected quadrant is displayed to the manager (step 1020, see FIG. 9, screen 900 for an example quadrant view). The manager analyzes the risk quadrant data to determine whether changes are needed (step 1025, see FIG. 9, screen 990 for an example of analyzing risk quadrants). Risk quadrants can be analyzed down to viewing the group of employees that are included in a particular risk quadrant. A determination is made by the manager is changes are needed to any employees within the currently viewed risk quadrant (decision 1025). If changes are needed, decision 1025 branches to "yes" branch 1028 whereupon an employee in the risk quadrant is selected (step 1030). A determination is made as to whether changes are needed to the employee's incentives (decision 1040). If changes are needed to the selected employee's incentives, decision 1040 branches to "yes" branch 1048 whereupon the manager makes changes to the employee's planned nomination for stock options or other non-monetary award incentives designed to retain employees (step 1048). If changes are not needed to the selected employee's incentives, decision 1040 branches to "no" branch 1058 bypassing changes to the employee's stock options and non-monetary awards.

Another determination is made as to whether to edit the employee data, such as risk planning data (decision 1060). This determination may be in light of seeing the employee in a quadrant that does not match manager's knowledge of the employee or in light of new information learned about the employee's inhibitors or motivators. In addition, this decision might be made because of a recent or dramatic change in the employee's contribution or value to the organization based on newly acquired skills or experiences. If changes are needed to the employee's People Planner Data, decision 1060 branches to "yes" branch 1068 whereupon the manager edits one or more employee planning factors (step 1070). On the other hand, if the manager does not need to edit the employee's planning factors, decision 1060 branches to "no" branch 1072 bypassing the edit employee planning factors step.

After changes are made to the selected employee the quadrant data view is updated to reflect the changed information (step 1075) and processing returns (loop 1078) to view the quadrant information. This looping continues until no changes are needed, at which point decision 1025 branches to "no" branch 1082.

A determination is made as to whether there are more quadrants to analyze (decision 1085). If there are more quadrants to analyze, decision 1085 branches to "yes" branch 1088 whereupon the next quadrant is selected (step 1090) and processing loops back to analyze the selected quadrant. This looping continues until there are no more quadrants to analyze, at which point decision 1085 branches to "no" branch 1092 and risk analysis processing ends at 1095.

Figure 11:
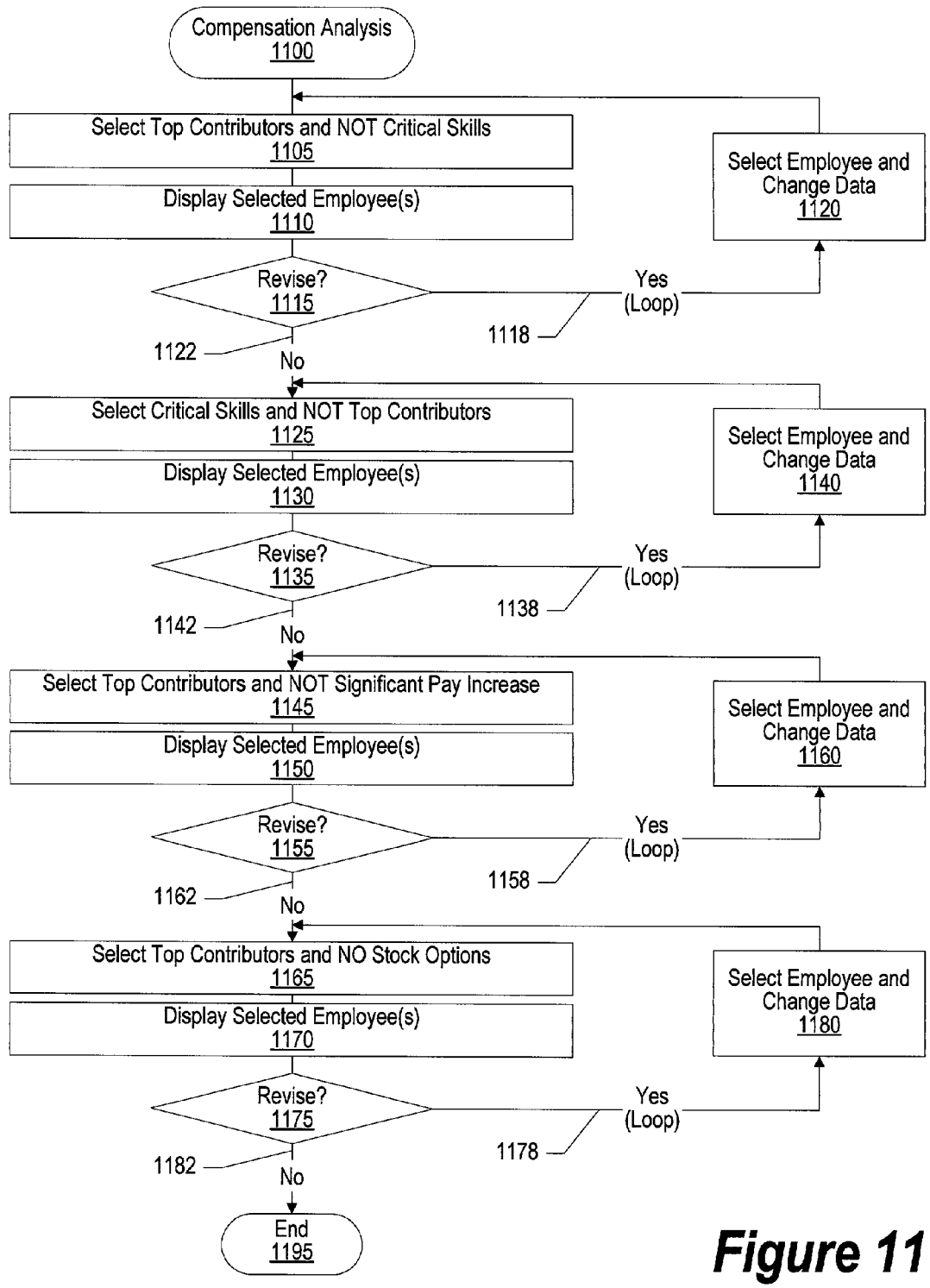
FIG. 11 is a flowchart used to analyze compensation of high contributing employees.

FIG. 11 is a flowchart used to analyze compensation of high contributing employees. The immediate (i.e., department) manager may perform the analysis in addition to higher level managers and HR personnel checking the fairness of employee evaluations.

Processing commences at 1100 whereupon the People Planner System selects top contributing employees that have not been identified as having critical skills (step 1105). Top contributing employees often have critical skills that make them valuable, and therefore high contributors, to the organization. This selection helps management analyze why an employee has been identified as a top contributor without critical skills. It may be that the employee's critical skills were not noted or that the employee was incorrectly identified as a top contributor. In some cases, it may simply be that an employee without critical skills is a top contributor because of the employee's work ethic and ability to handle more tasks in a high quality manner. The selected employees are displayed to the manager (step 1110). The manager views the selected employees and can view detailed data regarding the employees. A determination is made as to whether an employee's data in the People Planner System needs to be changed in light of the displayed data (decision 1115). If an employee's data needs to be changed, decision 1115 branches to "yes" branch 1118 whereupon an employee is selected and data pertaining to the employee is changed (step 1120) and processing loops back to re-analyze the group in light of the changed data. This looping continues until no employee data needs to be revised, at which time decision 1115 branches to "no" branch 1122.

Another selection identifies employees having critical skills that have not been identified as top contributing employees (step 1125). This is the reverse situation as the selection performed in step 1105. The selected employees are displayed to the manager (step 1130). The manager views the selected employees and can view detailed data regarding the employees. A determination is made as to whether an employee's data in the People Planner System needs to be changed in light of the displayed data (decision 1135). If an employee's data needs to be changed, decision 1135 branches to "yes" branch 1138 whereupon an employee is selected and data pertaining to the employee is changed (step 1140) and processing loops back to re-analyze the group in light of the changed data. This looping continues until no employee data needs to be revised, at which time decision 1135 branches to "no" branch 1142.

A further selection identifies employees identified as top contributing employees that are not receiving a significant pay increase (step 1145). Top contributing employees need to be rewarded for their efforts. In some cases, analysis of an employee in this group may reveal an employee that, for some reason, is currently overpaid in light of the employee's position, job title, and level and therefore does not require a significant salary increase. In other cases, an oversight may have occurred in not planning significant salary increases for top contributing employees. The selected employees are displayed to the manager (step 1150). The manager views the selected employees and can view detailed data regarding the employees. A determination is made as to whether an employee's data in the People Planner System needs to be changed in light of the displayed data (decision 1155). If an employee's data needs to be changed, decision 1155 branches to "yes" branch 1158 whereupon an employee is selected and data pertaining to the employee is changed (step 1160) and processing loops back to reanalyze the group in light of the changed data. This looping continues until no employee data needs to be revised, at which time decision 1155 branches to "no" branch 1162.

Another selection identifies employees identified as top contributing employees that are not receiving a grant of stock options (step 1165). Top contributing employees need to be rewarded for their efforts and stock options present an incentive for such top contributing employees to remain at the company. In some cases, analysis of an employee in this group may reveal an employee that does not warrant a stock option grant. For example, an high contributing employee with little flight risk may prefer awards and greater salary increases instead of stock options. In other cases, an oversight may have occurred in not planning stock option awards for top contributing employees. The selected employees are displayed to the manager (step 1170). The manager views the selected employees and can view detailed data regarding the employees. A determination is made as to whether an employee Is data in the People Planner System needs to be changed in light of the displayed data (decision 1175). If an employee's data needs to be changed, decision 1175 branches to "yes" branch 1178 whereupon an employee is selected and data pertaining to the employee is changed (step 1180) and processing loops back to re-analyze the group in light of the changed data. This looping continues until no employee data needs to be revised, at which time decision 1175 branches to "no" branch 1182 whereupon this phase of compensation planning ends at 1195.

Figure 12:
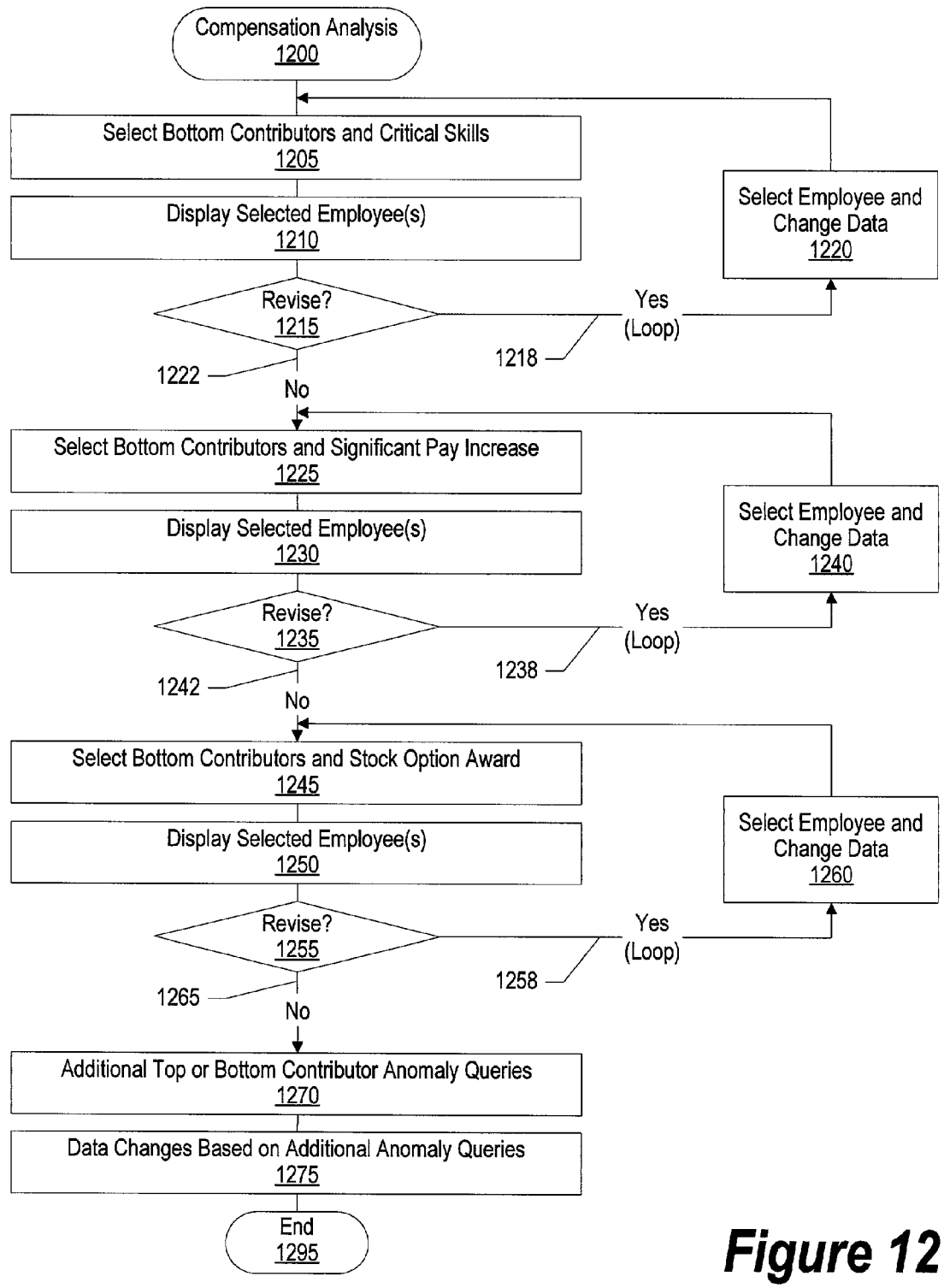
FIG. 12 is a flowchart used to analyze compensation of low contributing employees.

FIG. 12 is a flowchart used to analyze compensation of low contributing employees and to query additional anomalies with high and low contributors. The immediate (i.e., department) manager may perform the analysis in addition to higher level managers and HR personnel checking the fairness of employee evaluations.

Processing commences at 1200 whereupon the People Planner System selects low contributing employees that have been identified as having critical skills (step 1205). Low contributing employees often do not have critical skills. This selection helps management analyze why an employee has been identified as a low contributor with critical skills. It may be that the employee's critical skills were incorrectly noted or that the employee was incorrectly identified as a low contributor. In some cases, it may simply be that an employee with critical skills is a low contributor because of the employee's work ethic or attitude and inability to handle tasks in a quality manner. The selected employees are displayed to the manager (step 1210). The manager views the selected employees and can view detailed data regarding the employees. A determination is made as to whether an employee's data in the People Planner System needs to be changed in light of the displayed data (decision 1215). If an employee's data needs to be changed, decision 1215 branches to "yes" branch 1218 whereupon an employee is selected and data pertaining to the employee is changed (step 1220) and processing loops back to re-analyze the group in light of the changed data. This looping continues until no employee data needs to be revised, at which time decision 1215 branches to "no" branch 1222.

Another selection identifies employees identified as low contributing employees that are receiving a significant pay increase (step 1225). Low contributing employees typically are not rewarded as handsomely as higher contributing employees. In some cases, analysis of an employee in this group may reveal a low contributing employee that, for some reason, is currently underpaid in light of the employee's position, job title, and level and therefore requires a significant salary increase. In other cases, an oversight may have occurred in planning significant salary increases for low contributing employees. The selected employees are displayed to the manager (step 1230). The manager views the selected employees and can view detailed data regarding the employees. A determination is made as to whether an employee's data in the People Planner System needs to be changed in light of the displayed data (decision 1235). If an employee's data needs to be changed, decision 1235 branches to "yes" branch 1238 whereupon an employee is selected and data pertaining to the employee is changed (step 1240) and processing loops back to re-analyze the group in light of the changed data. This looping continues until no employee data needs to be revised, at which time decision 1235 branches to "no" branch 1242.

A further selection identifies employees identified as low contributing employees that are receiving a grant of stock options (step 1245). Analysis of these employees may reveal an employees that do not warrant stock option grants. It may also be revealed that some employees in this group are not low contributors and have been identified as such incorrectly. The selected employees are displayed to the manager (step 1250). The manager views the selected employees and can view detailed data regarding the employees. A determination is made as to whether an employee's data in the People Planner System needs to be changed in light of the displayed data (decision 1255). If an employee's data needs to be changed, decision 1255 branches to "yes" branch 1258 whereupon an employee is selected and data pertaining to the employee is changed (step 1260) and processing loops back to re-analyze the group in light of the changed data. This looping continues until no employee data needs to be revised, at which time decision 1255 branches to "no" branch 1262.

Further top and bottom contributor queries can be performed to further identify anomalies with the planning factors currently in place for individual employees (step 1270). People Planner Data pertaining to these employees can be changed as needed to better reflect the employees' contributions and rewards and compensation for such contributions (step 1280). Compensation planning thereafter ends at 1295.

Figure 13:
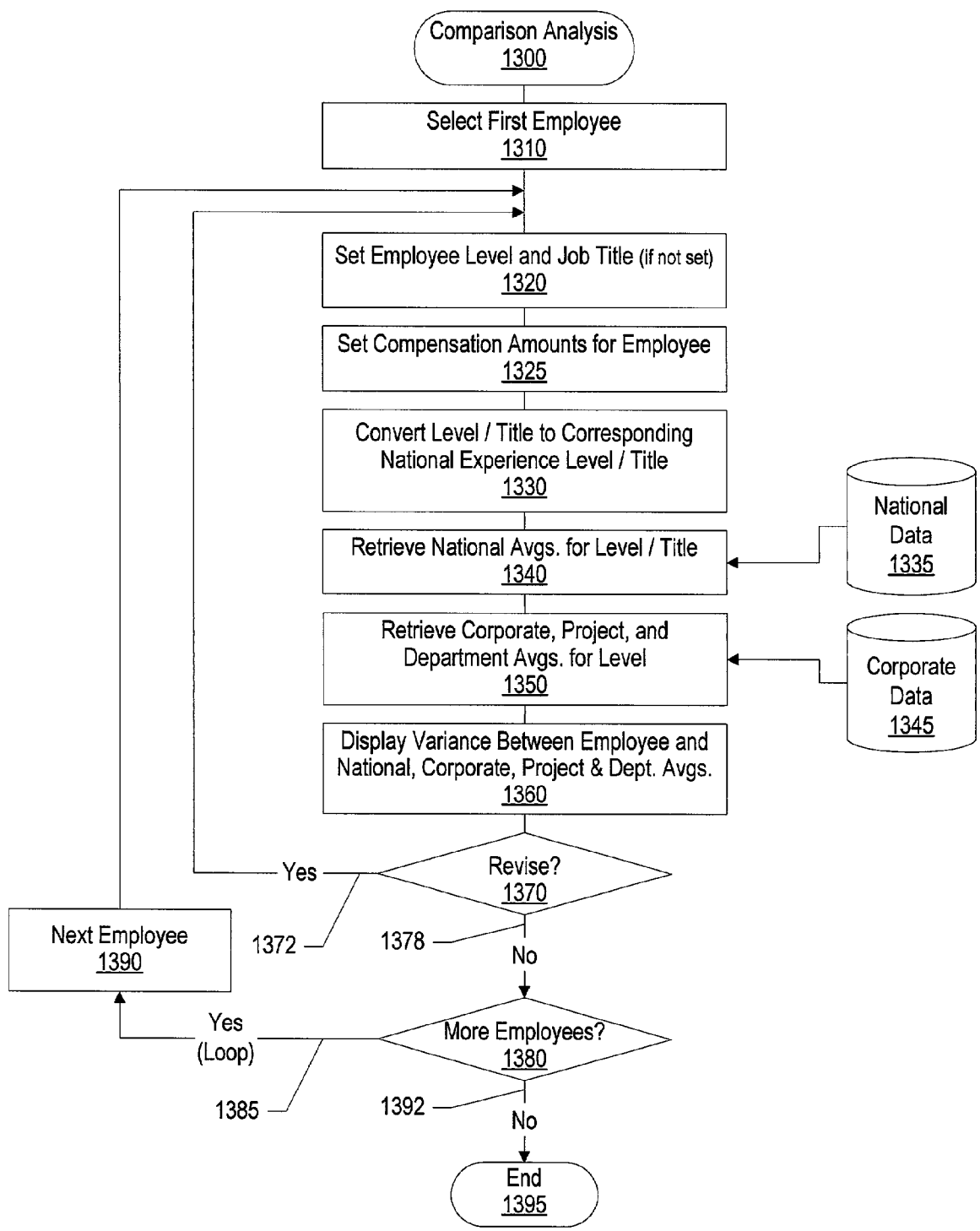
FIG. 13 is a flowchart showing details involved with comparing employees' compensation using benchmark information.

FIG. 13 is a flowchart showing details involved with comparing employees' compensation using benchmark information. Processing commences at 1300 whereupon the first employee in a group, such as a department or project, being analyzed is selected (step 1310). From prior People Planner System processes, the employee should already have a job level and job title, however if the employee is new or otherwise does not have a level and job title this data is supplied to the People Planner System and stored in the employee's People Planner Data area (step 1320). In addition, compensation levels should already be set for the employee's current compensation and salary planning data for the employee's next pay increase may already be stored in the People Planner System. If the employee does not have a current salary, then the employee's current compensation amounts are entered into the People Planner System (step 1325).

The employee's job title and level (i.e., "Senior Programmer") are converted to a corresponding national or geographic job title and level (i.e., "software programmer with 5 or more years of experience") using a table relating the company's job titles and levels to nationally recognized titles and levels (step 1330). The national job title and level is used to search (step 1340) national or geographic employment data 1335 for national averages and other data about national salary ranges for the job title and level (i.e., average salary for first, second, third and fourth quartiles, etc.). Other averages are retrieved from the People Planner System for the salary data regarding the employee's job title and level within the organization (step 1350). This data may be for the organization as a whole, the employee's site, project, or department or combinations thereof.

Variances between the employees actual (and possibly planned) compensation and various retrieved national and organizational benchmarks is displayed to management or human resources personnel (step 1360). Large variances indicating that an employee is underpaid may warrant changing the employee's planning data, for example to identify the employee for a significant increase, to get the employees salary in line with the benchmark data. A determination is made as to whether the employee's data needs to be revised (decision 1370). If the employee's data needs to be revised, decision 1370 branches to "yes" branch 1372 which loops back to enable management or human resources to reset employee information (i.e., compensation amounts) and redisplay the new planning factors in comparison with the available benchmarks. This looping continues until no further revisions to the employee's data are needed, at which point decision 1370 branches to "no" branch 1378 whereupon a determination is made as to whether there are more employees to analyze (decision 1380).

If there are more employees to analyze, decision 1380 branches to "yes" branch 1385 which selects the next employee (step 1390) and loops back to perform a comparison analysis for the selected employee. This looping continues until no more employees in the selected group need to be processed, at which time decision 1380 branches to "no" branch 1392 and processing ends at 1395.

Figure 14:
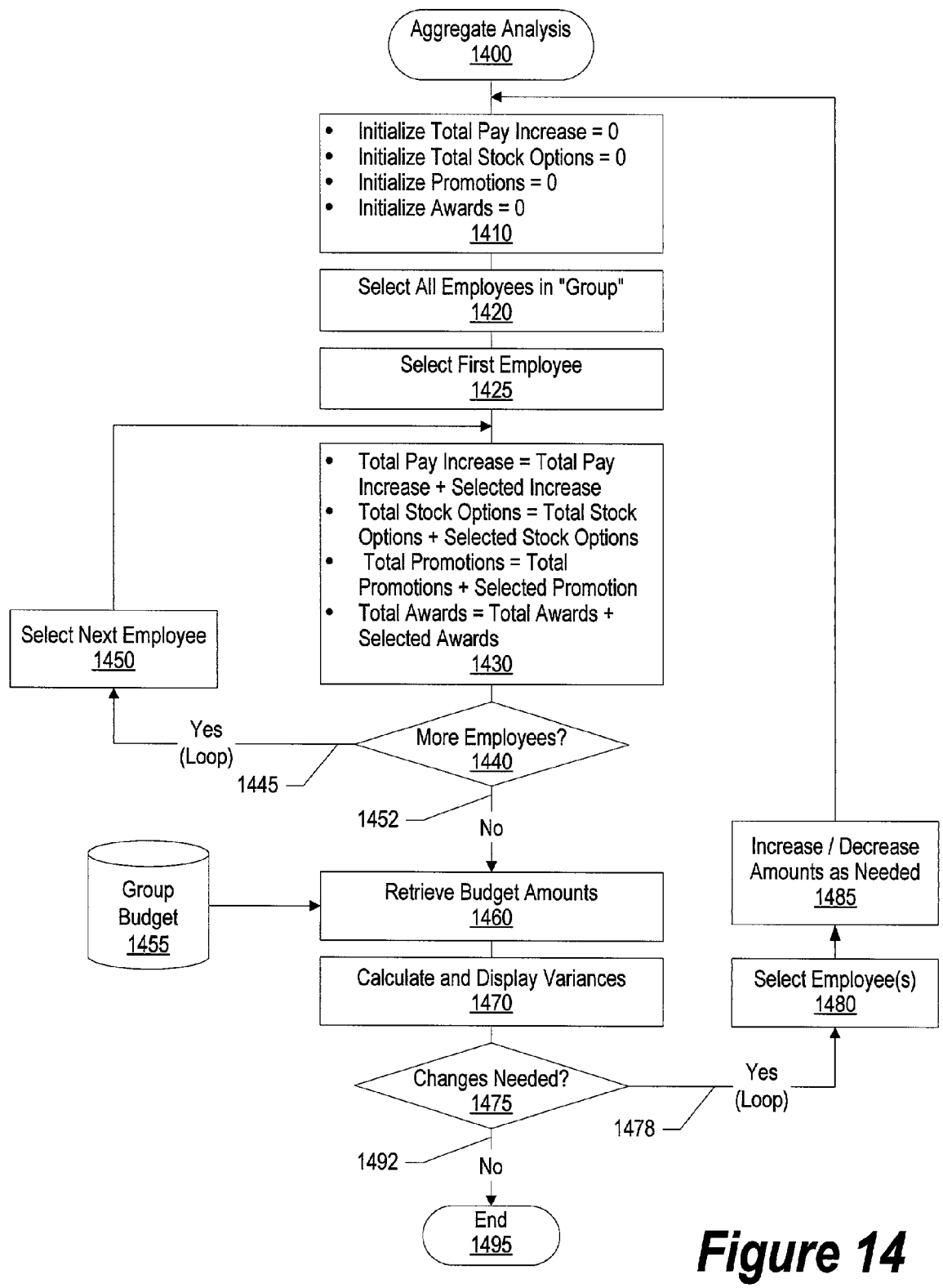
FIG. 14 is a flowchart showing details involved with aggregate analysis of a department or area and comparison against budgetary requirements.

FIG. 14 is a flowchart showing details involved with aggregate analysis of a department or area and comparison against budgetary requirements. Processing commences at 1400 whereupon various compensation counters, such as total pay increases, total stock options, total promotions, and total awards, are initialized to zero (step 1410). People Planner Data for all employees within a particular group, such as a project or department, are selected from the People Planner Data (step 1420). The first employee from the selected group is selected (step 1425). The counters for planned pay increases, stock options, promotions and awards are accumulated by adding the current value of such counters to the planned pay increase, planned stock option grant, planned promotion, and planned awards for the currently selected employee (step 1430). A determination is made as to whether more employees exist in the group to be processed (decision 1440). If more employees exist, decision 1440 branches to "yes" branch 1445 and the next employee in the group is selected (step 1450) and processing loops back to add the selected employees compensatory information to the running totals stored in the counters. This looping continues until all employees in the group have been processed and all planned pay increases, stock awards, promotions, and awards have been totaled. When all employees have been processed, decision 1440 branches to "no" branch 1452 whereupon budget amounts are retrieved (step 1450) from group budget data 1455 (such as a department or project budget). Variances between the planned salary increases, stock awards, promotions, and awards and budgeted amounts are calculated and displayed (step 1470). A determination is made, based on the displayed variances, as to whether changes are needed to employee planning factors to rectify any variances (decision 1475). If changes are needed, decision 1475 branches to "yes" branch 1478 which allows management or human resources personnel to select one or more employees (step 1480), increase or decrease planned salary increases, stock awards, promotions, and awards (step 1485), and loop back to the beginning to reprocess the group and determine any further variances and changes needed. This looping continues until variances have been rectified and further changes to employee data is not needed, at which point decision 1475 branches to "no" branch 1492 and processing ends at 1495.

Figure 15:
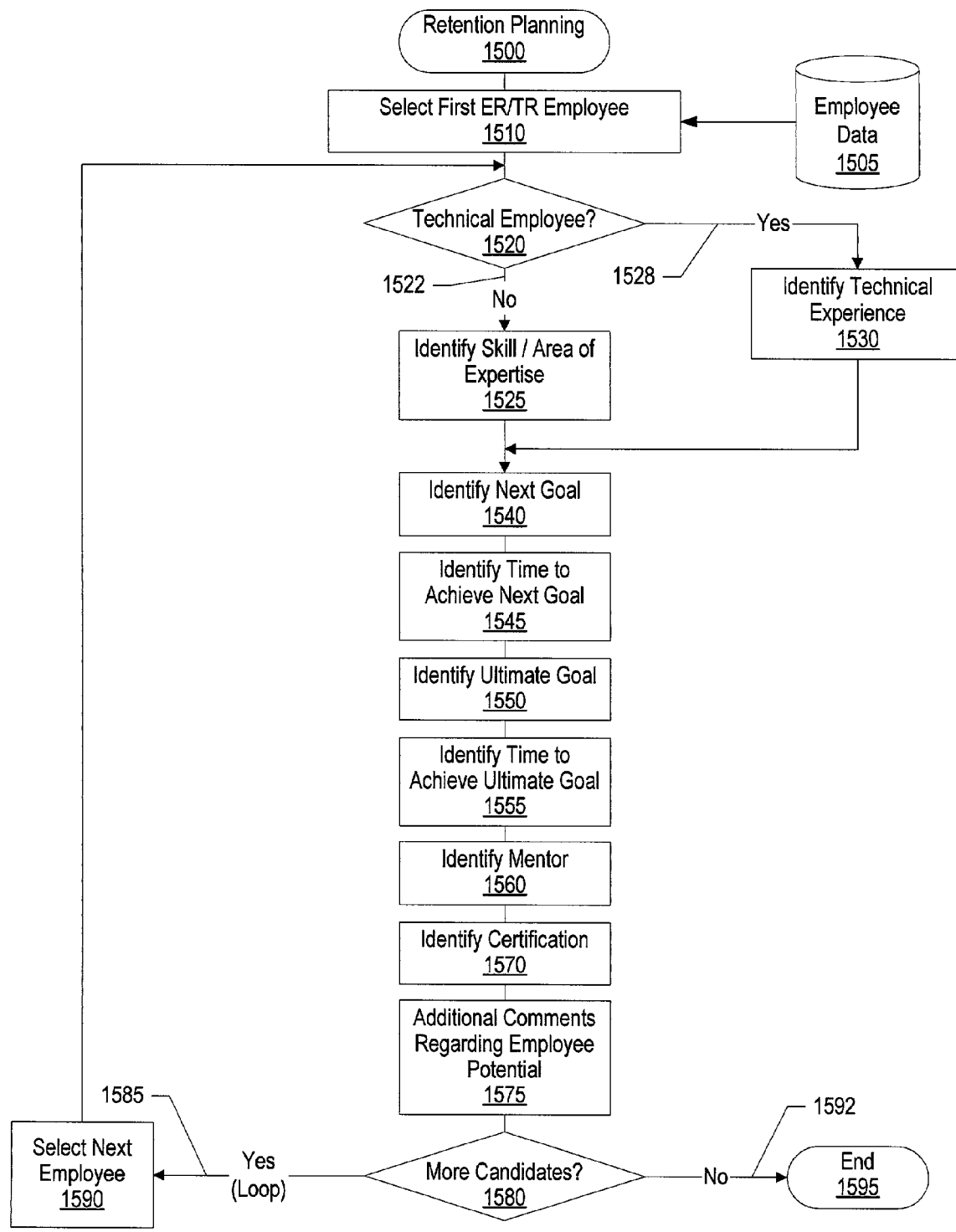
FIG. 15 is a flowchart for identifying key employees and performing retention analysis for identified employees.

FIG. 15 is a flowchart for identifying key employees and performing retention analysis for identified employees. Processing commences at 1500 whereupon a first employee is selected (step 1510) from employee data 1505. A determination is made as to whether the selected employee is a technical employee or identified as a potential executive candidate (decision 1520). If the employee is identified as a possible key technical employee, decision 1520 branches to "yes" branch 1528 whereupon the employee's technical experience is identified and stored in the People Planner System (step 1530). On the other hand, if the employee is identified as a potential executive candidate, decision 1520 branches to "no" branch 1522 whereupon the employee's skill and areas of expertise are identified (step 1525).

The next career goal for the selected employee is identified (step 1540) along with the expected amount of time planned for the employee to achieve the next goal (step 1545). The employee's ultimate goal (i.e., "Chief Technical Architect," "Division Vice President," etc.) is identified (step 1550) along with the expected amount of time planned for the employee to achieve the ultimate goal (step 1555). A mentor, such as an experienced employee in the organization, is identified for the employee (step 1560). In addition, special certification or training planned for the employee to reach the goals is identified (step 1570) along with any additional comments regarding the employee's potential. The identified information is stored in the employee's People Planner Data and used for long term management and direction of the employee.

A determination is made as to whether other potential key technical or executive candidates exist in the group (decision 1580). If more candidates exist in the group, decision 1580 branches to "yes" branch 1585 which selects the next employee candidate (step 1590) and loops back to process the next candidate. This looping continues until no more candidates are identified whereupon decision 1580 branches to "no" branch 1592 and processing ends at 1595.

Figure 16:
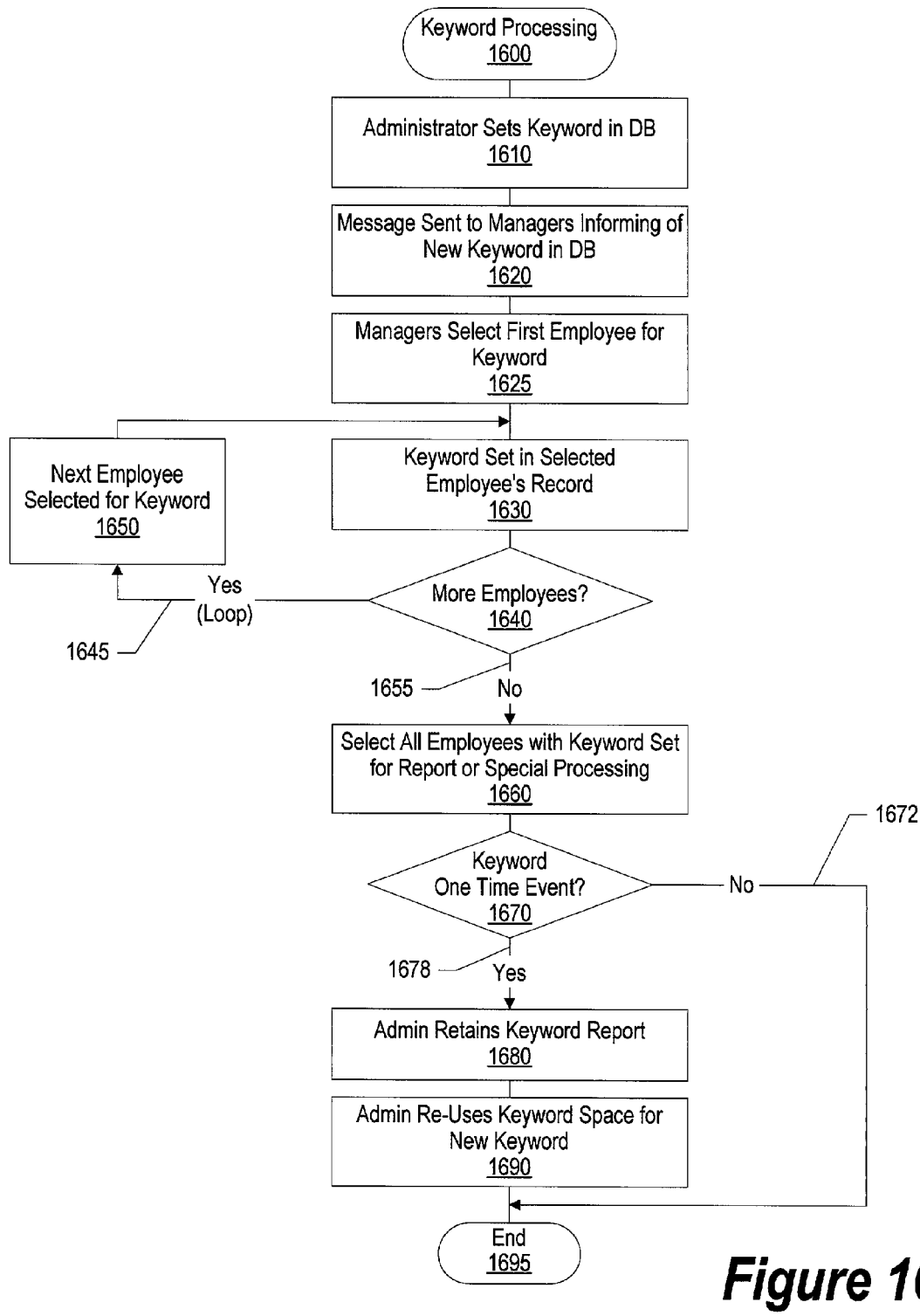
FIG. 16 is a flowchart showing tracking of additional keywords by the People Planner System to track organizational events and reporting on employees based on the additional keywords.

FIG. 16 is a flowchart showing tracking of additional keywords by the People Planner System to track organizational events and reporting on employees based on the additional keywords. Keywords can be added to the People Planner System to track data such as employees attending an important conference, employees selected for a special organizational retreat, employees nominated for special awards, or any other number of items that the organization wishes to track for employees.

Processing commences at 1600 whereupon an administrator defines one or more keywords in the People Planner System (step 1610). The People Planner System includes a notice area where notices about new keywords and other People Planner System changes are disseminated to management. An email message or the People Planner System notice area is used to inform management of the new keywords (step 1620). Management selects an employee for one of the newly defined keywords (step 1625). The keyword is set, or flagged, in the People Planner Data corresponding to the selected employee (step 1630). A determination is made as to whether more employees should be selected for the newly added keyword (decision 1640). This determination can be made over an amount of time and may be made by several different managers when analyzing their employees. If more employees should be selected for the keyword, decision 1640 branches to "yes" branch 1645 whereupon the next employee is selected for the keyword (step 1650) and processing loops back to set the keyword in the People Planner Data corresponding to the selected employee. This looping continues until no more employees are selected for the keyword whereupon decision 1640 branches to "no" branch 1655. Depending on the keyword a deadline may be established for a keyword so that employees are identified for the keyword before the deadline. For example, to prepare for a conference, a deadline typically exists for registering for the conference. At some point, a People Planner System administrator selects all employees that were selected for a particular keyword and reports or special processing takes place with the selected employees (step 1660). For example, if the keyword corresponds to a conference, the People Planner System would process the selected employees and send registrations for each employee to the conference coordinators. A determination is made as to whether the keyword corresponds to a one time event or an ongoing activity or event (decision 1670). If the keyword does not correspond to a one time event, decision 1670 branches to "no" branch 1672 bypassing the release of keyword space from the People Planner System. On the other hand, if the keyword corresponds to a one time event, decision 1670 branches to "yes" branch 1678 whereupon a People Planner System administrator retains a copy of a report or data file with the employees selected for the keyword (step 1680) and the administrator releases the data space used to store the keyword data so that it can be used for other keywords (step 1690). Keyword processing thereafter ends at 1695.

Figure 17A:
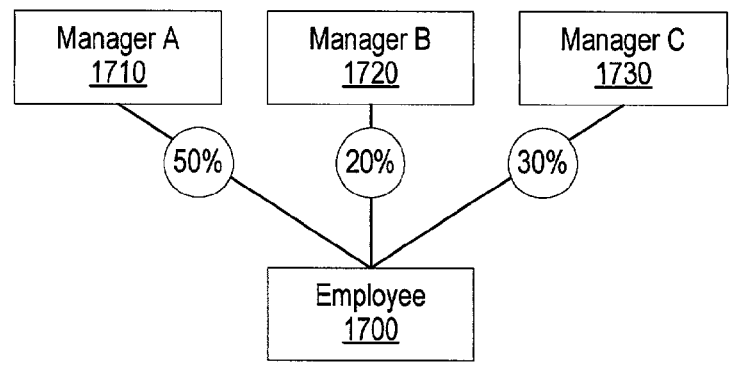
FIG. 17a is a diagram of an employee managed in a matrix organization with multiple managers.

FIG. 17a is a diagram of an employee managed in a matrix organization with multiple managers. In the example shown, employee 1700 reports to three different managers—manager A (1710), manager B (1720), and manager C (1730). Also shown are the effort, or activity, levels that the employee is expected to provide to the various managers' departments. In the example shown, employee 1700 spends fifty percent of his time working for manager A (1710), twenty percent of his time working for manager B (1720), and thirty percent of his time working for manager C (1730).

Figure 17B:
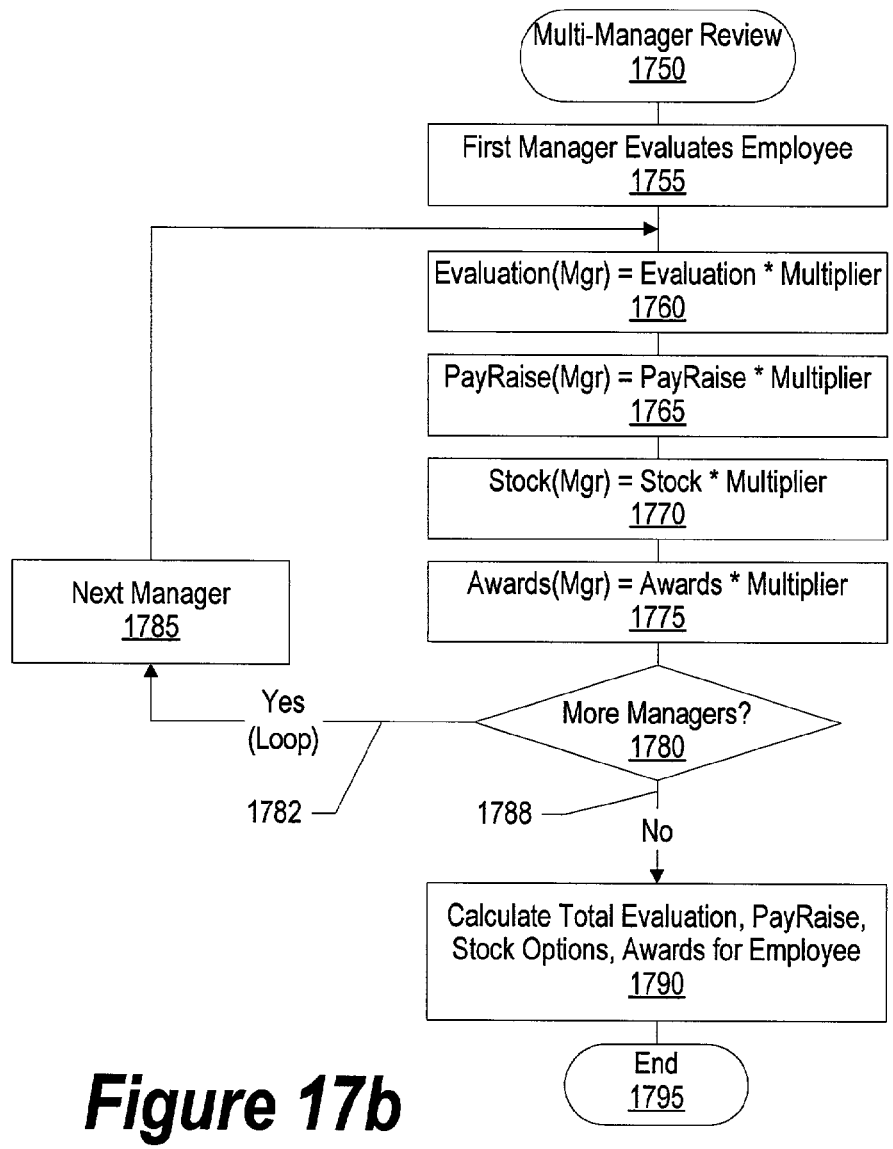
FIG. 17b is a flowchart used to evaluate and aware employees managed in a matrix organization with multiple managers.

FIG. 17b is a flowchart used to evaluate and aware employees managed in a matrix organization with multiple managers. Processing commences at 1750 whereupon the first manager evaluates the employee and provides salary increase, stock award, award, and evaluation ratings for the employee. The manager's evaluation is multiplied (step 1760) by a multiplier corresponding to the amount of work the employee performs for the manager (i.e. the work percentage discussed in FIG. 17a). Likewise, the manager's planning of the employee's pay increase is computed (step 1765), along with a stock award computation (step 1770), and an awards computation (step 1775). A determination is made as to whether additional managers need to evaluate the employee (decision 1780). If additional managers need to evaluate the employee, decision 1780 branches to "yes" branch 1782 whereupon the next manager evaluates the employee (step 1785) and processing loops back to multiply the next manager's evaluations and preplanning data with the multiplier corresponding to the manager. When all managers that manage the employee have performed evaluations, decision 1780 branches to "no" branch 1788 whereupon the employees total evaluation, salary increase, stock award, and other awards is computed by adding the various factors computed for each manager (step 1790). The People Planner System can also facilitate communication between managers that each manage a given employee so that a fair assessment of the employee's contributions can be made in light of the employee's efforts and complexity involved in working in multiple areas.

Figure 18A:
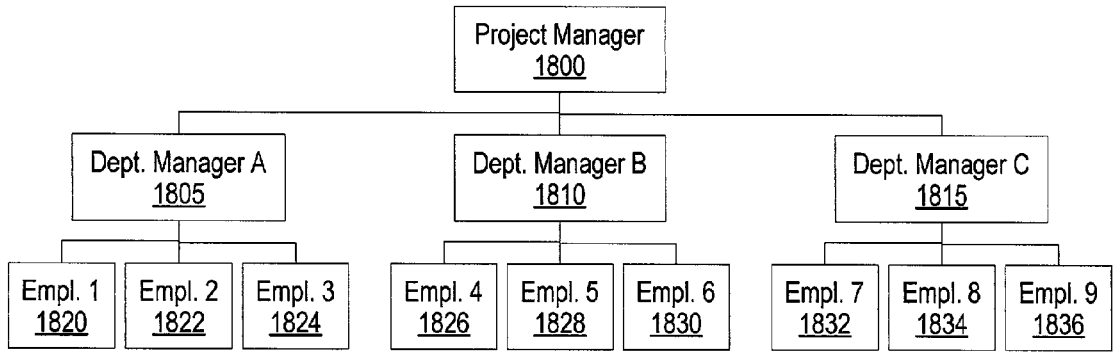
FIG. 18a is a sample three tier hierarchy chart showing employees and two layers of management.
Figure 18B:
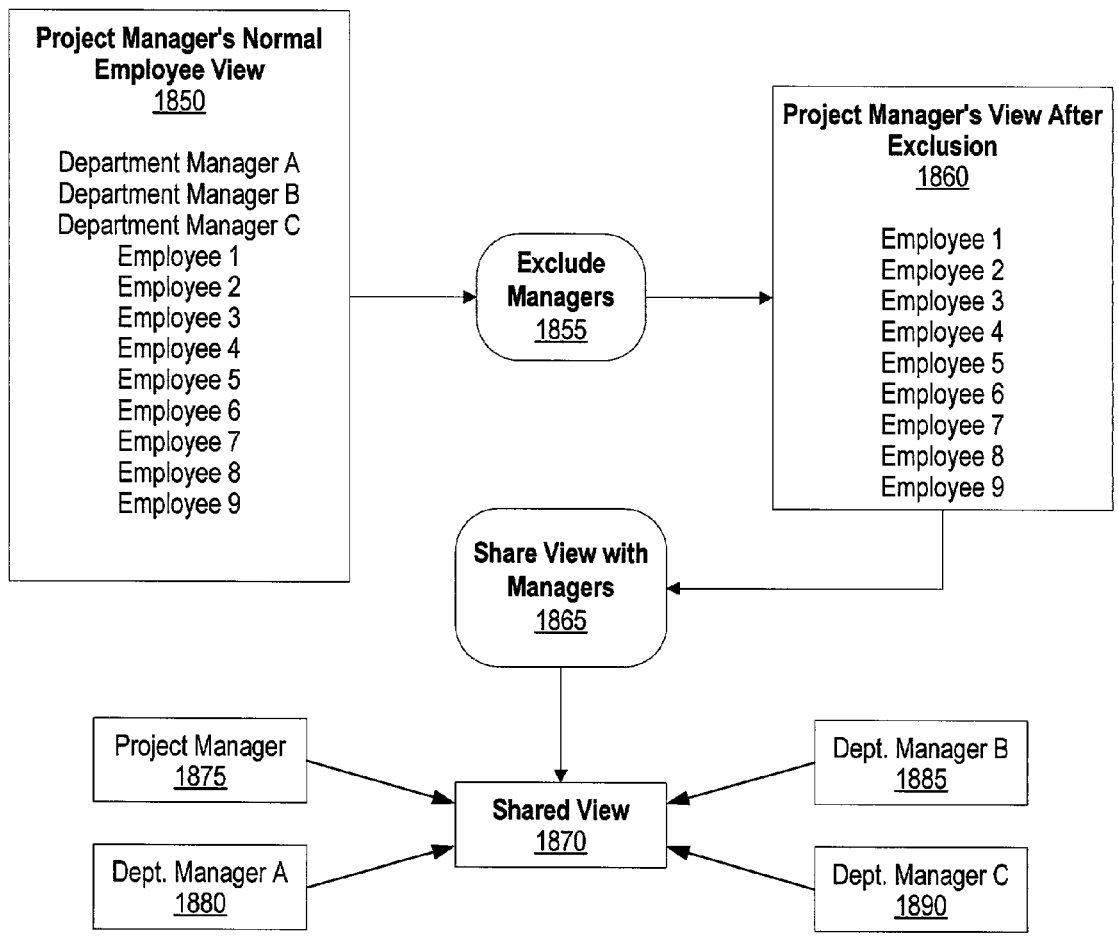
FIG. 18b is a diagram showing managers being excluded from a higher-level People Planner View.

FIG. 18a is a sample three tier hierarchy chart showing employees and two layers of management. Project manager 1800 has three managers reporting to her (department manager A (1805), department manager B (1810), and department manager C (1815)). Each of these department managers have three employees reporting to them. Employees 1 (1820), 2 (1822), and 3 (1824) report to department manager A (1805); Employees 4 (1826), 5 (1828), and 6 (1830) report to department manager B (1810)); and Employees 7 (1832), 8 (1834), and 9 (1836) report to department manager C (1815). If project manager 1800 wants to hold a management meeting to discuss employee contributions and planning factors, sharing her view with the department managers would allow the department managers to see confidential salary, compensation, and evaluation information pertaining to the other department managers. Instead, project manager 1800 can "exclude" the department managers from her view of people planner data to allow the management team to analyze the employee planning factors and evaluations without showing information regarding the department managers. FIG. 18b shows high level exclusion processing and FIG. 19 shows detailed processing involved with setting up shared views and excluding certain employees from the viewed information.

FIG. 18b is a diagram showing managers being excluded from a higher-level People Planner View. The project manager's normal view (1850) lists employees reporting to the project manager from the example shown in FIG. 18a including three department managers and nine employees reporting to the department managers. Exclude managers process 1855 is performed to create a new project managers view (1860) which lists the employees without listing the department managers. A granting process (1865) allows the project manager to share the new project manager's view (1860) with the department managers. The result is a shared project manager's view (1870) viewable by the project manager (1875), department manager A (1880), department manager B (1885), and department manager C (1890).

Figure 19:
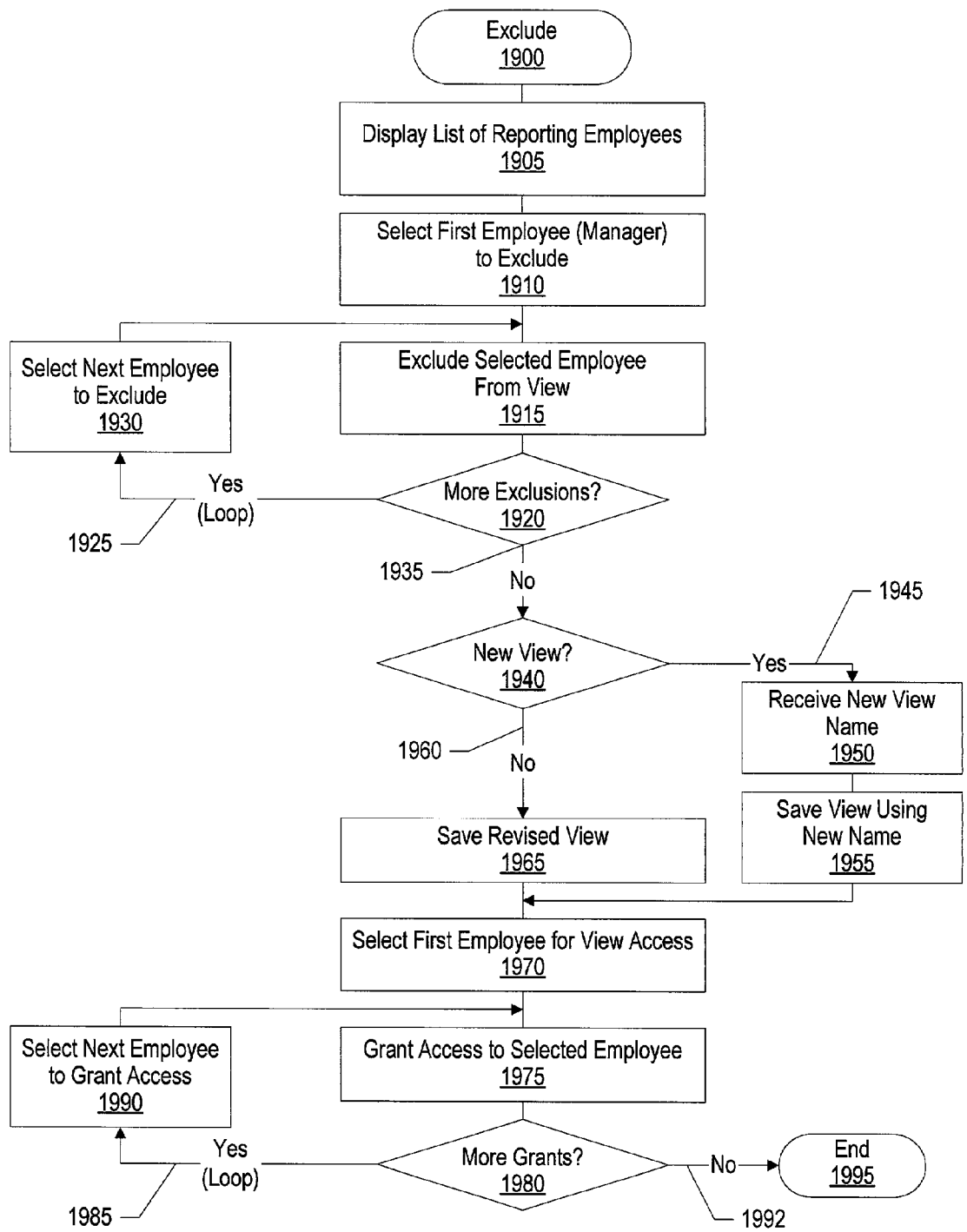
FIG. 19 is a flowchart showing employees being selected and removed from a particular People Planner System view.

FIG. 19 is a flowchart showing employees being selected and removed from a particular People Planner System view.

Processing commences at 1900 whereupon a list of all reporting employees is displayed on the manager's display device (step 1905). The project (or higher level) manager selects the first employee (such as a reporting manager) to excluded from a new view (step 1910). The People Planner Data associated with the selected employee is excluded from the new view (step 1915). A determination is made as to whether the manager wants to exclude more employees (such as the department managers) from the new view (decision 1920). If the manager wishes to exclude more employees, decision 1920 branches to "yes" branch 1925 whereupon the next employee (i.e., the next department manager) is selected (step 1930) and processing loops back to excluded the selected employee from the new view. This looping continues until there are no more exclusion to process, at which time decision 1920 branches to "no" branch 1935.

A determination is made as to whether the manager wishes to save the new view or revise the manager's current view (decision 1940). If the manager wishes to create a new view, decision 1940 branches to "yes" branch 1945 whereupon the manager provides a new view name to identify the view (step 1950) and the new view is saved using the new view name (step 1955). On the other hand, if the manager simply wants to revise her current view, decision 1940 branches to "no" branch 1960 whereupon the revised view is saved (step 1965).

The employees granted access to the view will often be the employees whose People Planner Data has been excluded from the view. The excluded employees can automatically be granted access to the new view or the project manager can select employees individually.

The manager selects a first employee (i.e., a department manager) to grant access to the new or revised view (step 1970). The selected employee is granted access to the new or revised view (step 1975). A determination is made as to whether additional grants need to be given for the new or revised view (decision 1980). If more grants need to be given, decision 1980 branches to "yes" branch 1985 whereupon the next employee is selected for granting access to the new or revised view (step 1990) and processing loops back to grant the selected employee access to the view. This looping continues until there are no more employees that need access to the view, at which time decision 1980 branches to "no" branch 1992 and processing ends at 1995.

Figure 20:
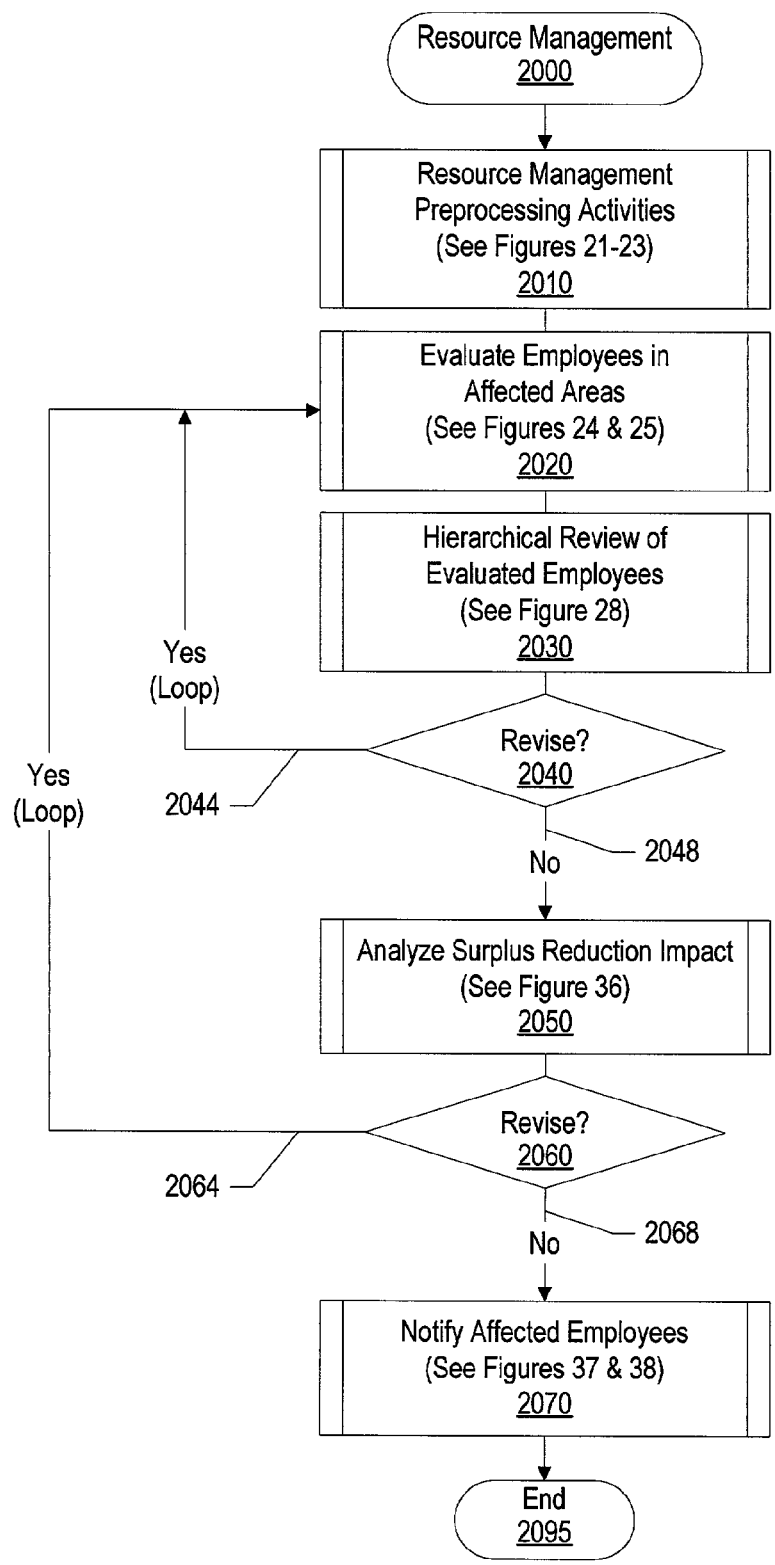
FIG. 20 is a high level flowchart showing automated activities involved in managing organizational resources.

FIG. 20 is a high level flowchart showing automated activities involved in managing organizational resources. Processing commences at 2000 whereupon resource management preprocessing activities are invoked (predefined process 2010, see FIGS. 21-23 for processing details).

Preprocessing activities determine which organizational areas, skill groups, and levels are affected by a workforce reduction. During a workforce reduction employees are identified as surplus employees (i.e., laid-off), and certain organizational areas may be eliminated. After the organizational areas, skill groups, and levels have been identified, employees in the identified areas with matching skills and levels are evaluated (predefined process 2020, see FIGS. 24 and 25 for processing details) to determine which employees will be identified as surplus employees. Typically immediate supervisors or management evaluates the employees.

The evaluations are reviewed, usually by higher levels of management and possibly by a "project office" that includes human resource professionals that manage the surplus reduction action. Hierarchical review (predefined process 2030, see FIG. 28 for processing details) includes in-depth review of employees' evaluations by higher management layers, identification of employees as surplus employees, as well as project office and legal review of employees recommended for surplus by management.

A determination is made as to whether the employee's evaluation should be revised based on a variety of factors (decision 2040). If the evaluation should be revised, decision 2040 branches to "yes" branch 2044 which loops back to re-evaluate the employee with guidance provided by management, the project office, or legal review. On the other hand, if the evaluation does not need to be revised, decision 2040 branches to "no" branch 2048 whereupon the proposed surplus reduction is analyzed (predefined process 2050, see FIG. 36 for processing details) to determine the costs and benefits of performing the surplus reduction.

A determination is made as to whether the proposed surplus reduction needs to be revised (decision 2060) based upon analyzing the resource reduction impact. For example, it may be determined that too many employees have been identified as surplus that may detrimentally affect the organization because of the sudden loss of skills. Alternatively, it may be determined that too few employees have been identified as surplus resulting in less compensation savings than expected. If the proposed resource reduction needs to be revised, decision 2060 branches to "yes" branch 2064 which loops back to adjust surplus parameters and re-evaluate employees based on the readjusted parameters. On the other hand, if the proposed resource reduction does not need to be revised, decision 2060 branches to "no" branch 2068 whereupon affected employees are notified and the notification and acknowledgement are tracked and recorded (predefined process 2070, see FIGS. 37 and 38 for processing details). Processing subsequently ends at 2095.

Figure 21:
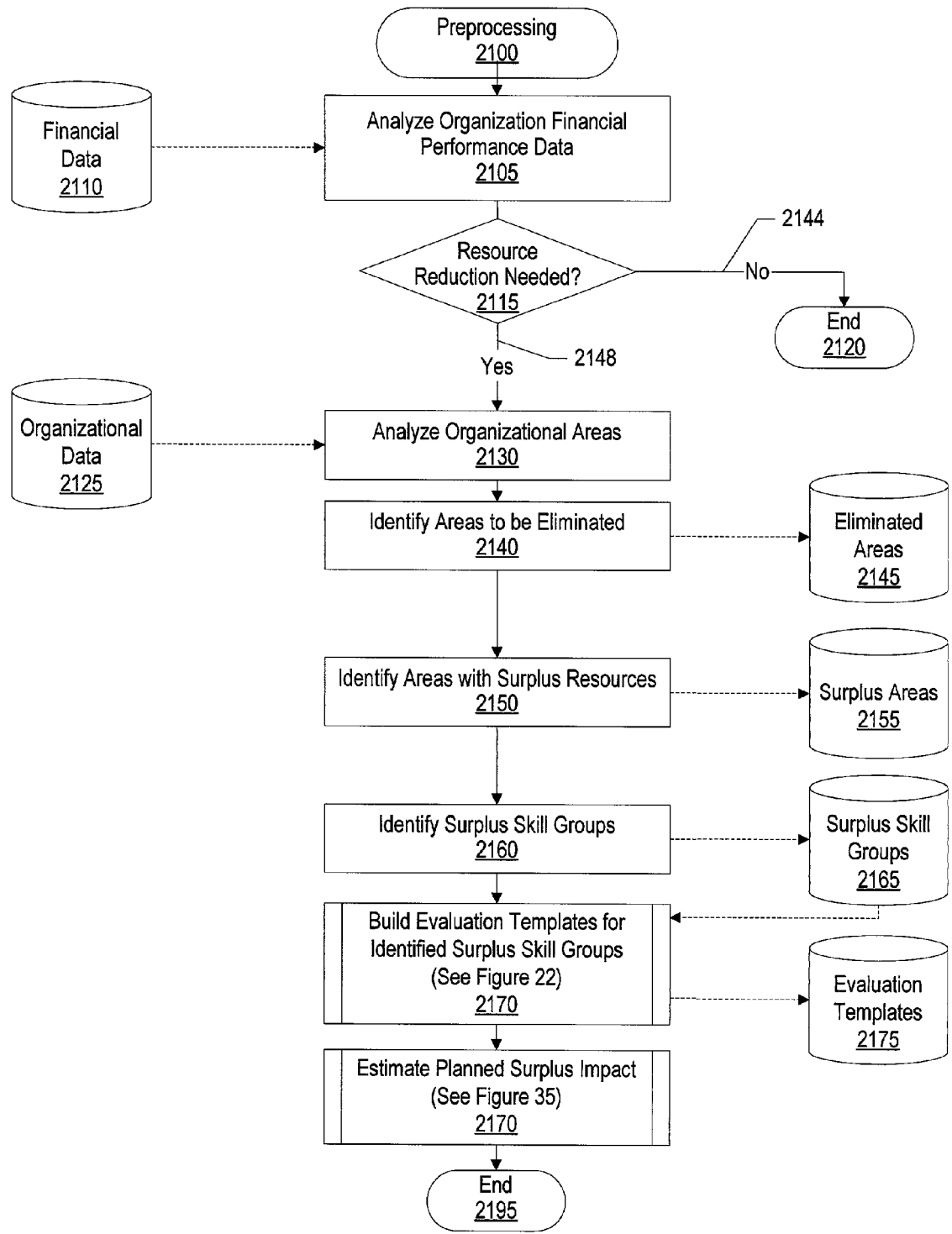
FIG. 21 is a flowchart showing preprocessing activities performed in planning a resource reduction.

FIG. 21 is a flowchart showing preprocessing activities performed in planning a resource reduction. Processing commences at 2100 whereupon the organization's financial data (2110) is analyzed (step 2105). A determination is made as to whether the organization needs to reduce resources in order to reduce costs and improve the organization's financial performance (decision 2115). If the organization does not need to reduce resources, decision 2115 branches to "no" branch 2118 and processing ends at 2120. On the other hand, if the organization does need to reduce resources, decision 2115 branches to "yes" branch 2128 whereupon resource reduction preprocessing continues.

Organizational data 2125, describing areas of the organizations such as departments, projects, divisions, and functions, are read and analyzed (step 2130). Areas that are no longer needed by the organization are identified for elimination (step 2140) and stored with other areas identified for elimination in eliminated areas data store 2145. Areas with surplus resources are also identified (step 2150) and stored in surplus areas data store 2155.

Surplus resources may include particular skill groups that have more employees than needed by the organizational area. For example, a software development area may have a larger percentage of business planners than is needed to perform the software development activities. In addition, specific skill groups can be identified as having surplus resources. For example, a project developing software using primarily Java may have a larger percentage of Visual Basic™ programmers than needed to perform the Java development. These surplus skill groups are identified by analyzing the areas with surplus resources (step 2160) and the resulting analysis is stored in surplus skill groups data store 2165.

In order to identify which individual employees should be eliminated as surplus resources, evaluation templates are built for each identified skill group that was found to include surplus resources (predefined process 2170, see FIG. 22 for further processing details) and stored in a library of evaluation templates 2175 which will be used by management to evaluate employees.

Using the identified skill groups, employee data, and planned amount of surplus reduction, an estimated planned surplus impact can be generated (predefined process 2170, see FIG. 35 for processing details) to estimate percentages of employees in various skill groups and levels that will be identified as surplus in order to attain certain cost savings for the organization. In addition, resource reduction program costs, such as severance packages for employees identified as surplus, can be estimated during predefined process 2170. Preprocessing activities thereafter end at 2195.

Figure 22:
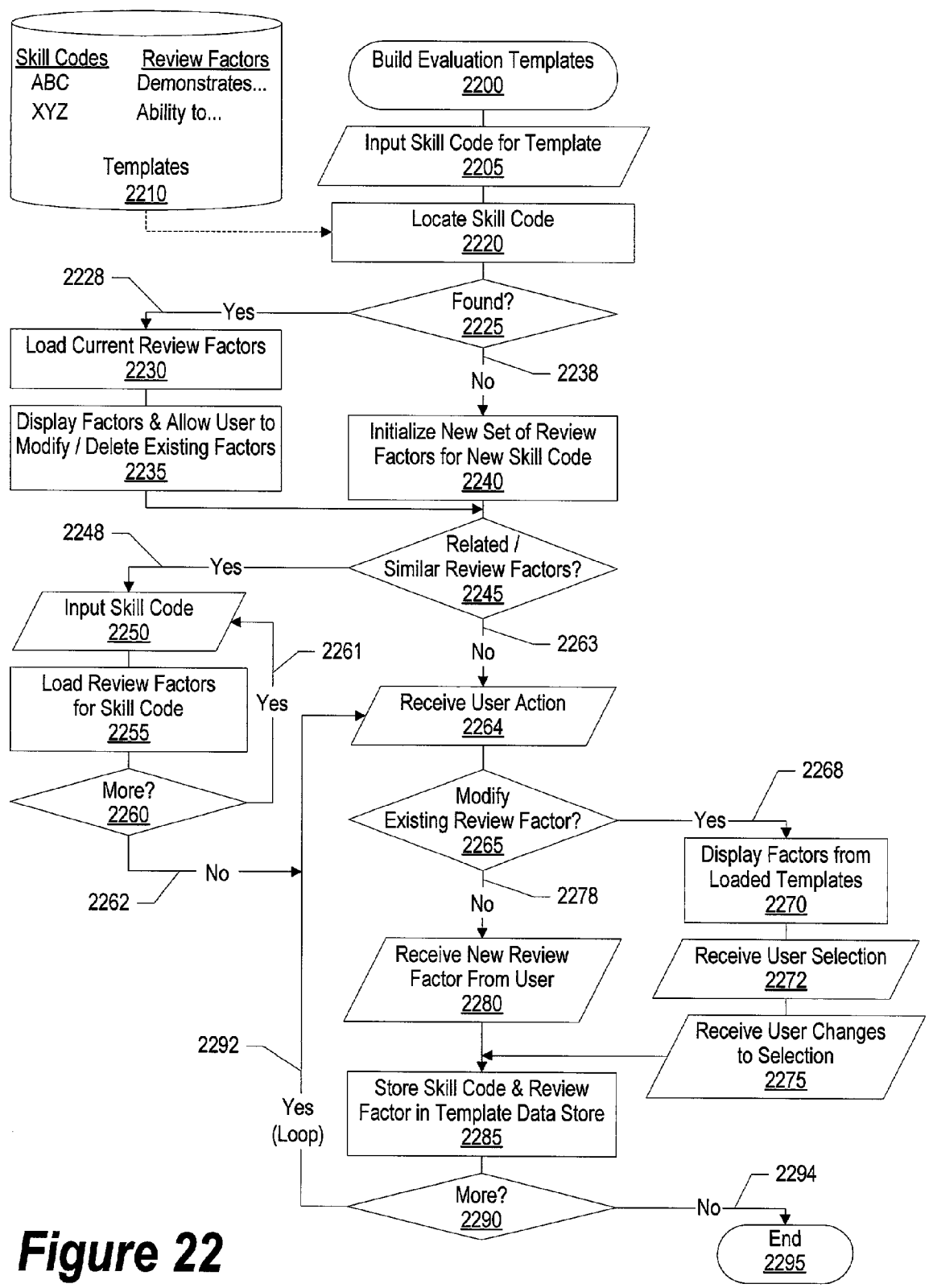
FIG. 22 is a flowchart showing the creation of evaluation templates for surplus employees in identified skill groups and levels.

FIG. 22 is a flowchart showing the creation of evaluation templates for surplus employees in identified skill groups and levels. Processing commences at 2300 whereupon a skill code for a template is received (input 2205) by a template creator. A template creator is a person that determines what factors are used to evaluate a particular skill group and level. For example, a junior level programmer may be reviewed against factors such as "Understands Java programming fundamentals" and "Able to prepare Java source code based on design documentation." Likewise, a senior programmer may have review factors such as "Expertise in all facets of Java," "Mastery of software design implementation," and "Ability to lead software team in design goals."

The input code received from the user is used to locate (step 2220) an existing skill code and its corresponding review factors from templates data store 2210. Templates data store may be implemented using a database, such as Lotus Notes™ or another database product. A determination is made as to whether the skill code was found in the template data store (decision 2225). If the skill code was found, decision 2225 branches to "yes" branch 2228 whereupon the current review factors corresponding to the skill code are retrieved (step 2230) and the display factors are displayed to the user allowing the user to modify and/or delete current review factors corresponding to the skill code (step 2235). On the other hand, if the skill code was not found, decision 2225 branches to "no" branch 2238 whereupon a new set of review factors is initialized for the new skill code and the new skill code is included in the templates data store (step 2240).

A determination is made as to whether the skill code that the user entered is related to one or more skill codes (decision 2245). For example, different levels of Java programmers may have similar review factors, with higher level programmers being evaluated against "mastery" of certain factors while lower level programmers may be evaluated against a lower threshold, such as "understanding" or "ability." In addition, higher level skills may have additional review factors corresponding the responsibilities not required of lower level employees, such as team leading and management responsibilities. The determination as to related or similar skill groups may be determined based on a skill code naming convention (e.g., all skill codes beginning with "PRG" are deemed to be have similar or related factors), additional, the user could be prompted to retrieve additional skill code templates from which the user could copy review factors and paste into the skill template upon which the user is working. If there are related or similar review factors in other skill groups, decision 2245 branches to "yes" branch 2248 whereupon a skill code is entered (step 2250) and the review factors corresponding to the entered skill code are retrieved (step 2255). A determination is made as to whether there are more templates that the user wishes to retrieve (decision 2260). If there are more templates that the user wishes to retrieve, decision 2260 branches to "yes" branch 2261 which loops back to retrieve the next template. This looping continues until all desired templates are retrieved whereupon decision 2260 branches to "no" branch 2262. On the other hand, if there are no related or similar review factors from which the user can copy review factors, decision 2245 branches to "no" branch 2263 bypassing steps taken to load related templates.

The user can add, edit, or delete review factors that correspond to the desired skill code. A user action is received (input 2264). A determination is made as to whether the user is modifying an existing review factor (decision 2265). If the user is modifying an existing review factor, decision 2265 branches to "yes" branch 2268 whereupon review factors from loaded templates are displayed (step 2270), the user selects one of the displayed review factors (input 2272), and the user changes the selected review factor (input 2275). On the other hand, if the user wishes to enter a new review factor without copying from an existing template, decision 2265 branches to "no" branch 2278 and the new review factor is provided by the user (input 2280).

The modified or added review factor is stored along with the skill code in the template data store (step 2285). A determination is made as to whether the user wants to modify, add, or delete review factors corresponding to the current template (decision 2290). If the user wants to perform further actions to the current template, decision 2290 branches to "yes" branch 2292 which loops back to process the user's next action. This looping continues until the user no longer wishes to add, delete, or modify review factors corresponding to the current skill code, at which time decision 2290 branches to "no" branch 2294 and processing ends at 2295.

Figure 23:
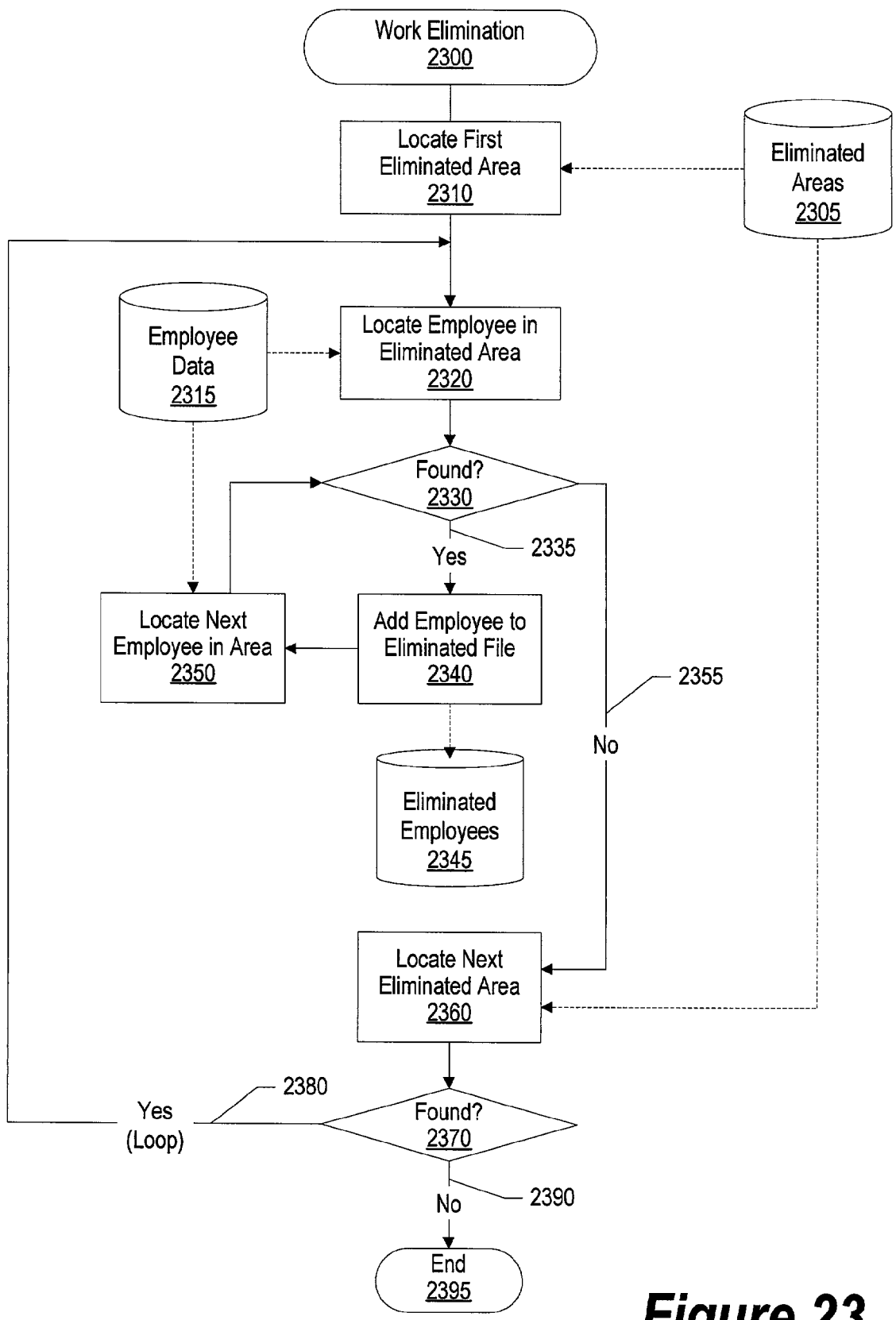
FIG. 23 is a flowchart showing organizational areas being eliminated as part of an organizational resource reduction action.

FIG. 23 is a flowchart showing organizational areas being eliminated as part of an organizational resource reduction action. Processing commences at 2300 whereupon the first eliminated area is retrieved (step 2310) from eliminated areas data store 2305. The eliminated areas were previously identified during preprocessing activities (see FIG. 21 for details).

Employee data 2315 includes data about employees in the organization including data regarding the area, such as department, project, function, and division data that is used to locate the first area in the selected eliminated area (step 2320). A determination is made as to whether an employee was found in the selected eliminated area (decision 2330). If an employee was found, decision 2330 branches to "yes" branch 2335 whereupon data for the located employee is added (step 2340) to eliminated employees data store 2345. The next employee in the eliminated area is located (step 2350) from employee data 2315 and processing loops back to decision 2330. When an employee record is not found for the eliminated area, decision 2330 branches to "no" branch 2355 whereupon data regarding the next eliminated area is retrieved (step 2360) from eliminated areas data store 2305.

A determination is made as to whether data for the next eliminated area was found (decision 2370). If another eliminated area was found, decision 2370 branches to "yes" branch 2380 whereupon processing loops back to process the employees within the eliminated area. This looping continues until there are no more eliminated areas to process, at which time decision 2370 branches to "no" branch 2390 whereupon processing of eliminated areas ends at 2395.

Figure 24:
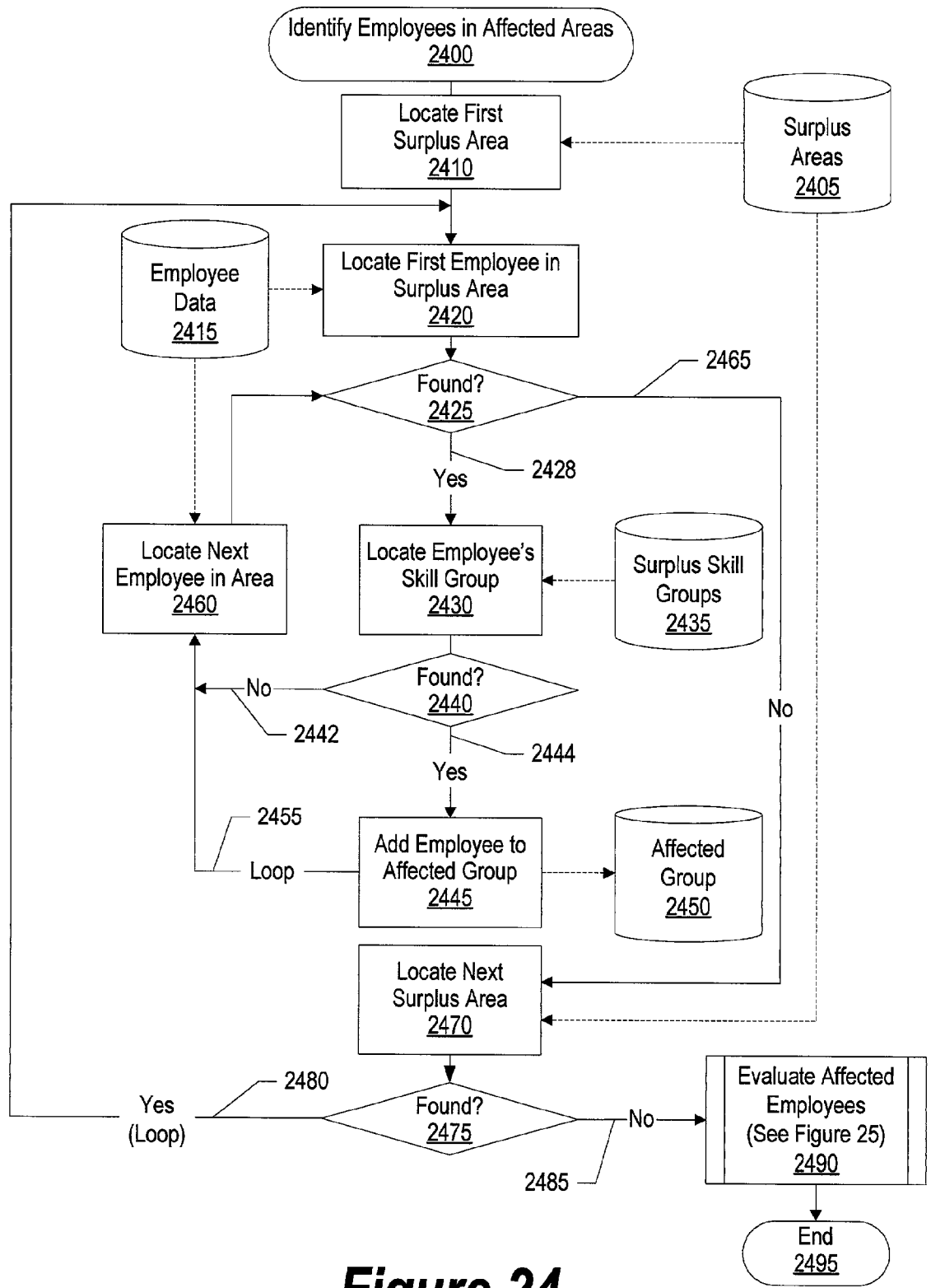
FIG. 24 is a flowchart showing the identification of employees for further evaluation as part of an organization's resource reduction action.

FIG. 24 is a flowchart showing the identification of employees for further evaluation as part of an organization's resource reduction action. Processing commences at 2400 whereupon the first surplus area is located (step 2410) from surplus areas data store 2405. Surplus areas data stores 2405 includes data regarding surplus areas that were identified during preprocessing activities (see FIG. 21 for further details).

The first employee that works in the selected surplus area is located (step 2420) by reading employee data store 2415 that includes data about employees in the organization, including the area (i.e., department, project, function, division) for which the employee works along with the employee's skill group (i.e., the type of job the employee has such as a programmer, business planner, manager, etc.) and the employee's level (i.e., senior programmer, associate programmer, junior programmer, etc.). A determination is made as to whether an employee was found in the surplus area (decision 2425). If an employee was found, decision 2425 branches to "yes" branch 2428 to further analyze and process the employee. On the other hand, if an employee was not found, decision 2425 branches to "no" branch 2465 to analyze the next surplus area.

If an employee was found in the surplus area, decision 2425 branches to "yes" branch 2428 whereupon the employees skill group is matched (step 2430) against the identified surplus skill groups 2435. During preprocessing activities, certain skill groups were identified for reduction (see FIG. 21 for further details). For example, a surplus area may need to reduce the number of business planners that are employed by the area but not need to reduce the number of programmers. In addition, levels of employees may be targeted for reduction so that the number of junior business planners is reduced while the number of senior business planners is not reduced.

A determination is made as to whether the selected employee's skill group (and level if applicable) is found in the list of surplus skill groups (decision 2440). If the employee's skill group was not found in the list, decision 2440 branches to "no" branch 2442 bypassing the step of adding the employee to the affected group. On the other hand, if the employee's skill group was found in the list, decision 2440 branches to "yes" branch 2444 whereupon data regarding the employee (e.g., the employee's employee number and other identifying information) is added (step 2445) to affected group data store 2450. Affected group data store 2450 includes data about employees that will be evaluated to determine which employees from the affected group will be laid-off (i.e., identified as surplus employees, see FIGS. 24-27 for details regarding evaluations of affected employees). Regardless of whether the employee is in an affected skill group, processing loops back (loop 2455) to locate the next employee in the area (step 2460) and determine whether another employee was found in the area (decision 2425). This looping continues until no more employees are found in the affected area, at which point decision 2425 branches to "no" branch 2465 whereupon the next surplus area is located (step 2470) from surplus area data store 2405.

A determination is made as to whether a next surplus area is found (decision 2475). If a next surplus area is found, decision 2475 branches to "yes" branch 2480 which loops back to process the employees in the next area and determine which of those employees are added to the affected group. This looping continues until there are no more surplus areas to process at which point decision 2475 branches to "no" branch 2485 whereupon the affected employees are evaluated (predefined process 2490, see FIG. 25 for details) and processing ends at 2495.

Figure 25:
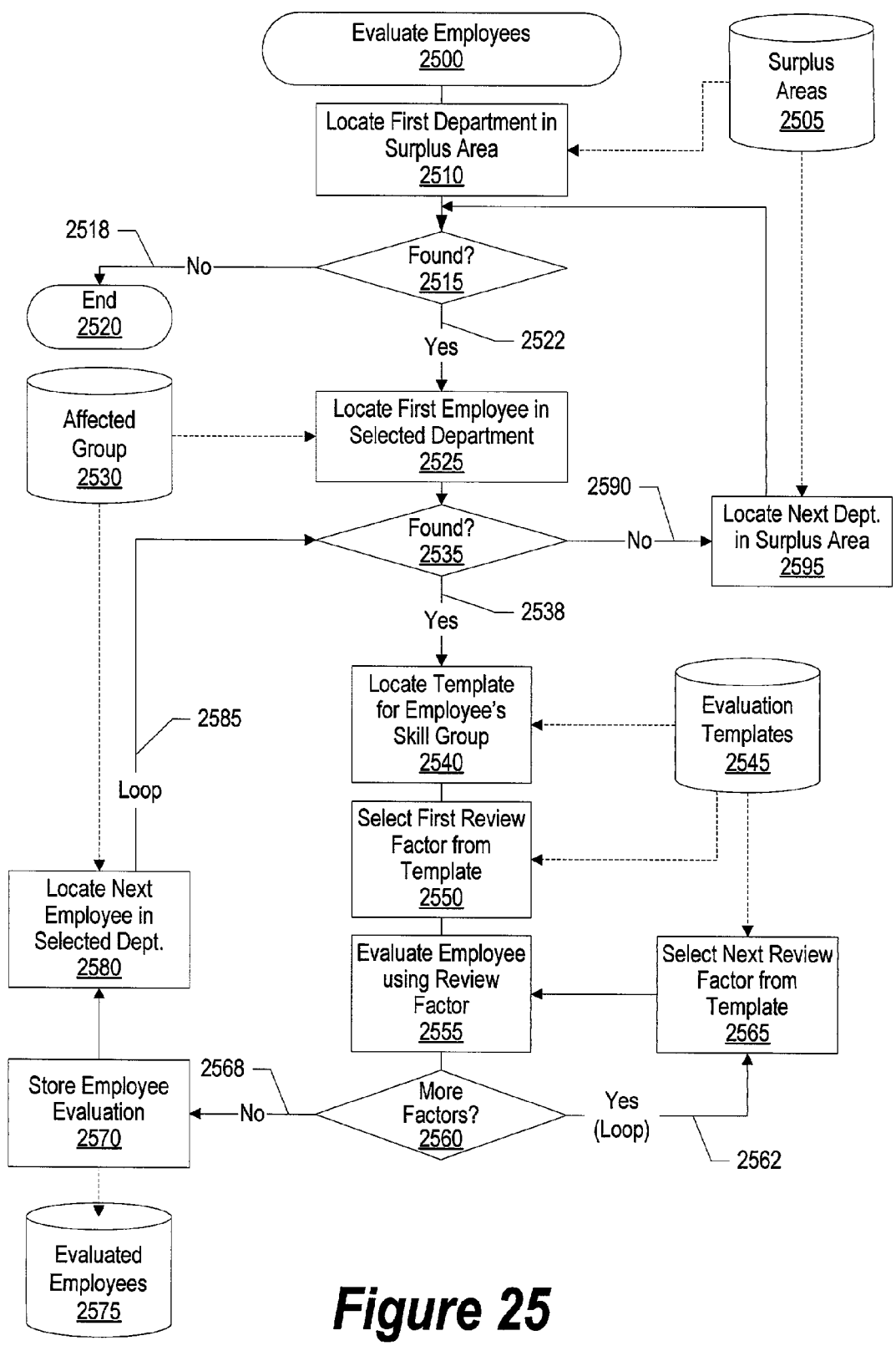
FIG. 25 is a flowchart showing the evaluation of employees in identified skill groups and levels for resource reduction.

FIG. 25 is a flowchart showing the evaluation of employees in identified skill groups and levels for resource reduction. Processing commences at 2500 whereupon a first department within the identified surplus area is retrieved (step 2510). A determination is made as to whether a department was found within the identified surplus area (decision 2515) as processing will continue until all departments in the identified surplus area have been processed. When there are no more departments to process, decision 2515 branches to "no" branch 2518 whereupon processing ends at 2520. On the other hand, while there are departments to process, decision 2515 branches to "yes" branch 2522 whereupon a first employee from within the selected department is retrieved (step 2525) from affected employees data store 2530.

A determination is made as to whether an employee was found within the selected department (decision 2535) as processing of the department will continue until all employees within the department have been processed. If there are no more employees within the selected department, decision 2535 branches to "no" branch 2590 which locates (step 2595) the next department from surplus areas data store 2505 and loops back to process the next department until all departments have been processed. On the other hand, if an employee from the selected department was found in affected group data store 2530, decision 2535 branches to "yes" branch 2538 in order to process the selected employee.

A template corresponding to the selected employee's skill group and level (e.g., junior programmer, senior business analyst, etc.) is retrieved (step 2540) from evaluation templates data store 2545. A first review factor is selected from the retrieved evaluation template (step 2550). The reviewer, usually the employee's manager or supervisor, evaluates the selected employee using the criteria set forth in the selected review factor (step 2555). A determination is made as to whether there are more review factors in the evaluation template to use in the employee's evaluation (decision 2560). If there are more review factors, decision 2560 branches to "yes" branch 2562 which loops back to select the next review factor from the evaluation template (step 2565) and evaluate the employee using this review factor. This looping continues until there are no more review factors to use from the selected evaluation template, at which point decision 2560 branches to "no" branch 2568 whereupon the employee's evaluation is stored (step 2570) in evaluated employees data store 2575, and the next employee in the selected department is located (step 2580) from affected group data store 2530 and processing loops back to process the next employee. This looping continues until there are no more employees in the selected department to process, at which time decision 2535 branches to "no" branch 2590 to locate the next department within the surplus area.

Figure 26:
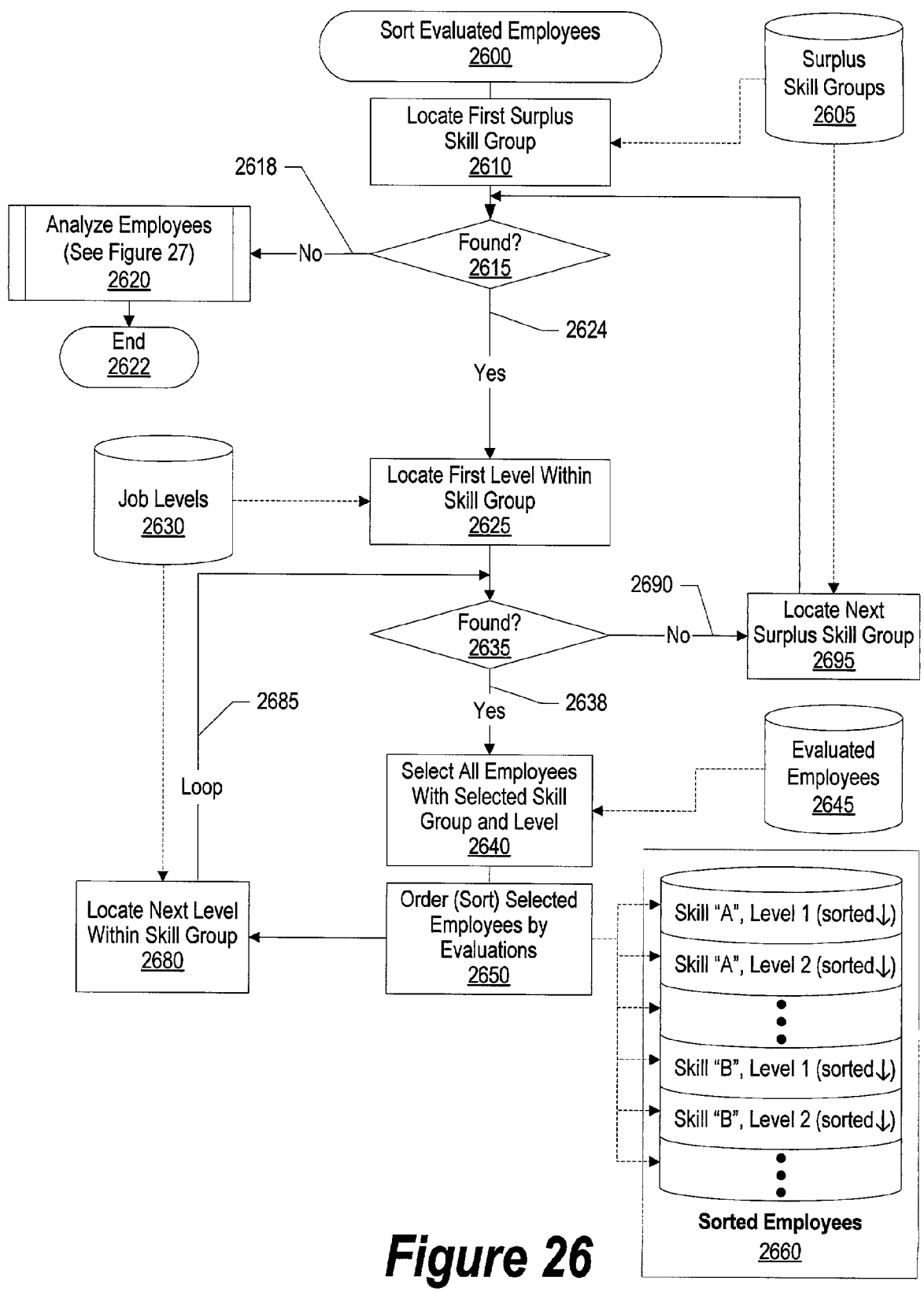
FIG. 26 is a flowchart showing the grouping and sorting of evaluated employees for resource reduction activities.

FIG. 26 is a flowchart showing the grouping and sorting of evaluated employees for resource reduction activities. Processing commences at 2600 whereupon a first surplus skill group is located from surplus skill groups data store 2605. A determination is made as to whether a surplus skill group as located (decision 2615) as processing continues until all skill groups have been processed. If the next skill group is not located (i.e., all skill groups have been processed), decision 2615 branches to "no" branch 2618 whereupon the employees are analyzed (predefined process 2620, see FIG. 27 for further details) and processing ends at 2622.

On the other hand, if a surplus skill group was found, decision 2615 branches to "yes" branch 2624 whereupon the first level within the skill group is selected (step 2625) from job levels data store 2630. A determination is made as to whether a first (next) job level for the selected skill group was found (decision 2635) as all levels for the selected skill group are processed.

A job level within a skill group often notes an employee's experience or proficiency at within the skill group. For example, a new programmer may have a level of "Junior,"

with an intermediate programmer having a level of "Associate," and an experienced programmer having a level of "Senior." In addition, some organizations give employees numeric or alphanumeric levels to note experience, such as level "1" being a junior level ranging to higher numbers (i.e., level "10") for more experienced levels.

If the job level was found for the selected skill group, decision 2635 branches to "yes" branch 2638 to process the skill group/level combination. Employees with the selected skill group and level are selected (step 2640) from evaluated employees data store 2645. The selected group is then sorted by the employees' evaluation in order to further evaluate employee needs (step 2650). In a database environment, the group could be selected and sorted with an SQL query statement (e.g., "SELECT * FROM EVALUATED_EMPLOYEES WHERE SKILL_GROUP="PROGRAMMER" AND LEVEL="JUNIOR", ORDER BY EVALUATION).

The next level within the skill group is located (step 2680) for processing from job levels data store 2630 and processing loops back to process the next level. This looping continues until a next job level is not located, at which point decision 2635 branches to "no" branch 2690 whereupon the next surplus skill group is located (step 2695) from surplus skill groups data store 2605 and processing loops back to process the next skill group. This looping continues until there are no more skill groups to process, at which point decision 2615 branches to "no" branch 2618 whereupon the grouped and sorted employees are analyzed (predefined process 2620, see FIG. 27 for processing details) and processing thereafter ends at 2622.

Figure 27:
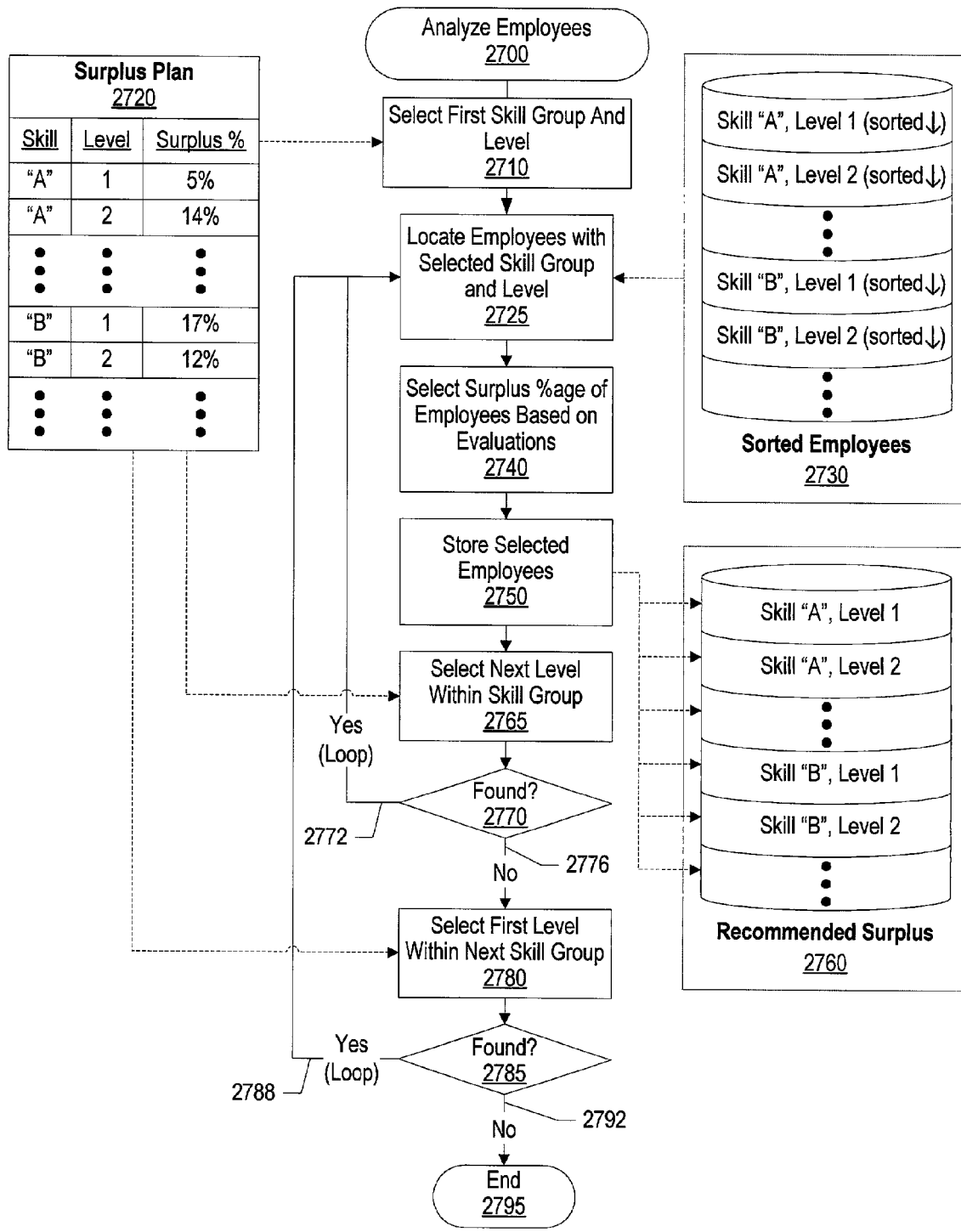
FIG. 27 is a flowchart showing the automated analysis of evaluated employees with respect to an organization's needs in terms of resources for various skill groups and levels.

FIG. 27 is a flowchart showing the automated analysis of evaluated employees with respect to an organization's needs in terms of resources for various skill groups and levels. Processing commences at 2700 whereupon the first surplus skill group and level are selected (step 2710) from surplus plan data store 2720. Surplus plan data store 2720 includes surplus planning data for various skill groups and levels that are developed during resource reduction planning. As shown, skill group "A" (i.e., "programmers") has a planned reduction of 5% for level 1 employees and a reduction of 14% for level 2 employees, while skill group "B" (i.e., "business planners") has a planned reduction of 17% for level 1 employees and a reduction of 12% for level 2 employees.

Employees with the selected skill group and level are selected (step 2725) from sorted employees data store 2730. The surplus percentage of employees is selected from the group based upon the employees' evaluations (step 2740) so that those employees with worse evaluations are recommended for surplus before employees with better evaluations. The selected percentage of employees is stored (step 2750) in recommended surplus data store 2760. Recommended surplus data store 2760 thus includes a list of employees that are recommended for surplus based upon the surplus percentage for the employees' skill group and level and the employees' evaluations.

The next level within the skill group is selected (step 2765) from surplus plan data store 2720. A determination is made as to whether a next level was found (decision 2770). If it was found, decision 2770 branches to "yes" branch 2772 which loops back to process the selected level. This looping continues until all levels within the selected skill group have been processed, at which time decision 2770 branches to "no" branch 2776 to process the next skill group.

The first level within the next skill group is selected (step 2780) within surplus plan data store 2720 (step 2780). A determination is made as to whether a next surplus skill group was found (decision 2785). If a next skill group was found, decision 2785 branches to "yes" branch 2788 which loops back to process the first level within the selected skill group. This looping continues until there are no more skill groups to process, at which time decision 2785 branches to "no" branch 2792 and processing ends at 2795.

Figure 28:
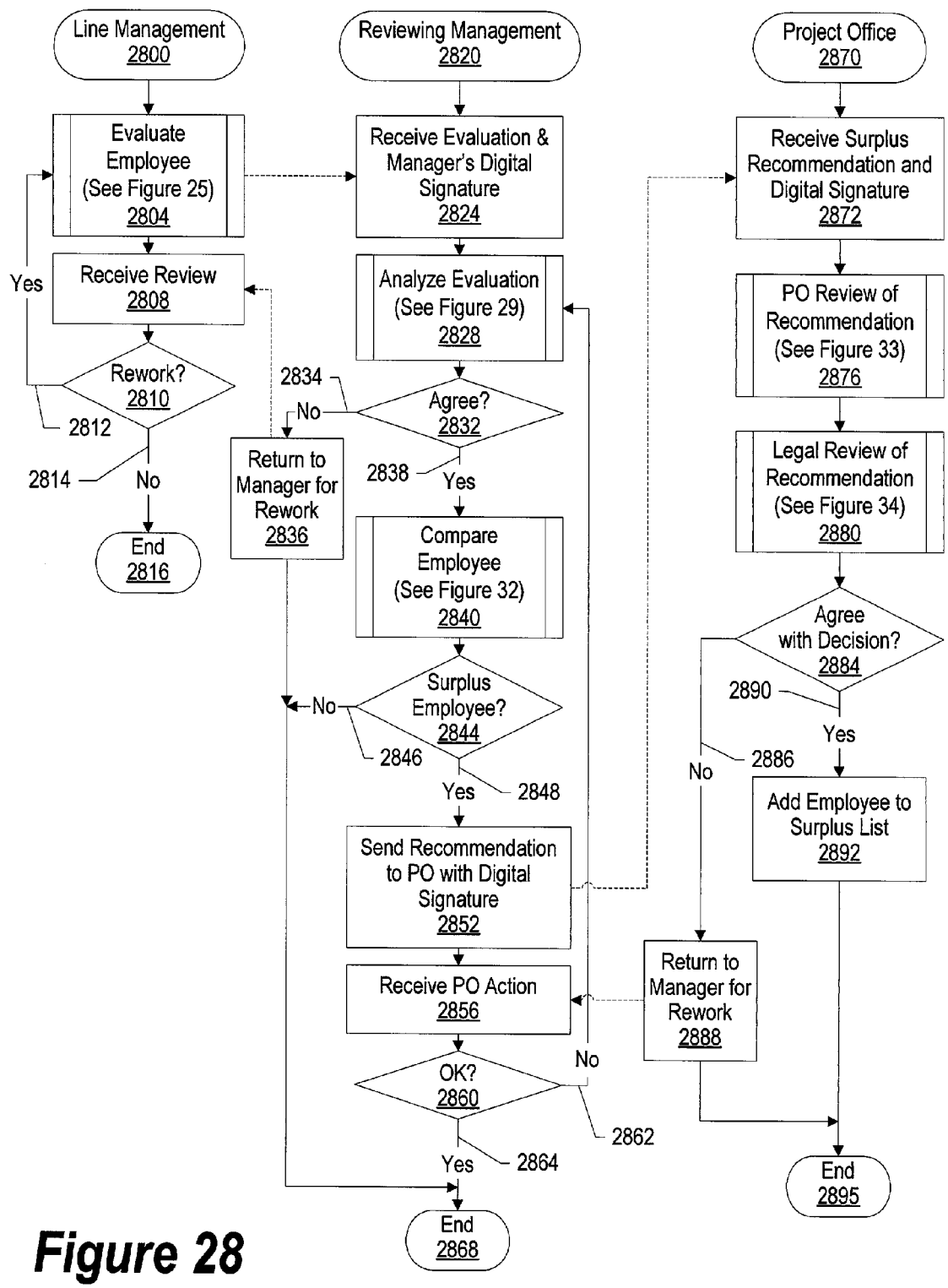
FIG. 28 is a flowchart showing hierarchical management review of employees' skill evaluations.

FIG. 28 is a flowchart showing hierarchical management review of employees' skill evaluations. Line management processing commences at 2800 whereupon the manager evaluates the selected employee (predefined process 2804, see FIG. 25 for processing details). The manager may receive a review of the manager's evaluation of the employee from reviewing management or from the personnel project office managing the resource reduction (step 2808). A determination is made as to whether the manager receives instructions or recommendations to rework the employee's evaluation (decision 2810). For example, the manager may have given a low evaluation to an employee with a stellar work history that is receiving stock options. In this instance, it is very likely that the manager erred in evaluating the employee and the employee's evaluation should be reworked. In this case, decision 2810 branches to "yes" branch 2812 to re-evaluate the selected employee. On the other hand, if the manager does not receive a rework instruction or recommendation from reviewing management or the project office, decision 2810 branches to "no" branch 2814 and processing ends at 2816.

Reviewing management processing commences at 2820 whereupon reviewing management receives an employee evaluation from a manager along with the manager's digital signature authenticating the evaluation (step 2824). The reviewing manager(s) analyze the evaluation (predefined process 2828, see FIG. 29 for processing details). The reviewing manager(s) determine whether to agree with the manager's evaluation based upon the analysis (decision 2832). If the reviewing manager(s) do not agree with the manager's evaluation of the employee, decision 2832 branches to "no" branch 2834 whereupon a message is returned to the manager instructing the manager to rework the evaluation (or further explain the manager's evaluation) along with a digital signature authenticating the source of the message (step 2836) and reviewing manager processing ends at 2868.

Figure 32:
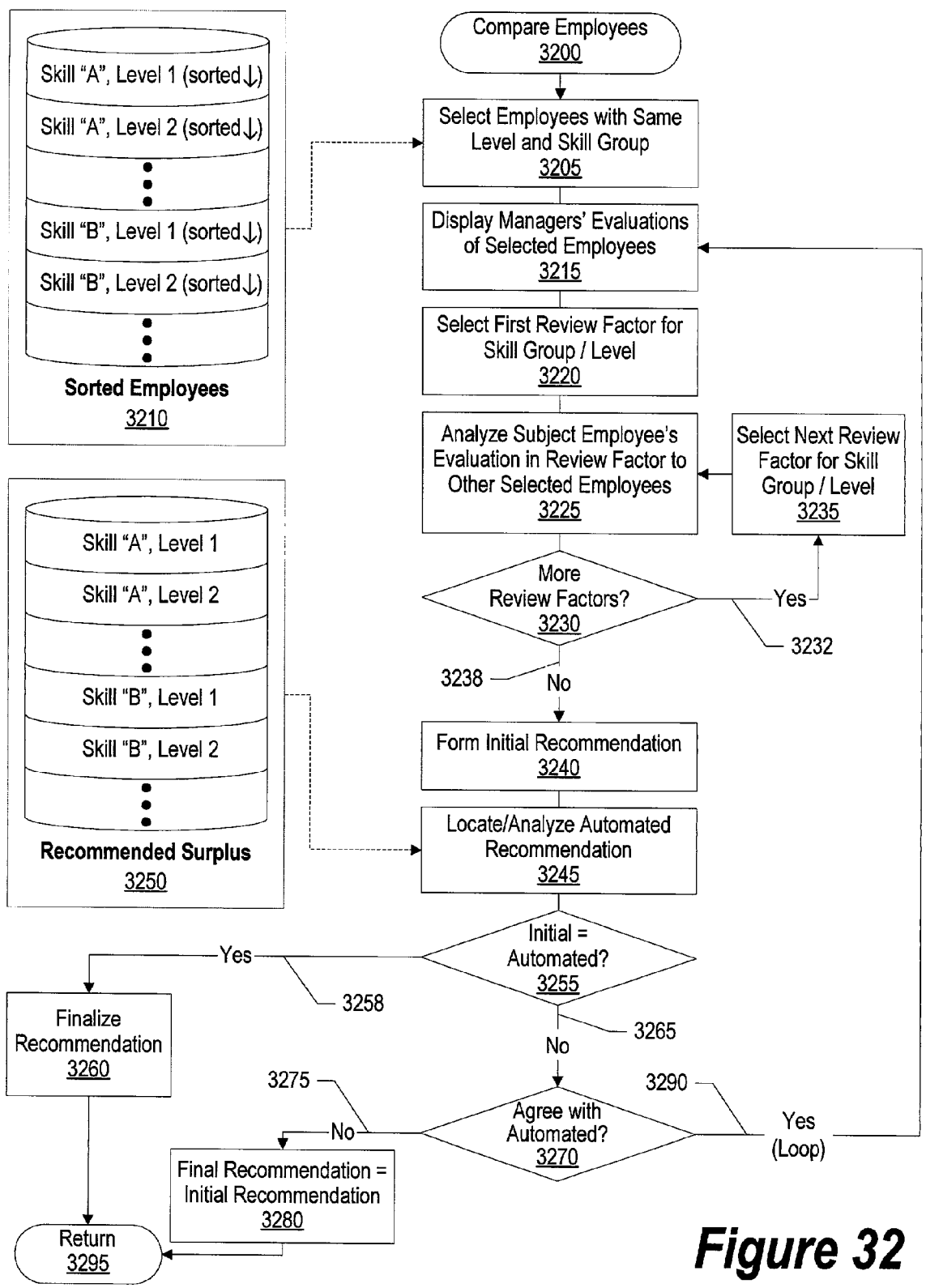
FIG. 32 is a flowchart showing management's comparison of employees within similar skill groups and levels for surplus recommendations.

On the other hand, if the reviewing manager(s) agree with the manager's decision, decision 2832 branches to "yes" branch 2838 whereupon the employee is compared to other employees within the same skill group and level to determine whether to recommend the selected employee for surplus (predefined process 2840, see FIG. 32 for processing details). A determination is made as to whether reviewing management wishes to recommend the selected employee for surplus (decision 2844). If management does not wish to recommend the employee for surplus, decision 2844 branches to "no" branch 2846 and reviewing management processing of the employee ends at 2868. On the other hand, if reviewing management does wish to recommend that the selected employee be laid off (e.g., surplus), decision 2844 branches to "yes" branch 2848 whereupon the recommendation is sent to the project office for further review along with a digital signature authenticating the sender of the message (step 2852). The reviewing management receives the project office's action (step 2856). A determination is made by the reviewing management as to whether the surplus recommendation was accepted by the project office (decision 2860). If the recommendation was not accepted, decision 2860 branches to "no" branch 2862 which loops back to re-analyze and re-evaluate the employee. On the other hand, if the recommendation was accepted, decision 2860 branches to "yes" branch 2864 and reviewing management processing of the employee ends at 2868.

Project office processing commences at 2870 whereupon the project office receives a surplus recommendation for an employee along with a digital signature authenticating the reviewing management that made the recommendation (step 2872). The project office reviews the recommendation (predefined process 2876, see FIG. 33 for processing details). Legal review of the surplus recommendation is also performed (predefined process 2880, see FIG. 34 for processing details) to determine whether the determination may violate any applicable employment laws. A determination is made as to whether the project office agrees with the surplus recommendation (decision 2884). If the project office does not agree with the surplus recommendation, decision 2884 branches to "no" branch 2886 whereupon the recommendation is returned to the reviewing management with comments and possible instructions along with the project office's digital signature authenticating the project office as the sender of the message (step 2888) and project office processing of the employee ends at 2895. On the other hand, if the project office agrees with the surplus recommendation, decision 2884 branches to "yes" branch 2890 whereupon the selected employee is added to the list of surplus employees (step 2992) and project office processing of the employee ends at 2895.

Figure 29:
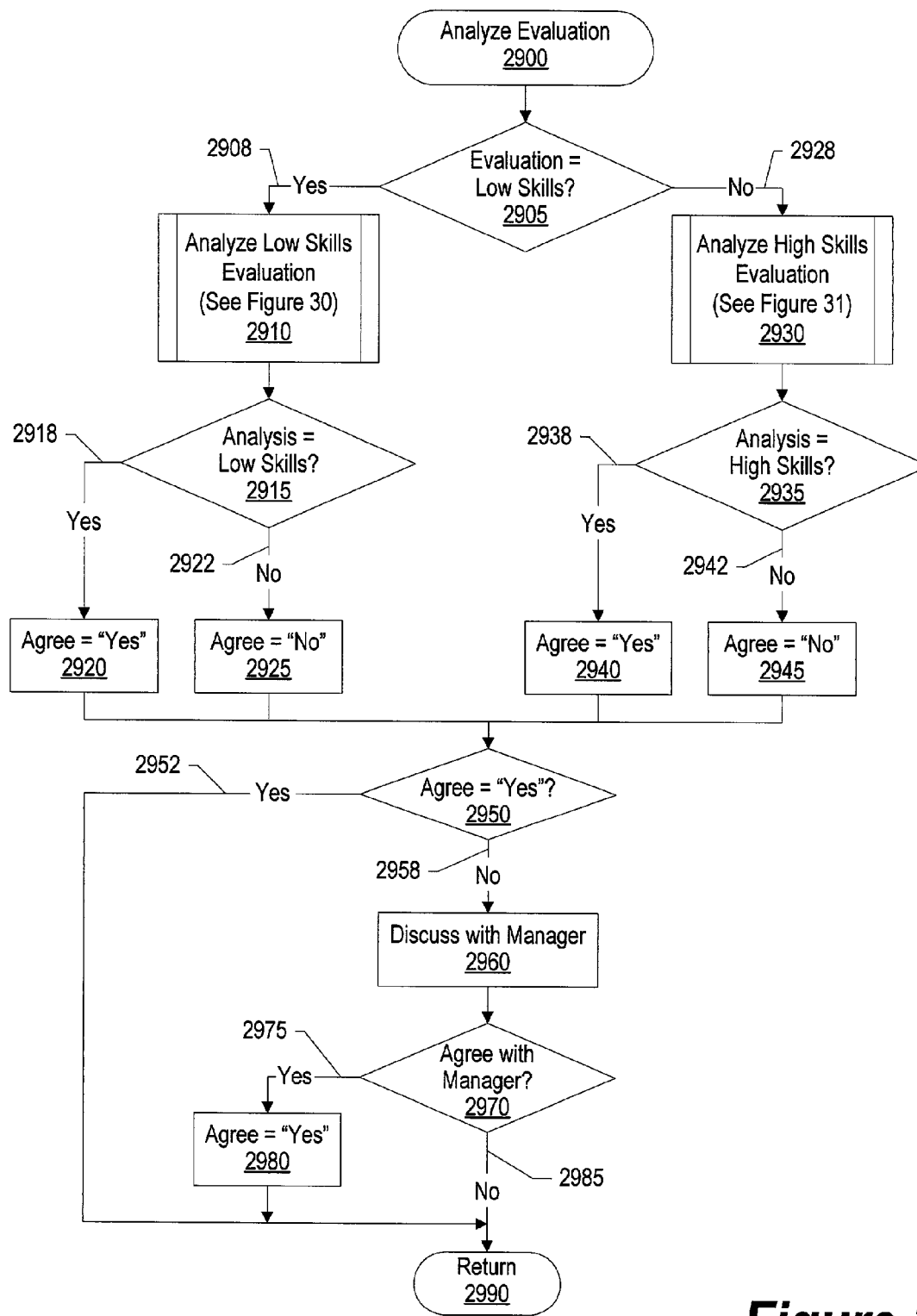
FIG. 29 is a flowchart showing more detailed hierarchical management analysis of employees' skill evaluations.

FIG. 29 is a flowchart showing more detailed hierarchical management analysis of employees' skill evaluations. Processing commences at 2900 whereupon a determination is made as to whether the manager's evaluation of the employee identified the employee as having relatively low skills for the employee's skill group and level (decision 2905). If the employee was identified as a low-skills employee in the manager's evaluation, decision 2905 branches to "yes" branch 2908 for low-skill analysis. On the other hand, if the employee was not identified as a low-skills employee, decision 2905 branches to "no" branch 2928 for higher skill analysis.

Figure 30:
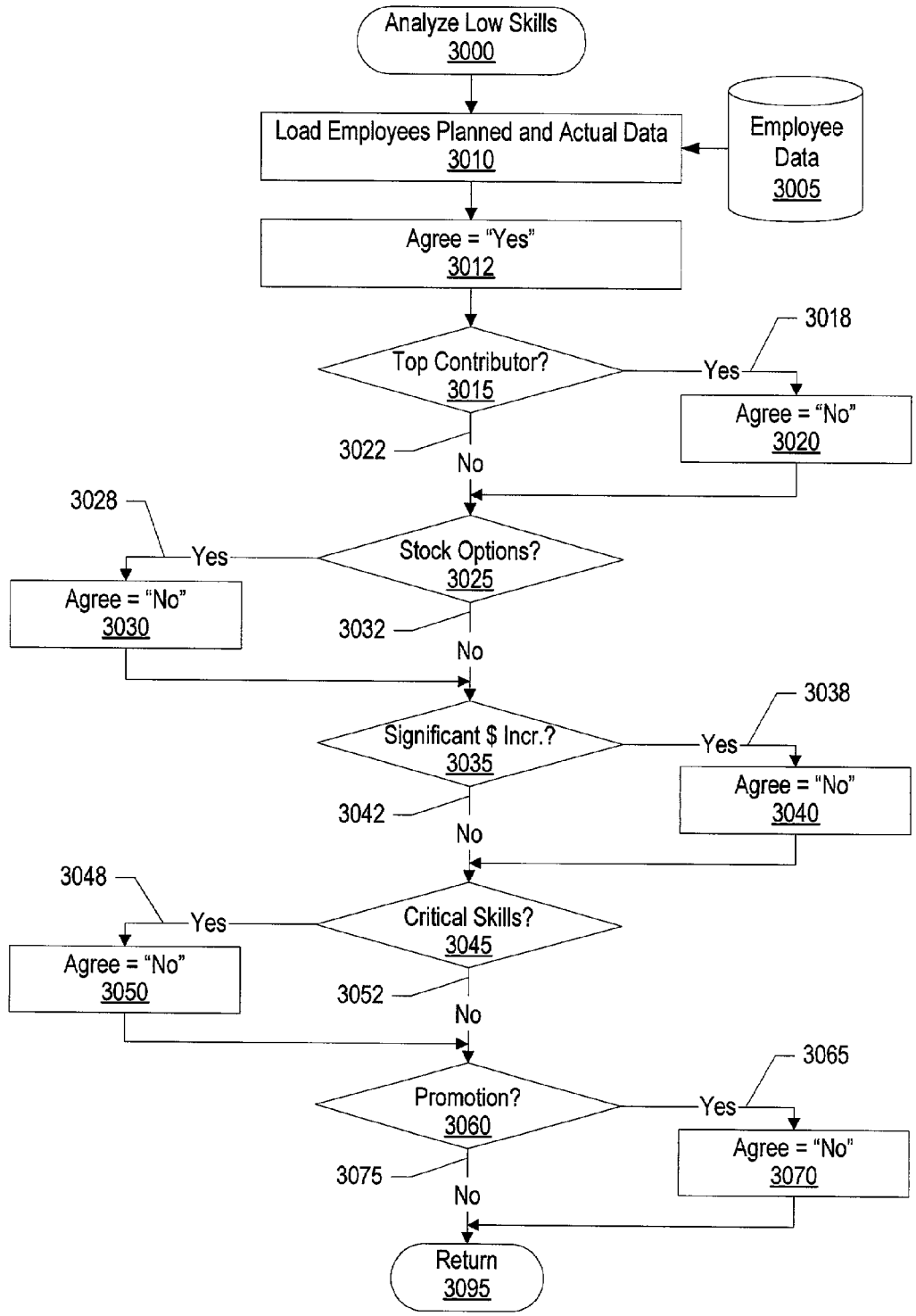
FIG. 30 is a flowchart showing detailed hierarchical management analysis of employee evaluations identified as having low skills.

Branch 2908 leads to an analysis of the low-skills evaluation (predefined process 2910, see FIG. 30 for processing details). A determination is made as to whether the analysis also revealed that the employee has relatively low skills for the skill group and level (decision 2915). If the analysis determined that the employee has low skills, decision 2915 branches to "yes" branch 2918 whereupon a flag is set indicating that the analysis agrees with the manager's evaluation (step 2920). On the other hand, if the analysis did not determine that the employee had low skills, decision 2915 branches to "no" branch 2922 whereupon the flag is set indicating that the analysis did not agree with the manager's evaluation (step 2925).

Figure 31:
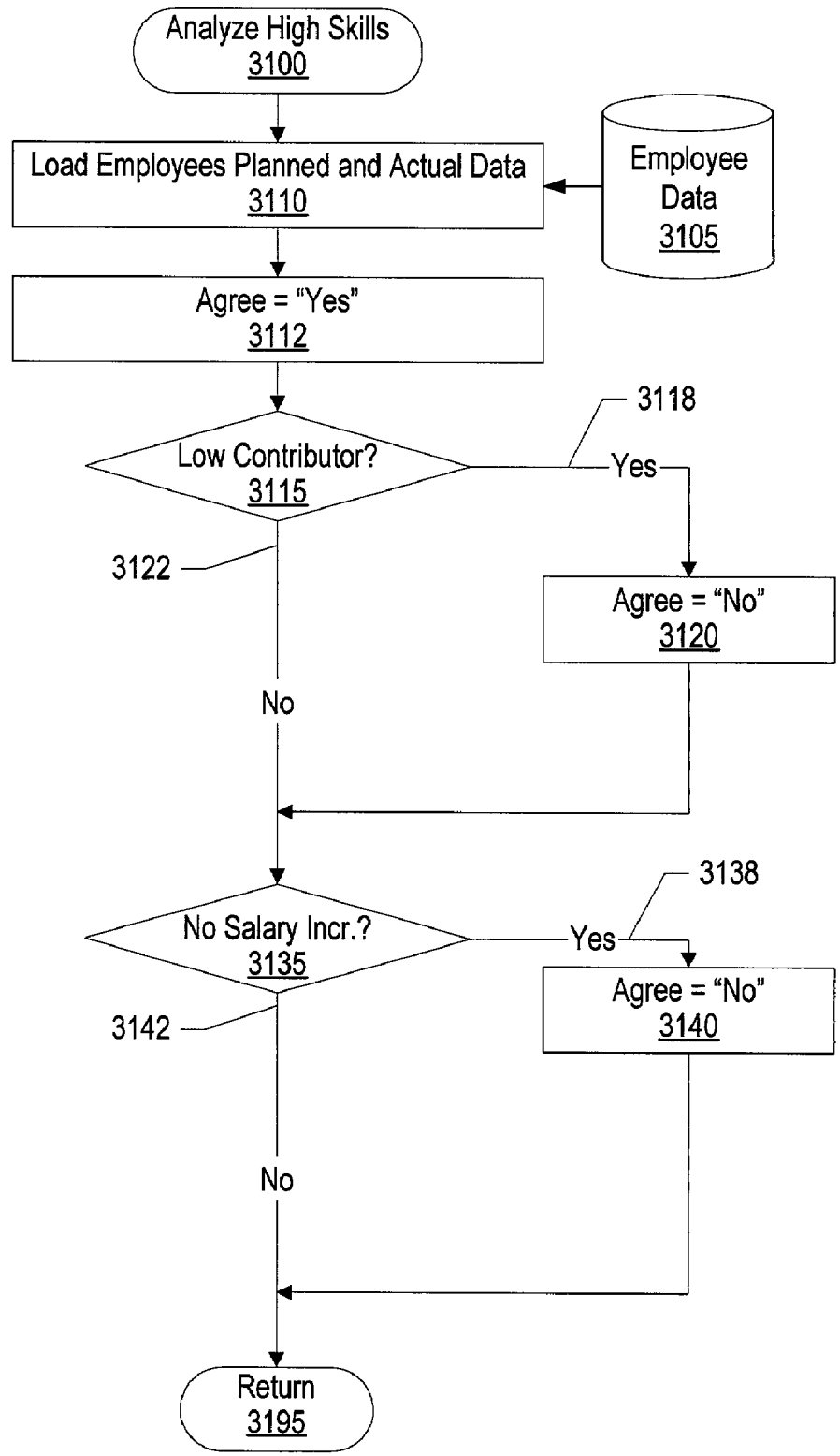
FIG. 31 is a flowchart showing detailed hierarchical management analysis of employee evaluations identified as having high skills.

Returning to decision 2905, branch 2928 leads to an analysis of the high-skills evaluation (predefined process 2930, see FIG. 31 for processing details). A determination is made as to whether the analysis also revealed that the employee has relatively high skills for the skill group and level (decision 2935). If the analysis determined that the employee has high skills, decision 2935 branches to "yes" branch 2938 whereupon a flag is set indicating that the analysis agrees with the manager's evaluation (step 2940). On the other hand, if the analysis did not determine that the employee had high skills, decision 2935 branches to "no" branch 2942 whereupon the flag is set indicating that the analysis did not agree with the manager's evaluation (step 2945).

A determination is made as to whether the analysis agreed with the manager's evaluation of the employee (decision 2950). If the analysis agreed with the manager's evaluation, decision 2950 branches to "yes" branch 2952 whereupon analysis of the manager's evaluation ends at 2990. On the other hand, if the analysis did not agree with the manager's evaluation, decision 2950 branches to "no" branch 2958 whereupon the evaluation is discussed with the manager (step 2960) to determine whether other factors exist warranting the manager's evaluation. The discussion may be telephonic or via electronic messaging and the results may be stored along with the manger's original evaluation. A determination is made as to whether the reviewing management now agrees with the manager's evaluation given the additional information (decision 2970). If the reviewing management now agrees with the manager's evaluation, decision 2970 branches to "yes" branch 2975 whereupon the flag indicating agreement is switched indicating that reviewing management now agrees with the manager's evaluation (step 2980) whereupon processing ends at 2990. If the reviewing management still does not agree with the manager's evaluation of the employee, decision 2970 branches to "no" branch 2985 whereupon the agreement flag remains "no" and processing ends at 2990.

FIG. 30 is a flowchart showing detailed hierarchical management analysis of employee evaluations identified as having low skills. Processing commences at 3000 whereupon planning data and actual data corresponding to the employee is retrieved (step 3010) from employee data store 3005.

An agreement flag is initiated to "yes" indicating that the reviewing management assumes that the manager's evaluation of the employee is acceptable (step 3012). A determination is made as to whether the employee has been identified as a "top contributor" by the manager (decision 3015). If the employee has been identified as a top contributor, decision 3015 branches to "yes" branch 3018 whereupon the agreement flag is set "no" (step 3020). On the other hand, if the employee has not been identified as a top contributor, decision 3015 branches to "no" branch 3022 whereupon the agreement flag is not changed.

A determination is made as to whether the employee is receiving or has been recommended for stock options by the employee's manager (decision 3025). If the employee is receiving stock options or has been recommended for stock options, decision 3025 branches to "yes" branch 3028 whereupon the agreement flag is set to "no" (step 3030). On the other hand, if the employee is not receiving stock options and has not been recommended for stock options, decision 3025 branches to "no" branch 3032 whereupon the agreement flag is not changed.

A determination is made as to whether the employee has been recommended for a significant salary increase by the employee's manager (decision 3035). If the employee has been recommended for a significant salary increase, decision 3035 branches to "yes" branch 3038 whereupon the agreement flag is set to "no" (step 3040). On the other hand, if the employee has not been recommended for a significant salary increase, decision 3035 branches to "no" branch 3042 whereupon the agreement flag is not changed.

A determination is made as to whether the employee has been identified as having skills critical to the success of the organization (decision 3045). If the employee has been identified as having skills critical to the success of the organization, decision 3045 branches to "yes" branch 3048 whereupon the agreement flag is set to "no" (step 3050). On the other hand, if the employee has not been identified as having skills critical to the success of the organization, decision 3045 branches to "no" branch 3052 whereupon the agreement flag is not changed.

A determination is made as to whether the employee has been recommended for a promotion (decision 3060). If the employee has been has been recommended for a promotion, decision 3060 branches to "yes" branch 3065 whereupon the agreement flag is set to "no" (step 3070). On the other hand, if the employee has not been recommended for a promotion, decision 3060 branches to "no" branch 3075 whereupon the agreement flag is not changed.

Other determinations can be used, such as analyzing the employee's prior job performance evaluations, to also aid in determining whether the manager's evaluation of the employee as a low-skilled employee is correct or whether such decision warrants further in-depth review. Processing thereafter ends at 3095.

FIG. 31 is a flowchart showing detailed hierarchical management analysis of employee evaluations identified as having high skills. Processing commences at 3100 whereupon planning data and actual data corresponding to the employee is retrieved (step 3110) from employee data store 3105.

An agreement flag is initiated to "yes" indicating that the reviewing management assumes that the manager's evaluation of the employee is acceptable (step 3112). A determination is made as to whether the employee has been identified as a "low contributor" by the manager (decision 3115). If the employee has been identified as a low contributor, decision 3115 branches to "yes" branch 3118 whereupon the agreement flag is set "no" (step 3120). On the other hand, if the employee has not been identified as a low contributor, decision 3115 branches to "no" branch 3122 whereupon the agreement flag is not changed.

A determination is made as to whether the manager planned on giving the employee no salary increase (decision 3135). If the employee was scheduled to receive no salary increase, decision 3135 branches to "yes" branch 3138 whereupon the agreement flag is set "no" (step 3140). On the other hand, if the employee was scheduled to receive a salary increase, decision 3135 branches to "no" branch 3142 whereupon the agreement flag is not changed.

Other determinations can be used, such as analyzing the employee's prior job performance evaluations, to also aid in determining whether the manager's evaluation of the employee as a high-skilled employee is correct or whether such decision warrants further in-depth review. Processing thereafter ends at 3195.

FIG. 32 is a flowchart showing management's comparison of employees within similar skill groups and levels for surplus recommendations. Processing commences at 3200 whereupon employees with the same skill group and level are selected (step 3205) from sorted employees data store 3210. Sorted employees data store 3210 includes employees grouped by skill group and level and sorted by the employees' evaluations.

The managers' evaluations of the selected employees are displayed to the manger(s) determining whether to retain or surplus employees (step 3215). The first review factor corresponding to the selected skill group and level is selected (step 3220). The subject employee's evaluation is compared to the other selected evaluations based on the review factor (step 3225). The analysis can include review of both objective and subjective measures corresponding to the employees. A determination is made as to whether there are more review factors to use for analysis (decision 3230). If there are more review factors to consider, decision 3230 branches to "yes" branch 3232 which loops back to select the next review factor for the selected skill group and level (step 3235) and analyze the employee based on the next review factor. This looping continues until all review factors have been considered, at which point decision 3230 branches to "no" branch 3238. The reviewing manager(s) form an initial recommendation (step 3240) as to whether the selected employee should be laid-off (i.e., surplus employee). The system's automated recommendation is retrieved (step 3245) from recommended surplus data store 3250 (see FIG. 27 for details in the formation of the recommended surplus list).

A determination is made as to whether the managers initial recommendation is the same as the automated recommendation (decision 3255). If the recommendations are the same, decision 3255 branches to "yes" branch 3258 whereupon the initial recommendation is finalized (step 3260) and processing returns at 3295. On the other hand, if the initial recommendation is not the same as the automated recommendation, decision 3255 branches to "no" branch 3265 whereupon another determination is made as to whether the managers agree with the automated recommendation (decision 3270). If the managers agree with the automated recommendation, decision 3270 branches to "yes" branch 3290 which loops back to re-analyze the subject employee. This looping continues until either the managers' recommendation is the same as the automated recommendation (i.e., decision 3255 branches to "yes" branch 3258) or the managers no longer agree with the automated recommendation (i.e., decision 3270 branches to "no" branch 3275). On the other hand, if the managers do not agree with the automated recommendation (i.e., the managers' initial recommendation is preferred), decision 3270 branches to "no" branch 3275 whereupon the initial recommendation is finalized (step 3280) and processing returns at 3295.

Figure 33:
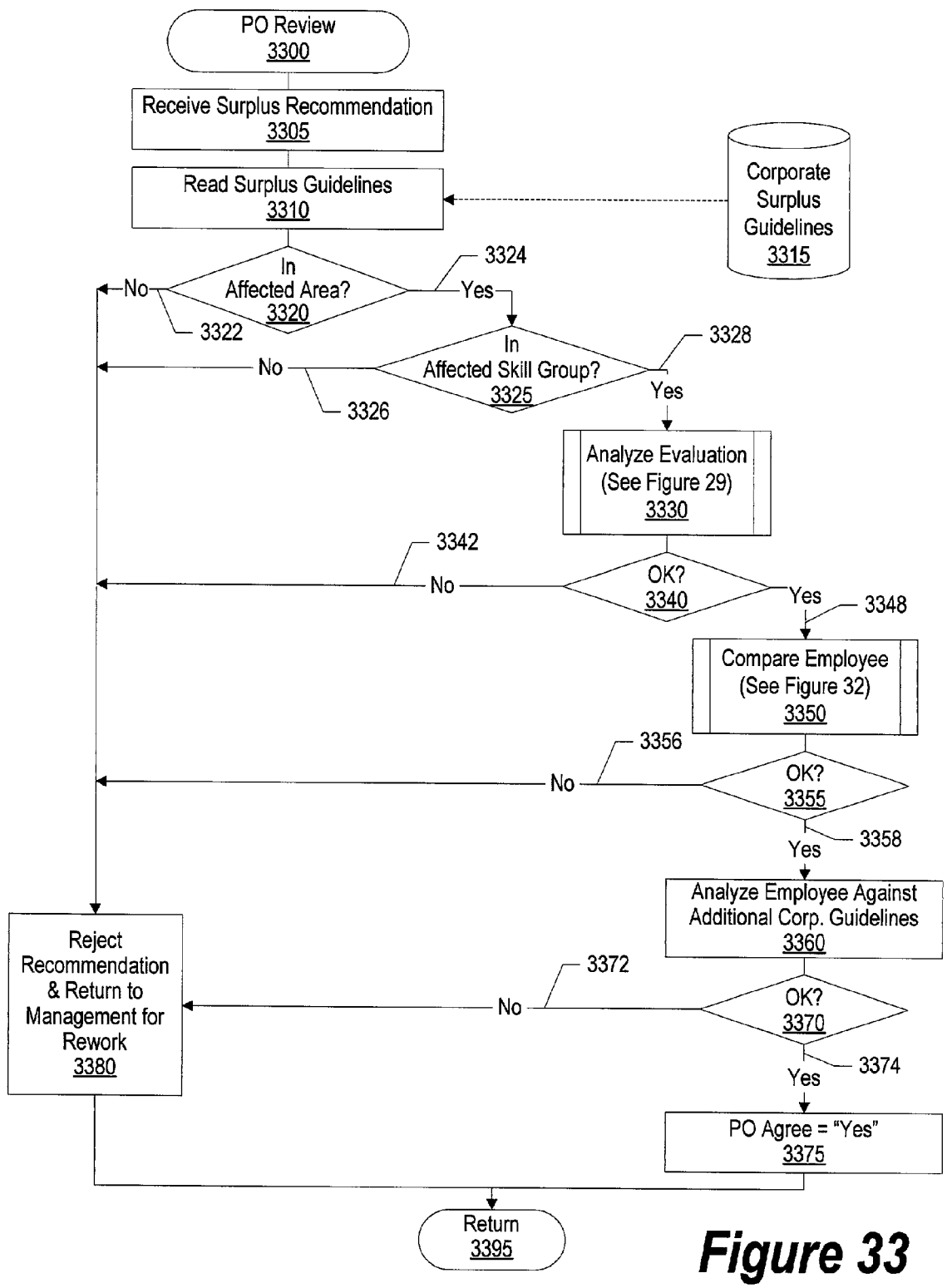
FIG. 33 is a flowchart showing project office review of surplus recommendations.

FIG. 33 is a flowchart showing project office review of surplus recommendations. Project office review processing commences at 3300 whereupon the project office receives a surplus recommendation for an employee (step 3305). Corporate surplus guidelines data store 3315 that define parameters corresponding to the resource reduction are read (step 3310). A determination is made as to whether the employee recommended for surplus is in one of the affected areas (decision 3320). If the employee is not in one of the affected areas, decision 3320 branches to "no" branch 3322 whereupon the surplus recommendation is rejected and returned to management with instructions for reworking the recommendation (step 3380) and processing returns at 3395.

On the other hand, if the employee is in one of the affected areas, decision 3320 branches to "yes" branch 3324 whereupon a determination is made as to whether the employee's skill group falls within the selected skill group (decision 3324). If the employee's skill group (and optionally the employee's level) are not within an affected skill group, decision 3325 branches to "no" branch 3326 whereupon the surplus recommendation is rejected and returned to management with instructions for reworking the recommendation (step 3380) and processing returns at 3395.

On the other hand, if the employee's skill group falls within the selected skill group, decision 3325 branches to "yes" branch 3328 whereupon the employee's evaluation is analyzed by the project office (predefined process 3330, see FIG. 29 for processing details). A determination is made as to whether the employee's evaluation is acceptable (decision 3340). If the evaluation of the employee is not acceptable, decision 3340 branches to "no" branch 3342 whereupon the surplus recommendation is rejected and returned to management with instructions for reworking the recommendation (step 3380) and processing returns at 3395.

On the other hand, if the evaluation of the employee is acceptable, decision 3340 branches to "yes" branch 3348 whereupon the employee's evaluation is compared to other employees in the same skill group and level (predefined process 3350, see FIG. 32 for processing details). A determination is made as to whether the project office agrees with management's surplus recommendation for the employee (decision 3355). If the managers' recommendation is not acceptable, decision 3355 branches to "no" branch 3356 whereupon the surplus recommendation is rejected and returned to management with instructions for reworking the recommendation (step 3380) and processing returns at 3395.

On the other hand, if the managers' surplus recommendation is acceptable, decision 3355 branches to "yes" branch 3358 whereupon the employee is analyzed (step 3360) using additional corporate surplus guidelines set forth in corporate surplus guidelines 3315. A determination is made as to whether the surplus recommendation is acceptable in light of any additional corporate surplus guidelines (decision 3370). If the surplus recommendation is not acceptable, decision 3370 branches to "no" branch 3372 whereupon the surplus recommendation is rejected and returned to management with instructions for reworking the recommendation (step 3380) and processing returns at 3395. On the other hand, if the surplus recommendation is acceptable, decision 3370 branches to "yes" branch 3374 whereupon a flag is set indicating that the project office agrees with the managers' surplus recommendation regarding the employee and processing returns at 3395.

Figure 34:
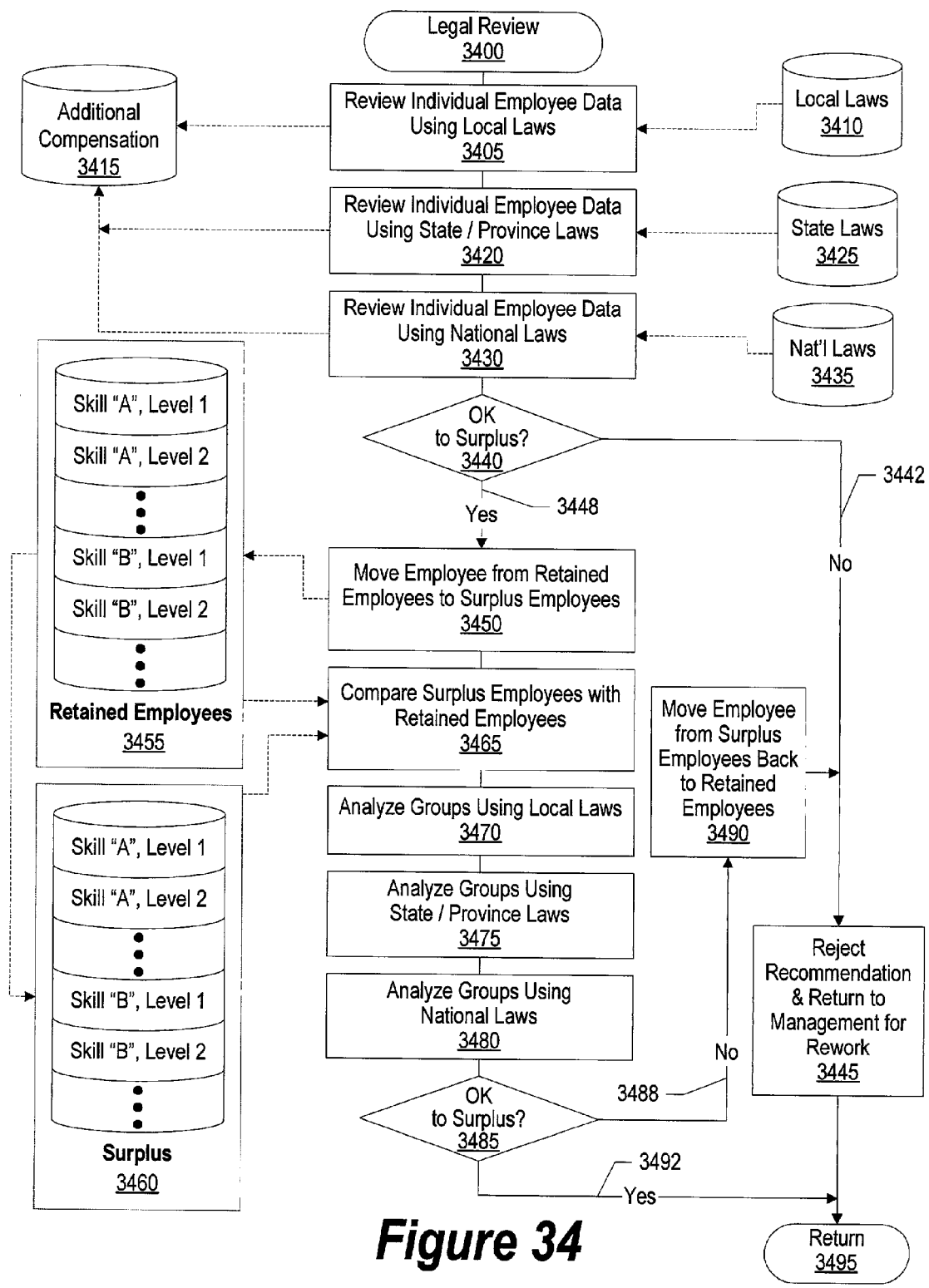
FIG. 34 is a flowchart showing legal review of surplus recommendations.

FIG. 34 is a flowchart showing legal review of surplus recommendations. Legal review processing commences at 3400 whereupon the employee's employment data is reviewed (step 3405) using local employment laws (data store 3410) applicable to the employee and the organization. Some laws may require additional severance compensation or benefits be provided to the employee based on the employee's employment factors. For example, a local law may require employees to receive a minimum of four weeks of severance pay regardless of the number of years the employee has been employed by the organization. Any additional compensation needed to comply with laws is stored in additional compensation data store 3415. Likewise, the individual employee's employment data is reviewed against state and national laws (steps 3420 and 3430 and respective data stores 3425 and 3435) to determine whether additional compensation needs to be allocated and included in additional compensation data store 3415 in order to process the surplus recommendation. In addition, the individual employee data is reviewed using local, state/provincial and national laws to ensure that the employee can be laid off without violating applicable laws.

A determination is made as to whether the surplus recommendation for the individual employee can be processed without violating any local, state/provincial, or national laws (decision 3440). If processing the surplus recommendation would violate any applicable laws, decision 3440 branches to "no" branch 3442 whereupon the surplus recommendation is rejected and returned to management to rework along with guidance pertaining to the laws in question (step 3445) and legal review processing returns at 3495.

On the other hand, if processing the individual employee surplus recommendation does not violate any applicable laws, decision 3440 branches to "yes" branch 3448 in order to aggregate the employees and perform further legal analyses. The employee's data record is moved from retained employees data store 3455 to surplus employees data store 3460 (step 3450). The surplus employees data store is compared with the retained employees data store to ensure that protected classes of employees are not being discriminated against in violation of any applicable laws (step 3465). The retained employees and surplus employees are analyzed using local, state/provincial, and national laws (steps 3470, 3475, and 3480 respectively).

A determination is made as to whether the recommendation to surplus the employee violates any applicable laws when reviewing aggregate employee groups (decision 3485). The analysis of aggregate groups of employees may be delayed until all employees have been analyzed and a complete list of employees recommended as surplus is provided by management. If the recommendation to surplus the employee violates any applicable laws when reviewed as a group, decision 3485 branches to "no" branch 3488 whereupon the employee data record is moved (step 3490) from surplus employees data store 3460 back to retained employees data store 3455, the surplus recommendation is rejected and returned to management to rework along with guidance pertaining to the laws in question (step 3445) and legal review processing returns at 3495. On the other hand, if the recommendation to surplus the employee does not violate any applicable laws when reviewed as a group, decision 3485 branches to "yes" branch 3492 whereupon processing returns at 3495.

Figure 35:
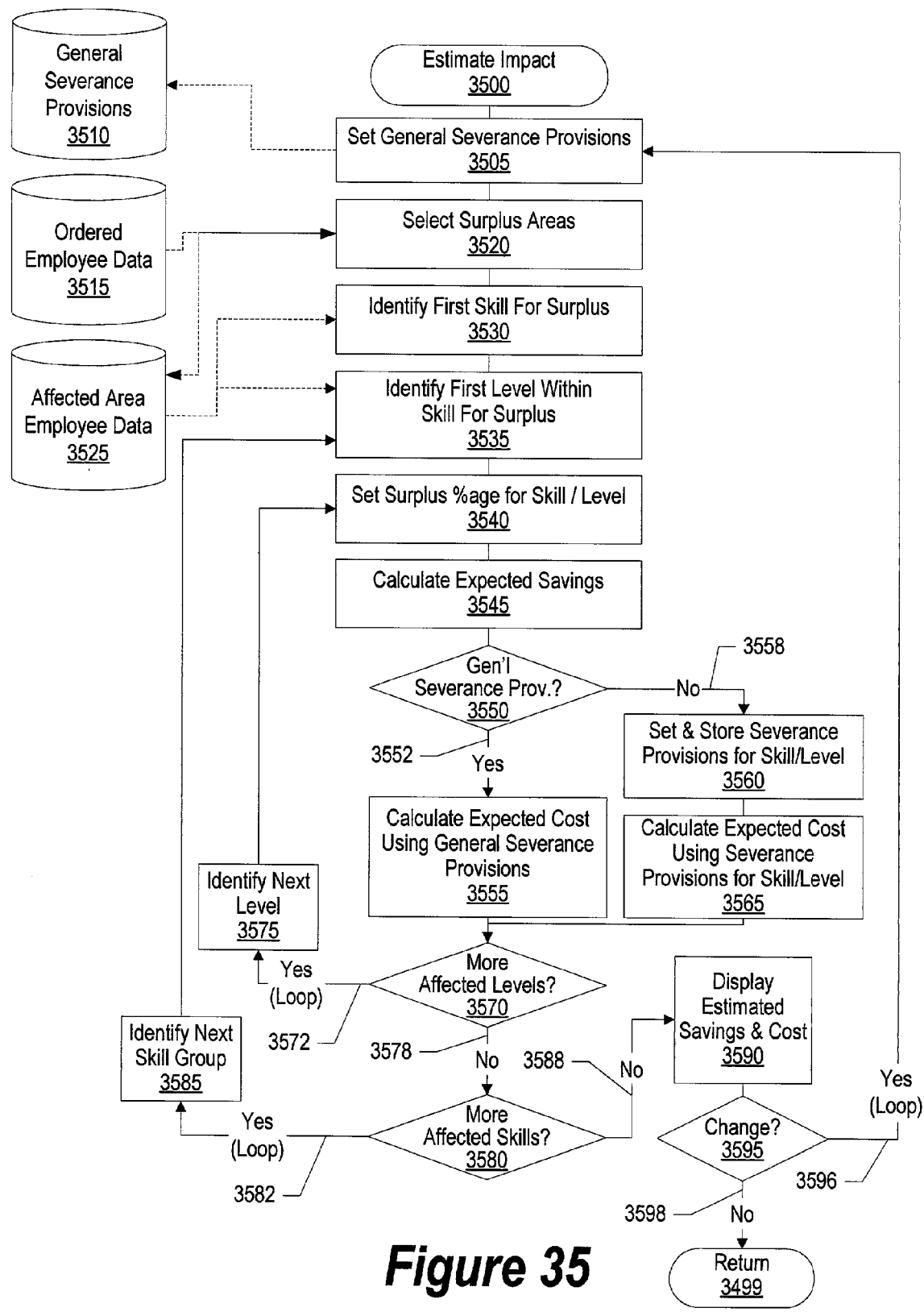
FIG. 35 is a flowchart showing financial impact estimation of a proposed surplus action prior to evaluation of employees' skills.

FIG. 35 is a flowchart showing financial impact estimation of a proposed surplus action prior to evaluation of employees' skills. Impact estimation processing commences at 3500 whereupon general severance provisions are established for the organization (step 3505) and stored in general severance provision data store 3510. General severance provisions may include benefits and compensation the organization plans on providing to surplus employees that are laid off. For example, an organization may plan on giving each surplus employee two weeks of pay for every year they have worked for the company and six months of medical benefits so that the employees can locate and transition to different jobs with less personal impact on the affected employees.

Organizational data includes affected area data store 3525 and employee data store 3515 that includes compensation information for current employees. Surplus areas are selected (step 3520) as well as skill groups and levels (steps 3530 and 3535). The surplus percentage for the skill and level are determined and stored (step 3540). An expected savings (i.e., annual salary savings) is calculated by computing the average compensation paid to employees of the given skill group and level by the estimated number of surplus employees that will be reduced based on the surplus percentage. A determination is made as to whether the general severance provisions are planned for the selected skill group (decision 3550). If the general severance provisions are planned for the selected skill group, decision 3550 branches to "yes" branch 3552 whereupon an estimated cost to surplus the planned percentage of employees is calculated using the general severance provisions (step 3555). For example, if the average number of years worked and weekly salary within a given skill group and level is 10 years and $500, respectively, and the organization plans on providing surplus employees with 2 weeks pay for each year they have worked, then the estimated cost to surplus the group of employees would be 20 weeks of pay multiplied by the $500 average weekly salary for an estimated cost of $10,000 for each surplus employee within the skill group and level. Therefore, if the organization plans on laying off 15 such employees, the planned cost would be approximately $150,000.

On the other hand, if general severance provisions are not used for the affected skill group and level, decision 3550 branches to "no" branch 3558 to process the different severance provision. For example, an organization may wish to provide increased severance benefits to a particular group of employees for certain business reasons. These severance provisions for the given skill group and level are provided and stored (step 3560). An estimated cost to surplus the planned percentage of employees is calculated using the special severance provisions (step 3565).

A determination is made as to whether there are more affected levels within the skill group to process (decision 3570). If there are more affected levels, decision 3570 branches to "yes" branch 3572 whereupon processing identifies the next level within the skill group (step 3575) and loops back to estimate savings and costs for the next level. This looping continues until there are no more affected levels for the skill group, at which point decision 3570 branches to "no" branch 3578. A determination is made as to whether there are more affected skill groups to process within the affected organizational areas (decision 3580). If there are more affected skill groups, decision 3580 branches to "yes" branch 3582 whereupon processing identifies the next skill group within the affected area (step 3585) and loops back to estimate savings and costs for the next skill group. This looping continues until there are no more affected skill groups, at which point decision 3580 branches to "no" branch 3588. A total estimated savings and cost are displayed for all affected skill groups and levels (step 3590).

A determination is made as to whether the planned resource reduction needs to be changed (decision 3595). For example, an organization may need to reduce costs by $1 million and the estimated savings only indicates that $900 thousand in salaries will be saved by the planned resource reduction. In this case, more employees will have to be identified as surplus by increasing the surplus percentage for one or more skill groups and levels. In addition, costs to perform the resource reduction may have a budget of $500,000 but, using the planned severance provisions the costs are estimated at $600,000. In this case, the severance provisions can be reduced, for example 2 weeks pay for every year worked with a maximum of 10 weeks of pay per employee, to reduce the severance costs. If estimated savings and/or costs need to change, decision 3595 branches to "yes" branch 3596 which loops back to revise and edit severance provisions and surplus percentages. This looping continues until the estimated costs and savings are acceptable, at which point decision 3595 branches to "no" branch 3598 and processing ends at 3599.

Figure 36:
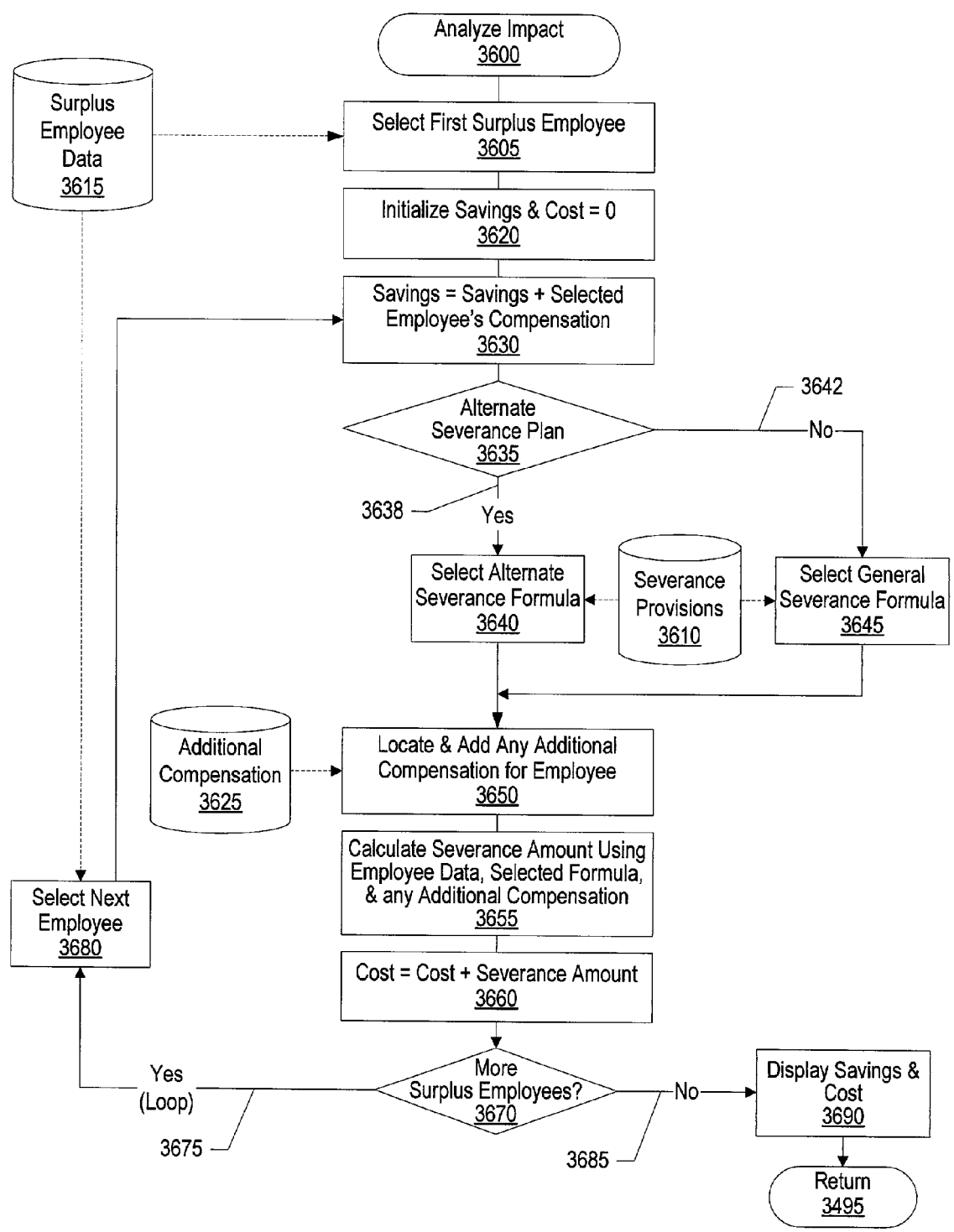
FIG. 36 is a flowchart showing financial impact analysis of a surplus action after evaluating and recommending individual employees for surplus disposition.

FIG. 36 is a flowchart showing financial impact analysis of a surplus action after evaluating and recommending individual employees for surplus disposition. Impact analysis processing commences at 3600 whereupon a first surplus employee is selected (step 3605) from surplus employee data store 3615. A total cost and a total savings amount are each initialized to 0 (step 3620). Savings is calculated as the current total savings amount plus the amount saved based on the selected employee's salary (step 3630). A determination is made as to whether the selected employee receives an alternate severance package rather than the general severance package (decision 3635) based on the employee's skill group and/or the employee's level. If the employee receives an alternate severance plan, decision 3635 branches to "yes" branch 3638 whereupon the alternate severance formula is selected (step 3640) from severance provisions data store 3610. On the other hand, if the employee does not receive an alternate severance plan, decision 3635 branches to "no" branch 3642 whereupon the general severance formula is selected (step 3645) from severance provisions data store 3610.

Any additional compensation payable to the employee is retrieved (step 3650) from additional compensation data store 3625. Additional compensation may be payable, for example, to satisfy various employment laws pertaining to laying off the particular employee (see FIG. 34 for details). The amount of severance payable to the employee is calculated by using the selected employee's employment data (i.e., compensation), the selected severance formula, and any additional compensation (step 3655). The total cost is calculated by adding the severance cost for the selected employee to the current total cost (step 3660). A determination is made as to whether there are more surplus employees (decision 3670). If there are more surplus employees, decision 3670 branches to "yes" branch 3675 which selects the next surplus employee (step 3680) and loops back to calculate the savings and cost pertaining to the next selected employee. This looping continues until there are no more surplus employees, at which point decision 3670 branches to "no" branch 3685 whereupon the total savings and severance costs are displayed (step 3690) and processing ends at 3495.

Figure 37:
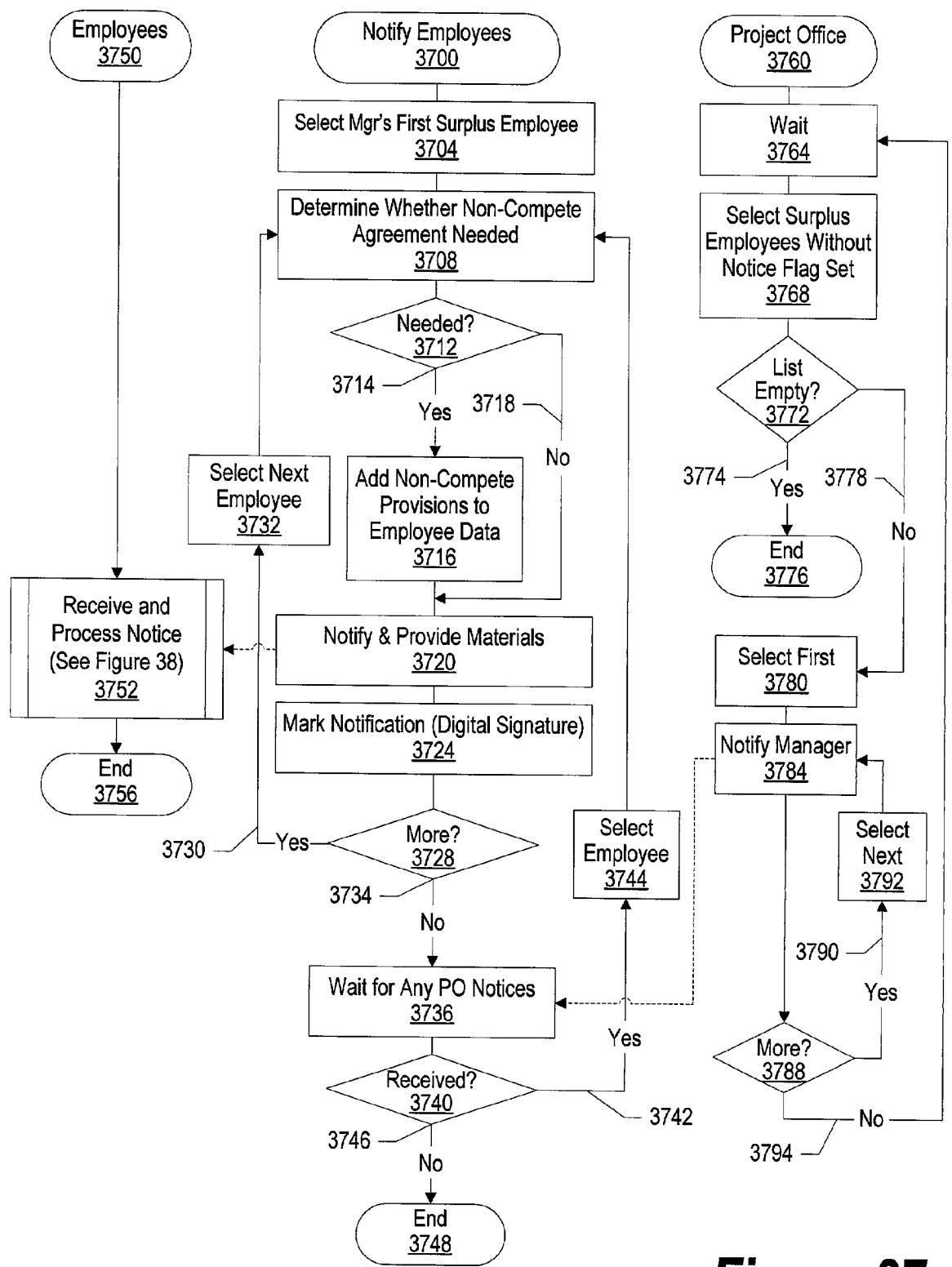
FIG. 37 is a flowchart showing management notification of surplus employees.

FIG. 37 is a flowchart showing management notification of surplus employees. Employee notification processing commences at 3700 whereupon a manager selects a first surplus employee (step 3704). The manager, with possible assistance from other employees in the organization, determines whether a non-compete agreement is needed between the employee and the organization (step 3708). A non-compete agreement may be needed if the employee is in possession or knowledge of organizational trade secrets and the disclosure of the trade secrets to competitors would be detrimental to the organization.

A determination is made as to whether a non-compete agreement is needed (decision 3712). If a non-compete agreement is needed, decision 3712 branches to "yes" branch 3714 and the necessary non-compete provisions are added to the employee's data for processing by the employee (step 3716). On the other hand, if a non-compete agreement is not needed, decision 3712 branches to "no" branch 3718 which bypasses the step of adding non-compete provisions to the employee's data.

A notification is prepared (with or without a non-compete agreement depending on decision 3712) and the notification and surplus information materials are provided to the employee (step 3720). The manager marks the notification by digitally signing a notification which is included in a surplus data store along with a timestamp corresponding to the manager's notification (step 3724). A determination is made as to whether there are more employees for the manager to notify (decision 3724). If there are more employees to notify, decision 3724 branches to "yes" branch 3730 which loops back to process and notify the next employee. This looping continues until there are no more employees to notify, at which time decision 3728 branches to "no" branch 3734 whereupon the manager receives any notices regarding notifications from the project office (step 3736). A determination is made as to whether any project office notifications are received (decision 3740). If any project office notifications are received, decision 3740 branches to "yes" branch 3742 which selects the employee data corresponding to the notification (step 3744) and loops back to notify the selected employee. On the other hand, if the manager does not receive any project office notifications, decision 3740 branches to "no" branch 3746 and the manager's employee notification processing ends at 3748.

Figure 38:
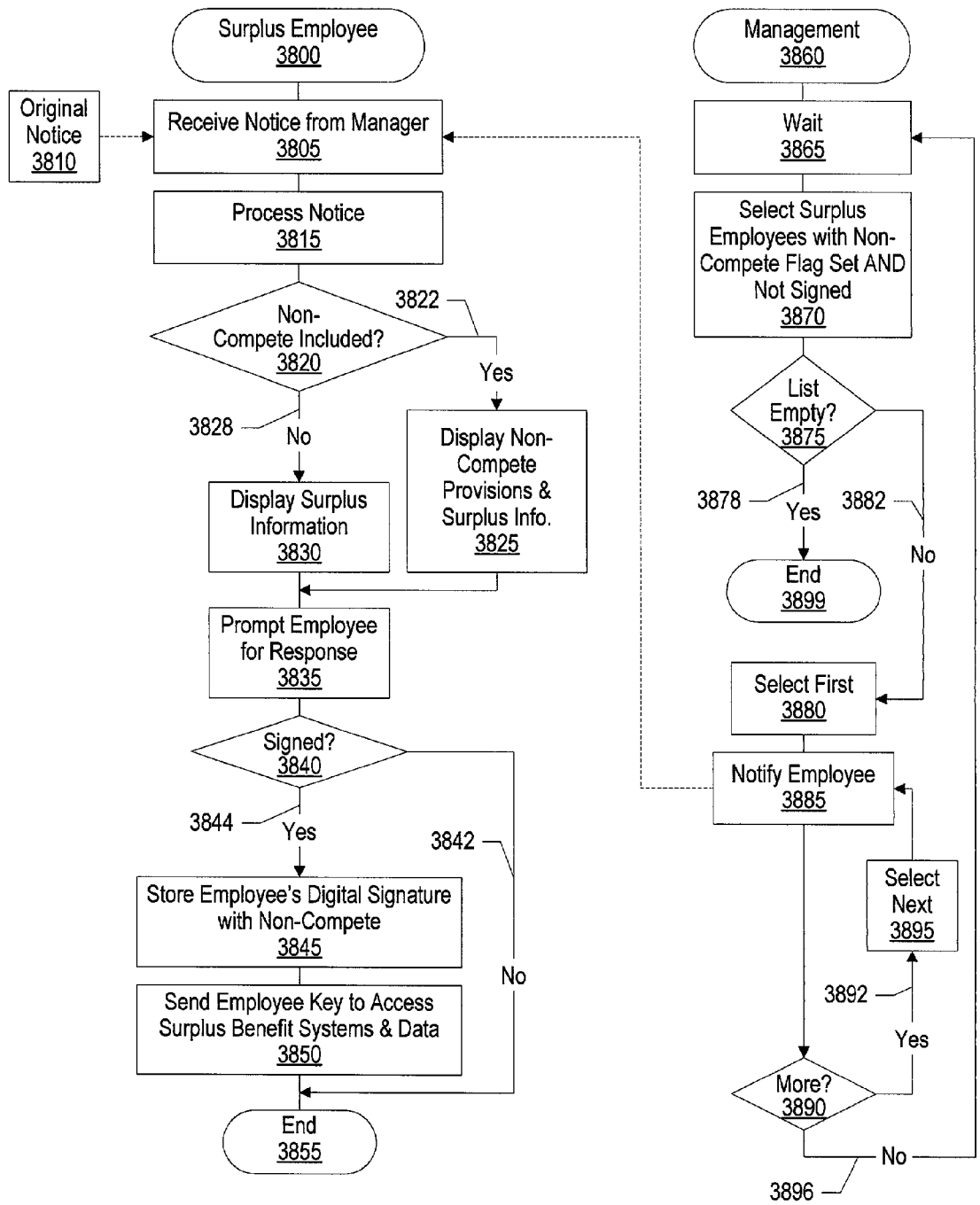
FIG. 38 is a flowchart showing processing of surplus notification and non-compete obligations by affected employees.

Employee notification processing commences at 3750 whereupon the employee receives and processes the surplus notice provided by the manager (predefined process 3752, see FIG. 38 for processing details). The notice from the manager may be an electronic notice that has been digitally signed by the manager so that the employee can authenticate the sender of the notice. Employee processing thereafter ends at 3756.

Project office notification processing commences at 3760 whereupon the project office waits for a period of time to allow mangers to notify surplus employees (step 3764). After the time period elapses, the project offices selects surplus employees that have not yet been notified (step 3768). A determination is made as to whether the list of non-notified employees is empty (decision 3772). If the list is empty, decision 3772 branches to "yes" branch 3774 and project office notification processing ends at 3776.

On the other hand, if the list of non-notified surplus employees is not empty, decision 3772 branches to "no" branch 3778 whereupon the first employee in the list is selected (step 3780). A notification is prepared, digitally signed, and sent to the selected employee's manager informing the manager that the employee needs to be informed concerning the resource reduction (step 3784). A determination is made as to whether there are more surplus employees in the list that have not been notified (decision 3788). If there are more surplus employees in the list, decision 3788 branches to "yes" branch 3790 whereupon processing loops to select (step 3792) and notify manager of the next employee in the list. This looping continues until there are no more employees in the list, whereupon decision 3788 branches to "no" branch 3794 which loops back to wait for another time interval (step 3764) before checking to see if all surplus employees have been notified by their management. This looping continues until the list of non-notified surplus employees is empty, at which point decision 3772 branches to "yes" branch 3774 and processing ends at 3776.

FIG. 38 is a flowchart showing processing of surplus notification and non-compete obligations by affected employees. Surplus employee processing commences at 3800 whereupon the employee receives (step 3805) original surplus notice 3810 from the employee's management. The employee processes the notice (step 3815). In one embodiment, the notice is an electronic message that is processed by opening the message.

A determination is made as to whether a non-compete agreement is included in the surplus notice (decision 3820). If non-compete provisions are included, decision 3820 branches to "yes" branch 3822 whereupon the non-compete provisions and the surplus information is displayed to the employee (step 3825). On the other hand, if non-compete provisions are not included, decision 3820 branches to "no" branch 3828 whereupon the surplus information is displayed to the employee (step 3830). Surplus information may include information about the employee's severance benefits as well as a termination date.

The employee is prompted for a response, such as a digital signature, after viewing the information (step 3835). A determination is made as to whether the employee signed the document indicating the employee's acknowledgement to the surplus information and agreement to any included non-compete provisions (decision 3840). If the employee signed the document, decision 3840 branches to "yes" branch 3844 whereupon the employee's digital signature is stored along with any non-compete provisions (step 3845) and the employee is sent a key (step 3850), such as a userid/password, to use to access special surplus benefits systems and data that assist the employee in locating employment either within or outside the organization as well as transition information. On the other hand, if the employee does not sign the document, decision 3840 branches to "no" branch 3842 which bypasses steps 3845 and 3850. Surplus employee processing thereafter ends at 3855.

Management processing commences at 3860 whereupon the manager waits for a sufficient time for notified employees to sign the documents concerning surplus information and/or non-compete obligations (step 3865). After the waiting period elapses, employees that report to the manager that have non-compete obligations that have not been signed by the respective employees are selected (step 3870). A determination is made as to whether the list of employees is empty (decision 3875). If the list is not empty, decision 3875 branches to "no" branch 3882 whereupon the first employee in the list is selected (step 3880) and a notification is prepared and sent (step 3885) from the manager to the employee asking the employee to sign the document acknowledging the employee's non-compete obligations.

A determination is made as to whether there are more employees in the list to notify (decision 3890). If there are more employees, decision 3890 branches to "yes" branch 3892 which selects (step 3895) and notifies the next employee from the list. This looping continues until there are no more employees to notify, at which point decision 3890 branches to "no" branch 3896 which loops back to wait for a time interval (step 3865) and recheck the employee data to determine whether all employees with non-compete obligations have signed documents acknowledging such obligations. This looping continues until the list of employees that have non-compete obligations and have not signed acknowledgements is empty, at which point decision 3875 branches to "yes" branch 3878 and processing ends at 3899.

Figure 39:
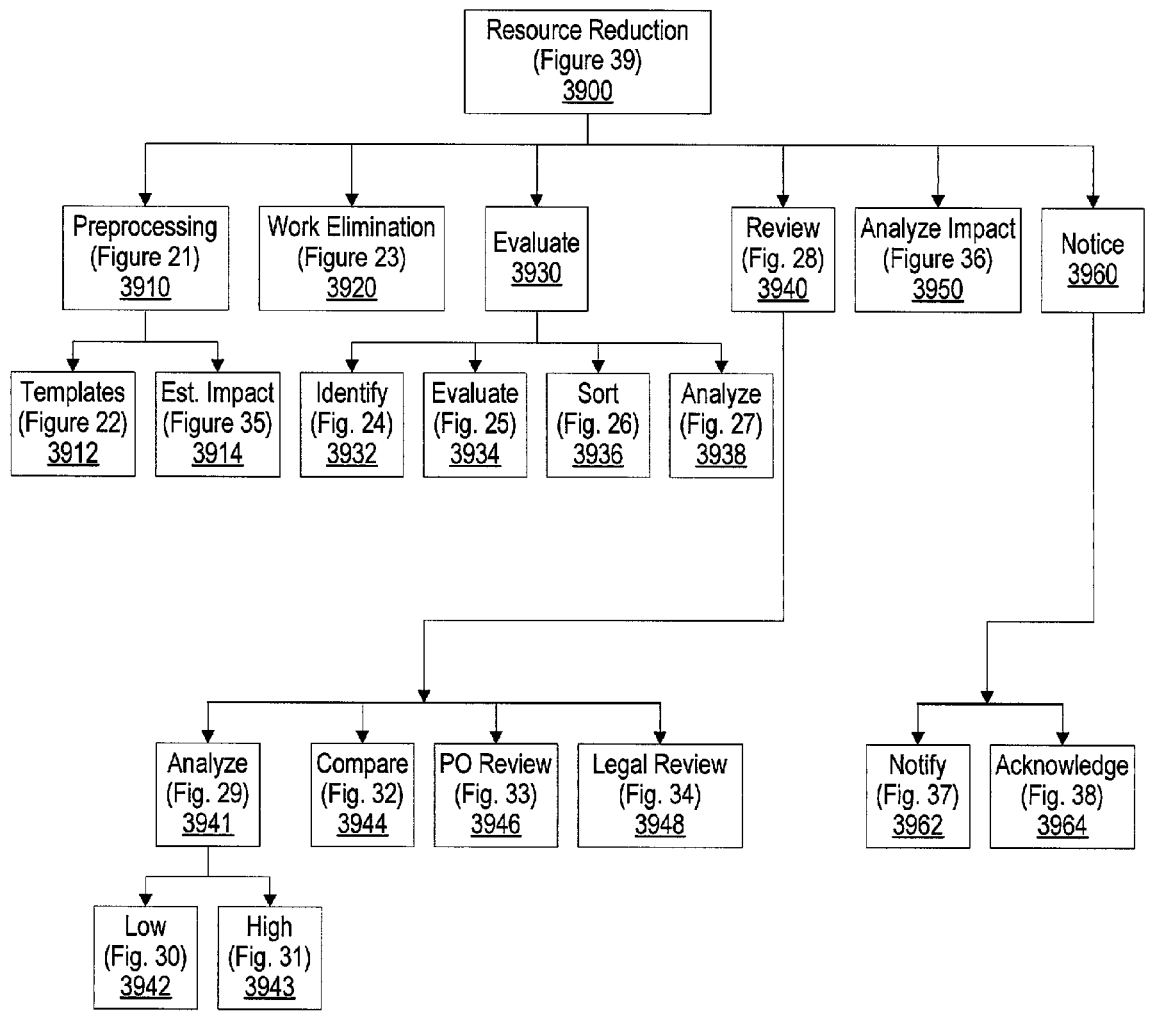
FIG. 39 is a hierarchy chart showing relationships between processes involved in managing organizational resources.

FIG. 39 is a hierarchy chart showing relationships between processes involved in managing organizational resources. Resource reduction processing (module 3900, see FIG. 20) includes modules for preprocessing surplus data (module 3910, see FIG. 21), work elimination (module 3920, see FIG. 23), evaluation (module 3930), reviewing (module 3940, see FIG. 28), impact analysis (module 3950, see FIG. 36), and employee notification (module 3960).

Preprocessing module 3910 further includes modules to build evaluation templates (module 3912, see FIG. 22), and to estimate the impact of the resource reduction (module 3914, see FIG. 35).

Evaluation module 3930 includes modules to identify affected employees (module 3932, see FIG. 24), to evaluate the identified employees (module 3934, see FIG. 25), to sort the evaluated employees (module 3936, see FIG. 26), and to analyze the evaluated employees (module 3938, see FIG. 27).

Review module 3940 includes modules to analyze employees by management (module 3941, see FIG. 29), to compare employees with one another in order to make surplus recommendations (module 3944, see FIG. 32), for project office review of surplus recommendations (module 3946, see FIG. 33), and for legal review of surplus recommendations (module 3948, see FIG. 34). Analyze employees module 3941 further includes modules for analyzing low skilled employees (module 3942, see FIG. 30), and for analyzing high skilled employees (module 3943, see FIG. 31).

Notice module 3460 includes modules for notifying employees (module 3462, see FIG. 37) and for receiving acknowledgements from employees (module 3464, see FIG. 38).

Figure 40:
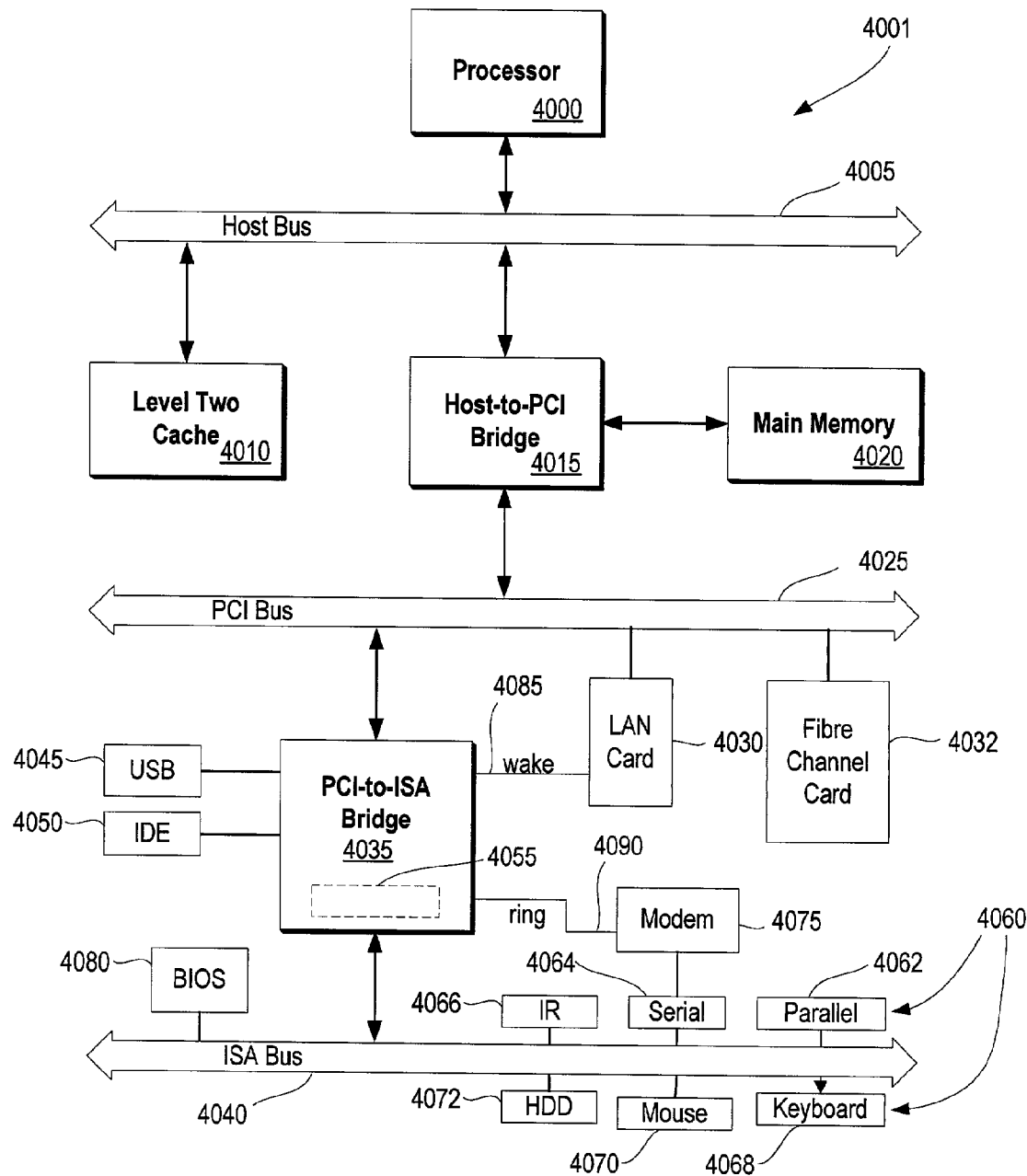
FIG. 40 is a block diagram of an information handling system capable of implementing the present invention.

FIG. 40 illustrates information handling system 4001 which is a simplified example of a computer system capable of performing the present invention. Computer system 4001 includes processor 4000 which is coupled to host bus 4005. A level two (L2) cache memory 4010 is also coupled to the host bus 4005. Host-to-PCI bridge 4015 is coupled to main memory 4020, includes cache memory and main memory control functions, and provides bus control to handle transfers among PCI bus 4025, processor 4000, L2 cache 4010, main memory 4020, and host bus 4005. PCI bus 4025 provides an interface for a variety of devices including, for example, LAN card 4030. PCI-to-ISA bridge 4035 provides bus control to handle transfers between PCI bus 4025 and ISA bus 4040, universal serial bus (USB) functionality 4045, IDE device functionality 4050, power management functionality 4055, and can include other functional elements not shown, such as a real-time clock (RTC), DMA control, interrupt support, and system management bus support. Peripheral devices and input/output (I/O) devices can be attached to various interfaces 4060 (e.g., parallel interface 4062, serial interface 4064, infrared (IR) interface 4066, keyboard interface 4068, mouse interface 4070, and fixed disk (FDD) 4072) coupled to ISA bus 4040. Alternatively, many I/O devices can be accommodated by a super I/O controller (not shown) attached to ISA bus 4040.

BIOS 4080 is coupled to ISA bus 4040, and incorporates the necessary processor executable code for a variety of low-level system functions and system boot functions. BIOS 4080 can be stored in any computer readable medium, including magnetic storage media, optical storage media, flash memory, random access memory, read only memory, and communications media conveying signals encoding the instructions (e.g., signals from a network). In order to attach computer system 4001 another computer system to copy files over a network, LAN card 4030 is coupled to PCI-to-ISA bridge 4035. Similarly, to connect computer system 4001 to an ISP to connect to the Internet using a telephone line connection, modem 4075 is connected to serial port 4064 and PCI-to-ISA Bridge 4035.

While the computer system described in FIG. 40 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of tracking surplus reduction actions, said method comprising:
   receiving a surplus reduction action from a user, wherein the user is an employee and wherein the surplus reduction action includes a surplus acknowledgment;
   identifying a user identifier corresponding to the user;
   storing the user identifier and data corresponding to the surplus reduction action in a nonvolatile storage area;
   providing benefits data to the employee in response to receiving the employee's surplus acknowledgement;
   sending the employee a non-compete agreement;
   receiving a digital signature from the employee corresponding to the non-compete agreement;
   storing the employee's digital signature in the nonvolatile storage area;
   selecting a group of identified surplus employees;
   analyzing digital signatures received from one or more of the identified surplus employees;
   determining based on the analysis which of the identified surplus employees have not provided digital signatures in response to non-compete agreements; and
   sending a reminder notification to the determined group of surplus employees.

2. The method as described in claim 1 further comprising:
   authenticating the digital signature received from the employee.

3. The method as described in claim 1 further comprising:
   identifying one or more surplus employees that have confidential knowledge of an organization; and
   writing a non-compete indicator to a non-compete data storage area corresponding to the identified surplus employees, wherein the non-compete agreement is sent to surplus employees in response to the identification.

4. An information handling system comprising:
   one or more processors;
   a memory accessible by the processors;
   a nonvolatile storage area accessible by the processors;
   a tracking tool for tracking surplus reduction actions, the tracking tool comprising software instructions stored in the memory, which, when executed by the processor, cause the information handling system to perform a method comprising:
      receiving a surplus reduction action from a user, wherein the user is an employee and wherein the surplus reduction action includes a surplus acknowledgment;
      identifying a user identifier corresponding to the user;
      storing the user identifier and data corresponding to the surplus reduction action in the nonvolatile storage area;
      providing benefits data to the employee in response to receiving the employee's surplus acknowledgement;
      sending the employee a non-compete agreement;
      receiving a digital signature from the employee corresponding to the non-compete agreement;
      storing the employee's digital signature in the nonvolatile storage area;
      selecting a group of identified surplus employees;
      analyzing digital signatures received from one or more of the identified surplus employees;
      determining based on the analysis which of the identified surplus employees have not provided digital signatures in response to non-compete agreements; and sending a reminder notification to the determined group of surplus employees.

5. The information handling system as described in claim 4 wherein the method further comprises:
authenticating the digital signature received from the employee.

6. The information handling system as described in claim 4 wherein the method further comprises:
identifying one or more surplus employees that have confidential knowledge of an organization; and
writing a non-compete indicator to a non-compete data storage area corresponding to the identified surplus employees, wherein the non-compete agreement is sent to surplus employees in response to the identification.

7. A computer program product stored in a computer storage media, the computer storage media containing instructions for execution by a computer, which, when executed by the computer, cause the computer to perform a method for tracking surplus reduction actions, said method comprising:
receiving a surplus reduction action from a user, wherein the user is an employee and wherein the surplus reduction action includes a surplus acknowledgment;
identifying a user identifier corresponding to the user;
storing the user identifier and data corresponding to the surplus reduction action in the nonvolatile storage area;
providing benefits data to the employee in response to receiving the employee's surplus acknowledgement;
sending the employee a non-compete agreement;
receiving a digital signature from the employee corresponding to the non-compete agreement;
storing the employee's digital signature in the nonvolatile storage area;
selecting a group of identified surplus employees;
analyzing digital signatures received from one or more of the identified surplus employees;
determining, based on the analysis which of the identified surplus employees have not provided digital signatures in response to non-compete agreements; and
sending a reminder notification to the determined group of surplus employees.

8. The computer program product as described in claim 7 wherein the method further comprises:
authenticating the digital signature received from the employee.

9. The computer program product as described in claim 7 wherein the method further comprises:
identifying one or more surplus employees that have confidential knowledge of an organization; and
writing a non-compete indicator to a non-compete data storage area corresponding to the identified surplus employees, wherein the non-compete agreement is sent to surplus employees in response to the identification.

\* \* \* \* \*